United States Patent
Choi et al.

(10) Patent No.: US 12,514,875 B2
(45) Date of Patent: Jan. 6, 2026

(54) PHARMACEUTICAL COMPOSITION COMPRISING ISOLATED MITOCHONDRIA FOR PREVENTING OR TREATING TENDINOPATHY

(71) Applicant: Humancellbio Co., Ltd., Suwon-si (KR)

(72) Inventors: Yong-Soo Choi, Pocheon-si (KR); Ji Min Lee, Pocheon-si (KR); Mi Jin Kim, Pocheon-si (KR); Kyunghoon Min, Pocheon-si (KR)

(73) Assignee: Humancellbio Co., Ltd., Suwon-si (KR)

( * ) Notice: Subject to any disclaimer, the term of this patent is extended or adjusted under 35 U.S.C. 154(b) by 1166 days.

(21) Appl. No.: 17/288,075

(22) PCT Filed: Oct. 31, 2019

(86) PCT No.: PCT/KR2019/014605
§ 371 (c)(1),
(2) Date: Apr. 23, 2021

(87) PCT Pub. No.: WO2020/091463
PCT Pub. Date: May 7, 2020

(65) Prior Publication Data
US 2021/0379104 A1    Dec. 9, 2021

(30) Foreign Application Priority Data
Oct. 31, 2018  (KR) .................. 10-2018-0132211

(51) Int. Cl.
*A61P 17/00* (2006.01)
*A61K 35/12* (2015.01)
*A61P 19/02* (2006.01)

(52) U.S. Cl.
CPC ............. *A61K 35/12* (2013.01); *A61P 19/02* (2018.01)

(58) Field of Classification Search
CPC .................................. A61P 17/00; A61K 35/12
See application file for complete search history.

(56) References Cited

U.S. PATENT DOCUMENTS

2011/0008310 A1*  1/2011  Cataldo et al. ........ A61K 38/44
                                                          424/94.4

FOREIGN PATENT DOCUMENTS

| KR | 10-2016-009102 | * | 9/2016 | ............. | A61K 35/28 |
| KR | 10-2016-0105363 | A | 9/2016 | | |
| KR | 10-2018-0062387 | A | 6/2018 | | |
| KR | 10-2018-0071030 | A | 6/2018 | | |
| WO | 2017-124037 | A1 | 7/2017 | | |
| WO | 2008-137035 | A1 | 11/2018 | | |

OTHER PUBLICATIONS

Wei et al. (2023) "Mitochondrial transfer from bone mesenchymal stem cells protects against tendinopathy both in vitro and in vivo" Stem Cell Research & Therapy, 14(1), 104. (Year: 2023).*
Pfefer et al. (2009) "Chiropractic management of tendinopathy: a literature synthesis" Journal of manipulative and physiological therapeutics, 32(1), 41-52. (Year: 2009).*
Lee et al. "P1832: Healthy mitochondrial delivery restores damaged tenocytes via suppressing ROS generation", Joint Meeting of American-Society-for-Cell-Biology and European-Molecular-Biology Organization (ASCB/EMBO), Poster Abstract, Board No. B852, conference date: Dec. 8-12, 2018, San Diego, CA. (Year: 2018).*
Nakagawa et al. "Mitochondrial dysfunction in tenocytes from human tendinopathy patients", Orthopaedic Research Society (ORS) 2019 Annual Meeting, Poster No. 0533, conference date: Feb. 2019, Austin, TX. (Year: 2019).*
Lowes et al. (2009) "The mitochondria targeted antioxidant MitoQ protects against fluoroquinolone-induced oxidative stress and mitochondrial membrane damage in human Achilles tendon cells" Free radical research, 43(4), 323-328. (Year: 2009).*
Peters et al. (2016) "Preventive interventions for tendinopathy: A systematic review" Journal of science and medicine in sport, 19(3), 205-211. (Year: 2016).*
Lee et al. (2021) "Mitochondrial transplantation modulates inflammation and apoptosis, alleviating tendinopathy both in vivo and in vitro" Antioxidants, 10(5), 696, 22 pages. (Year: 2021).*
Damon A. Lowes et al., "The mitochondria targeted antioxidant MitoQ protects against fluoroquinolone-induced oxidative stress and mitochondrial membrane damage in human Achilles tendon cells", Free Radical Research, Apr. 2009, pp. 323-328, vol. 43, No. 4.
Graham Riley, "Tendinopathy—from basic science to treatment", Nature Clinical Practice Rheumatology, Feb. 2008, pp. 82-89, vol. 4, No. 4.
Neal L. Millar et al., "IL-17A mediates inflammatory and tissue remodelling events in early human tendinopathy", Scientific Reports, Jun. 2016, 11 pages.
International Searching Authority, Written Opinion for PCT/KR2019/014605 dated Feb. 21, 2020.
International Searching Authority, International Search Report for PCT/KR2019/014605 dated Feb. 21, 2020.

* cited by examiner

*Primary Examiner* — James Joseph Graber
(74) *Attorney, Agent, or Firm* — Sughrue Mion, PLLC

(57) ABSTRACT

Disclosed are a pharmaceutical composition containing isolated mitochondria as an effective component and uses of the composition. The pharmaceutical composition can restore the ATP synthesis capacity and antioxidant capacity of tenocytes damaged by inflammations to a normal tenocyte level. In addition, the pharmaceutical composition, when administered to damaged tenocytes, inhibits the expression of an apoptosis promoter, Bax, and increases the expression of an apoptosis inhibitor, Bcl-2. In addition, the pharmaceutical composition, when administered to damaged tenocytes, can restore the expression of MMP1 to a normal tenocyte level. Accordingly, uses of the pharmaceutical composition include prevention or treatment of tendinopathy in a subject.

9 Claims, 58 Drawing Sheets

[FIG. 1]
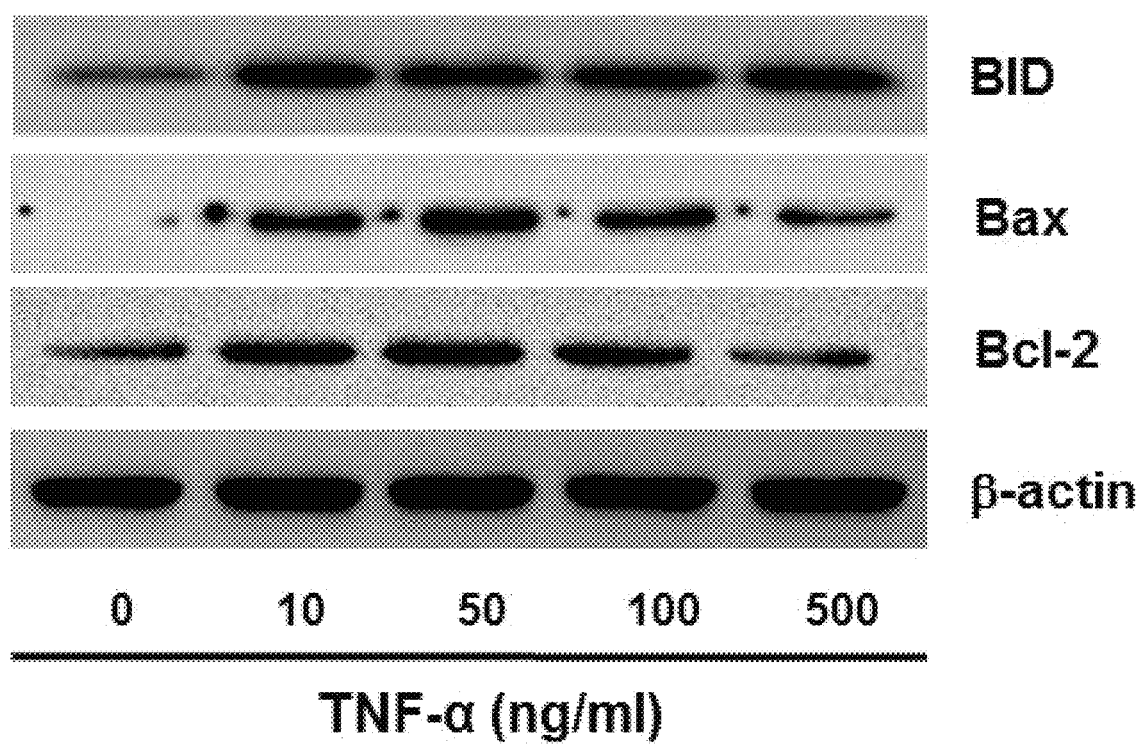

[FIG. 2]
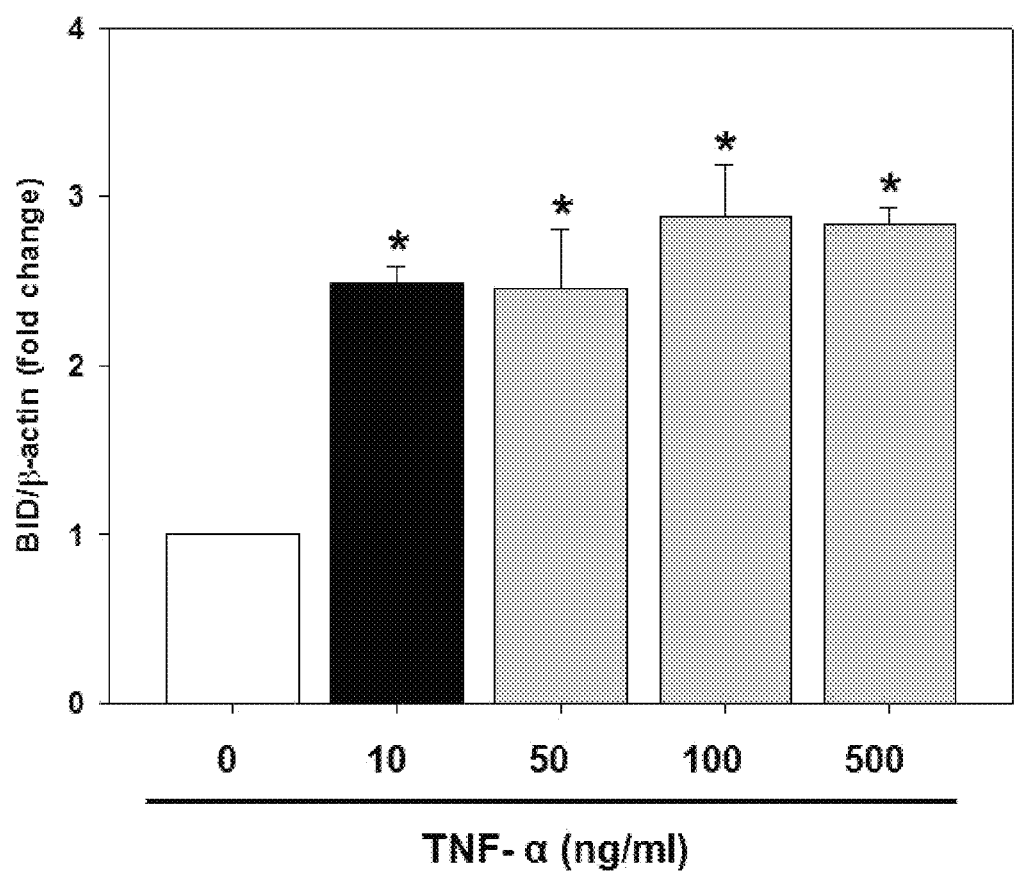
*p<0.05 vs control

[FIG. 3]
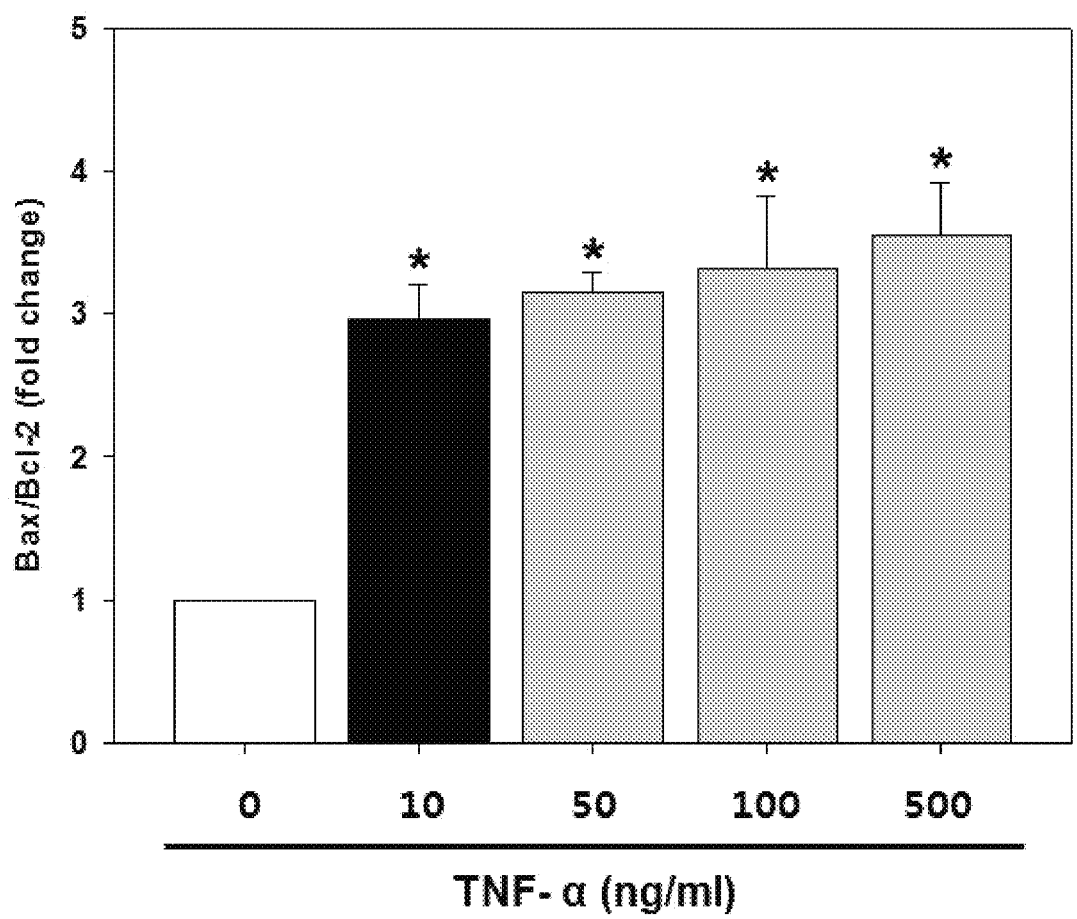
*p<0.05 vs control

[FIG. 4]
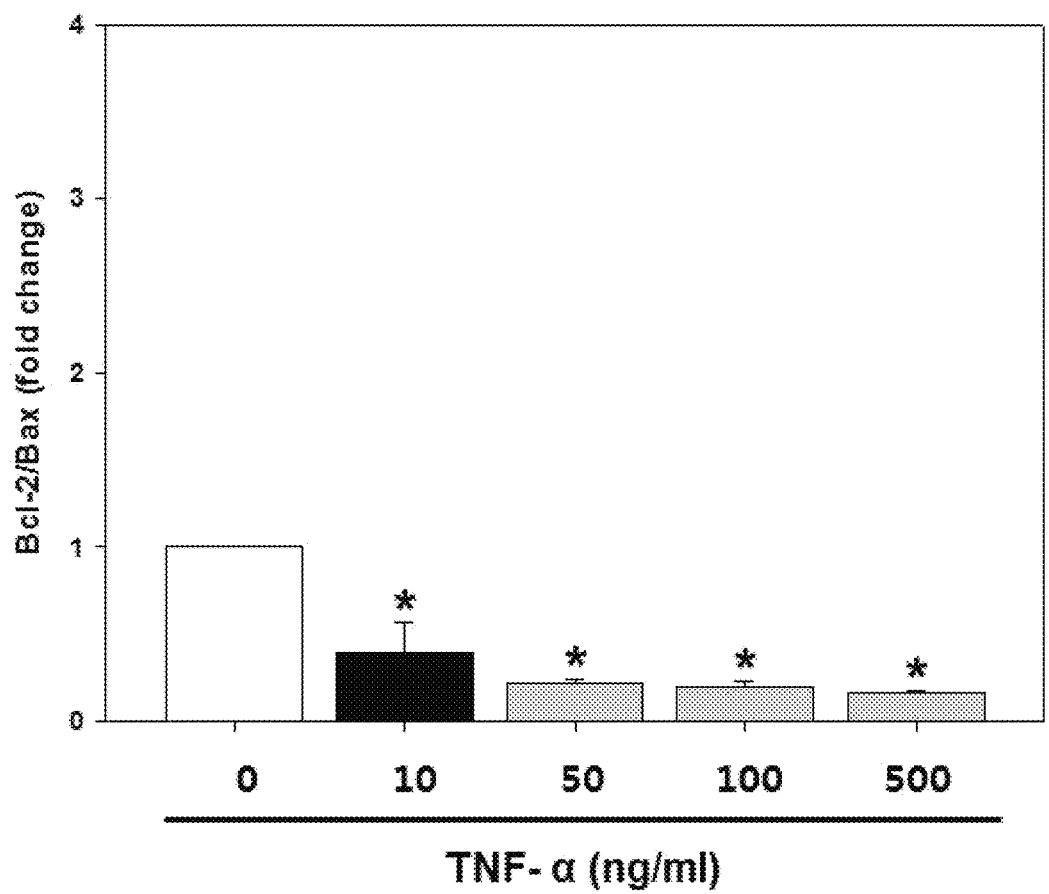

[FIG. 5]
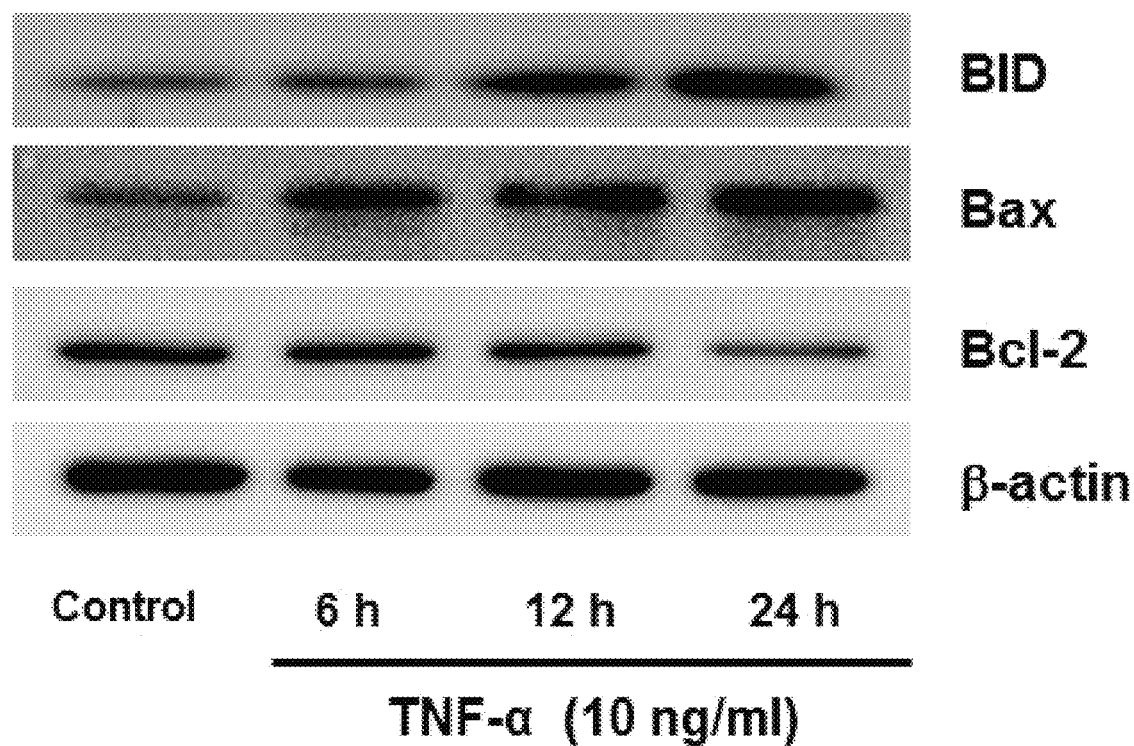

[FIG. 6]
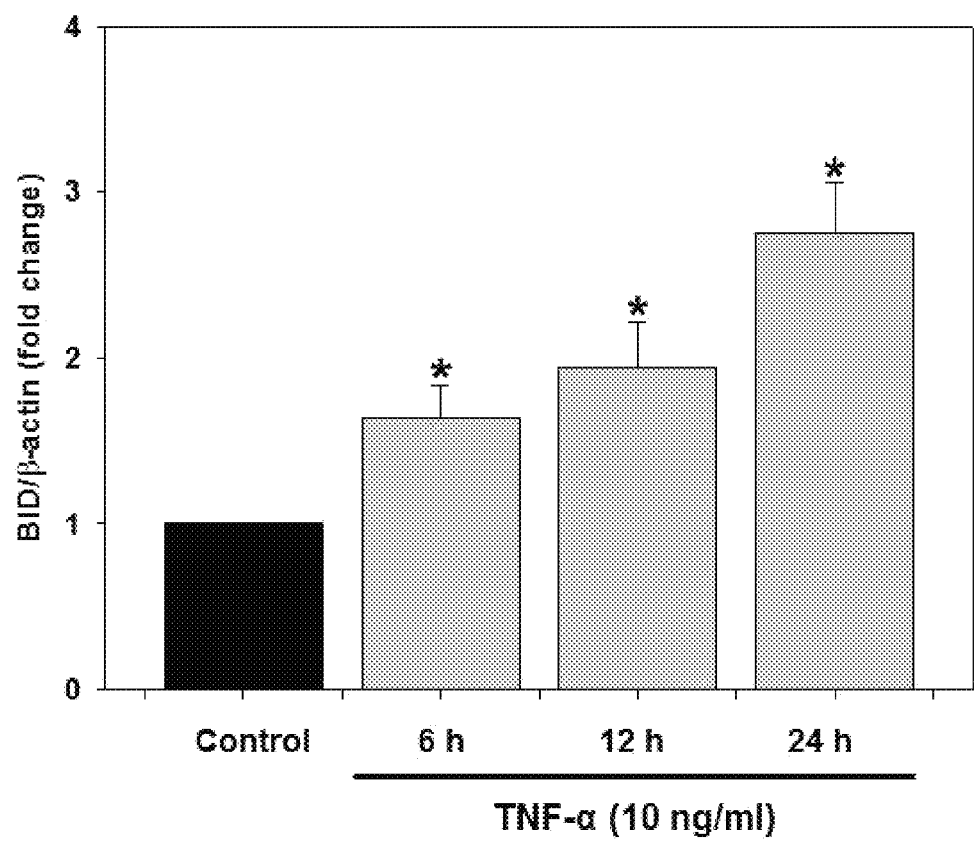

[FIG. 7]
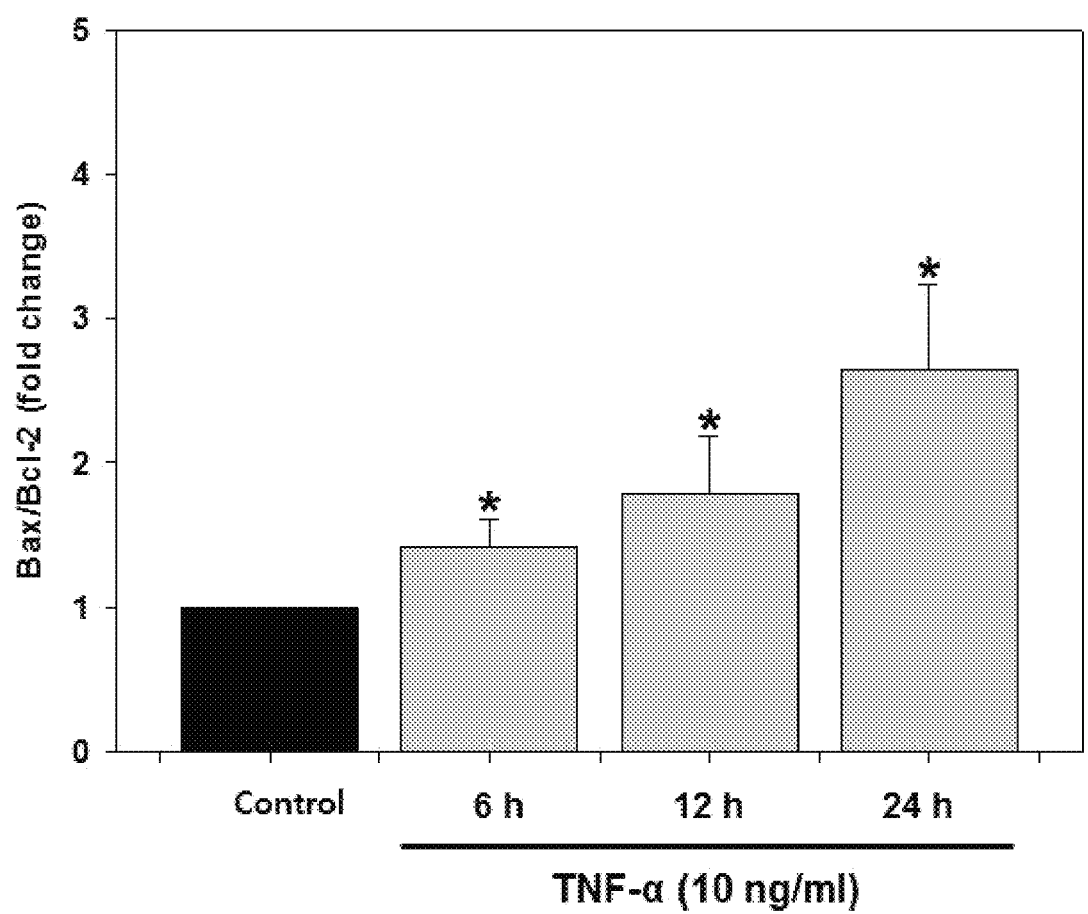
*p<0.05 vs control

[FIG. 8]
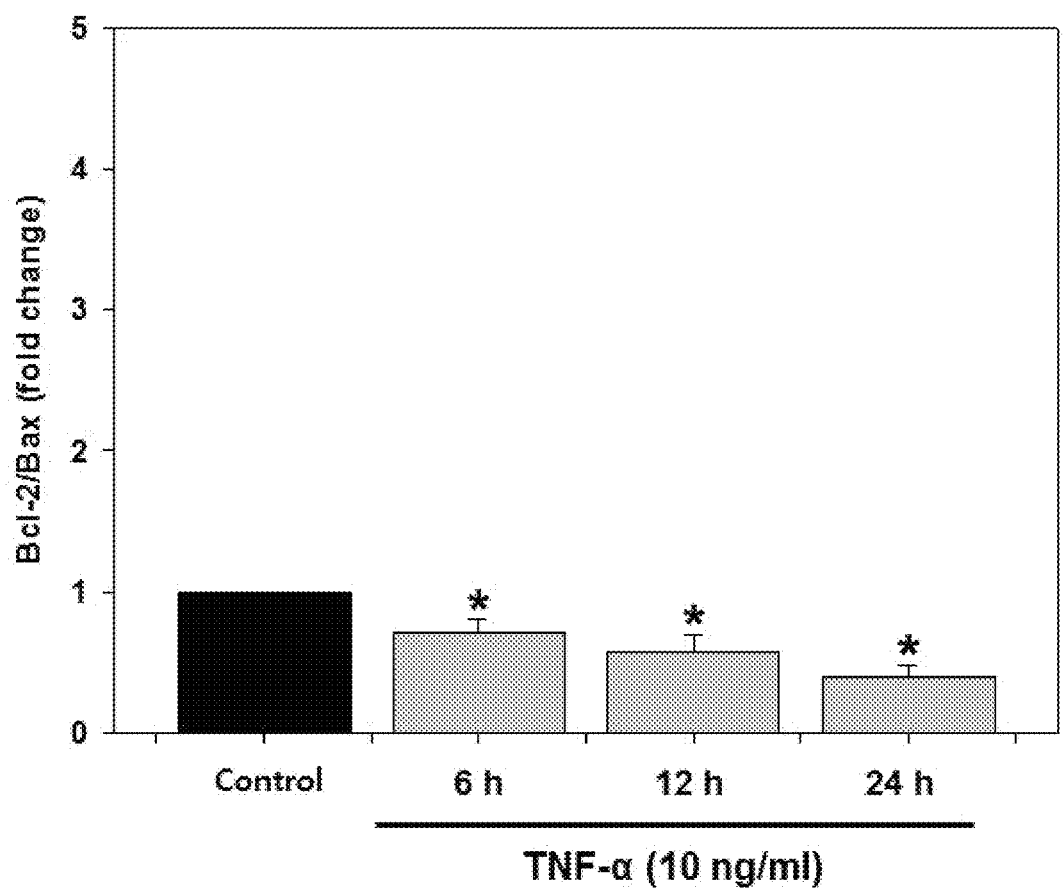

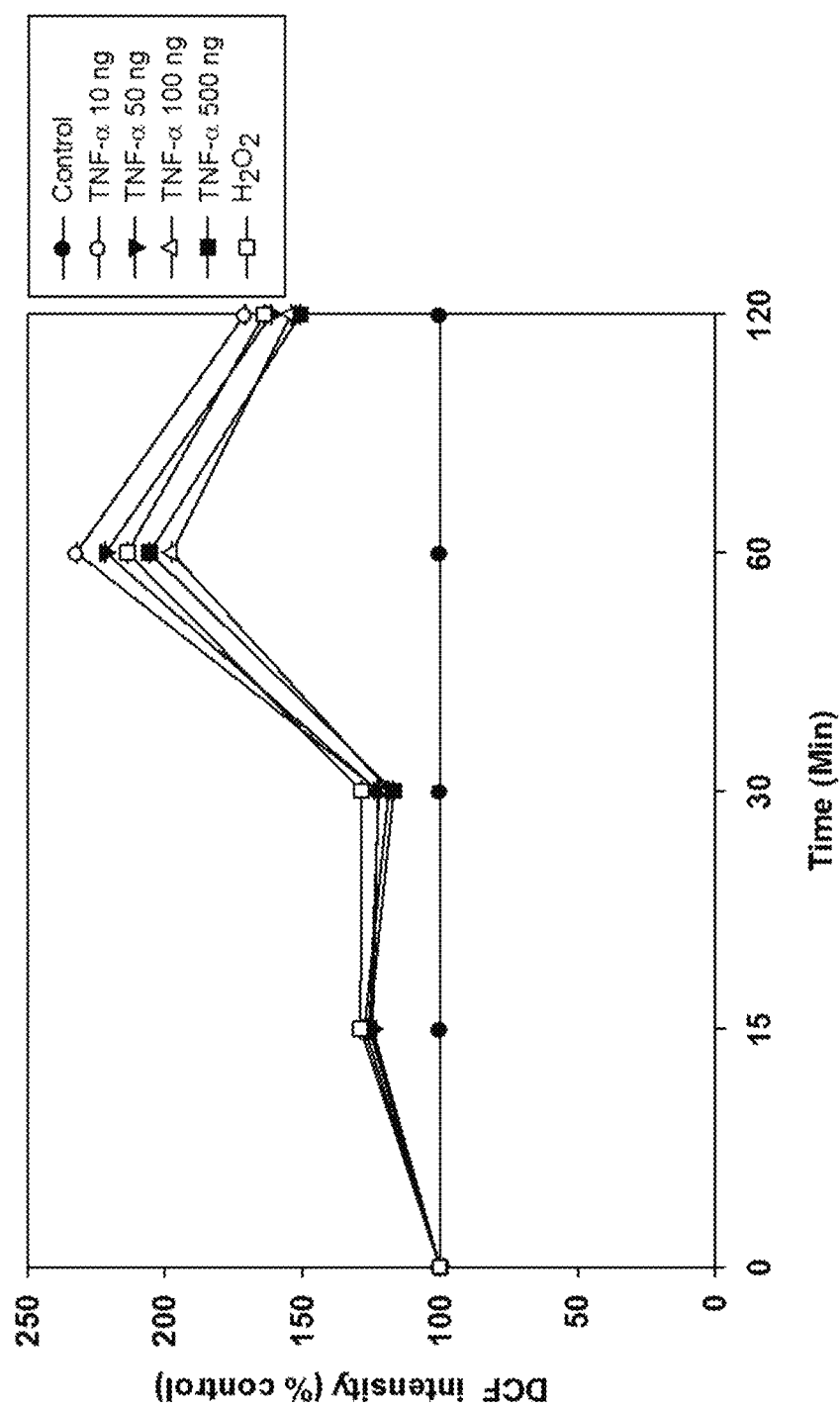
[FIG. 9]

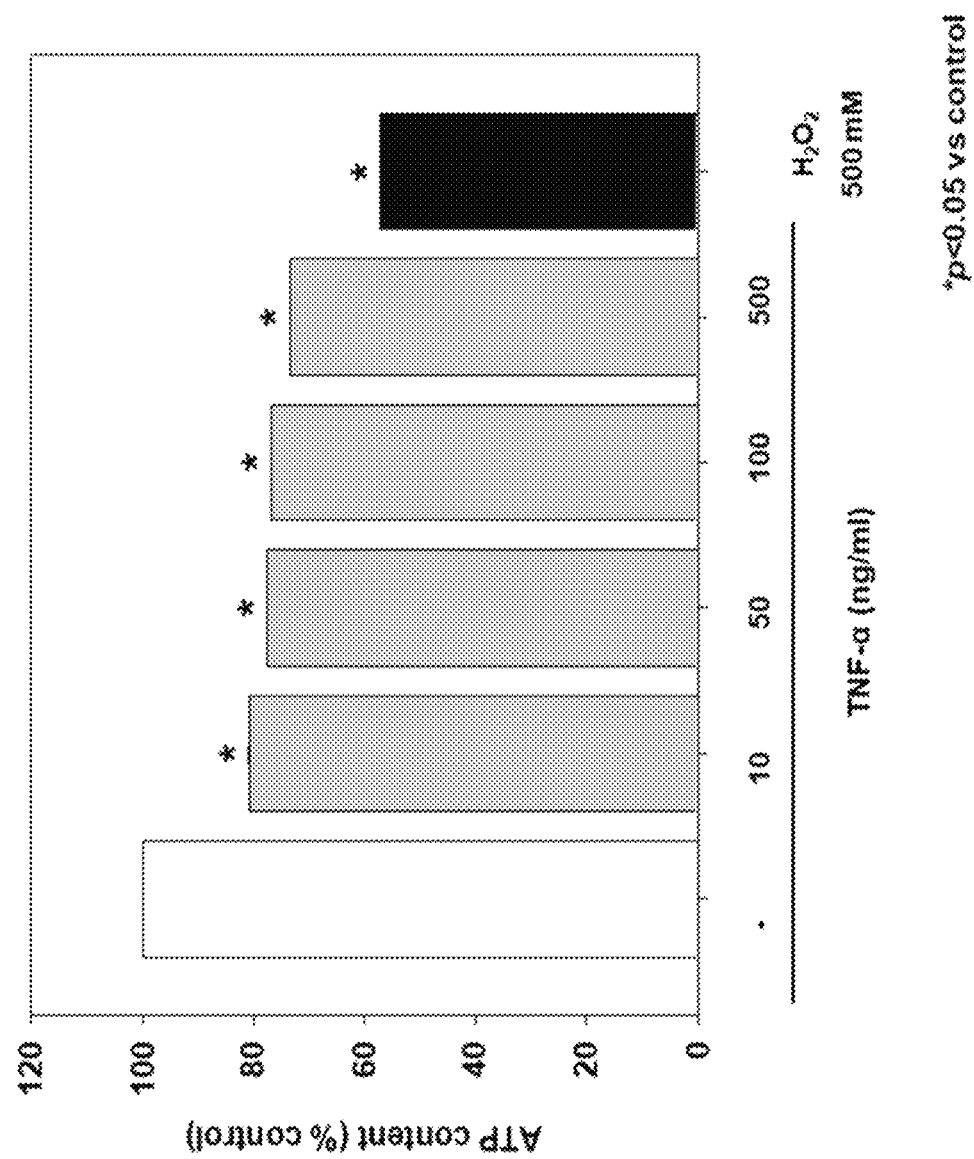
[FIG. 10]

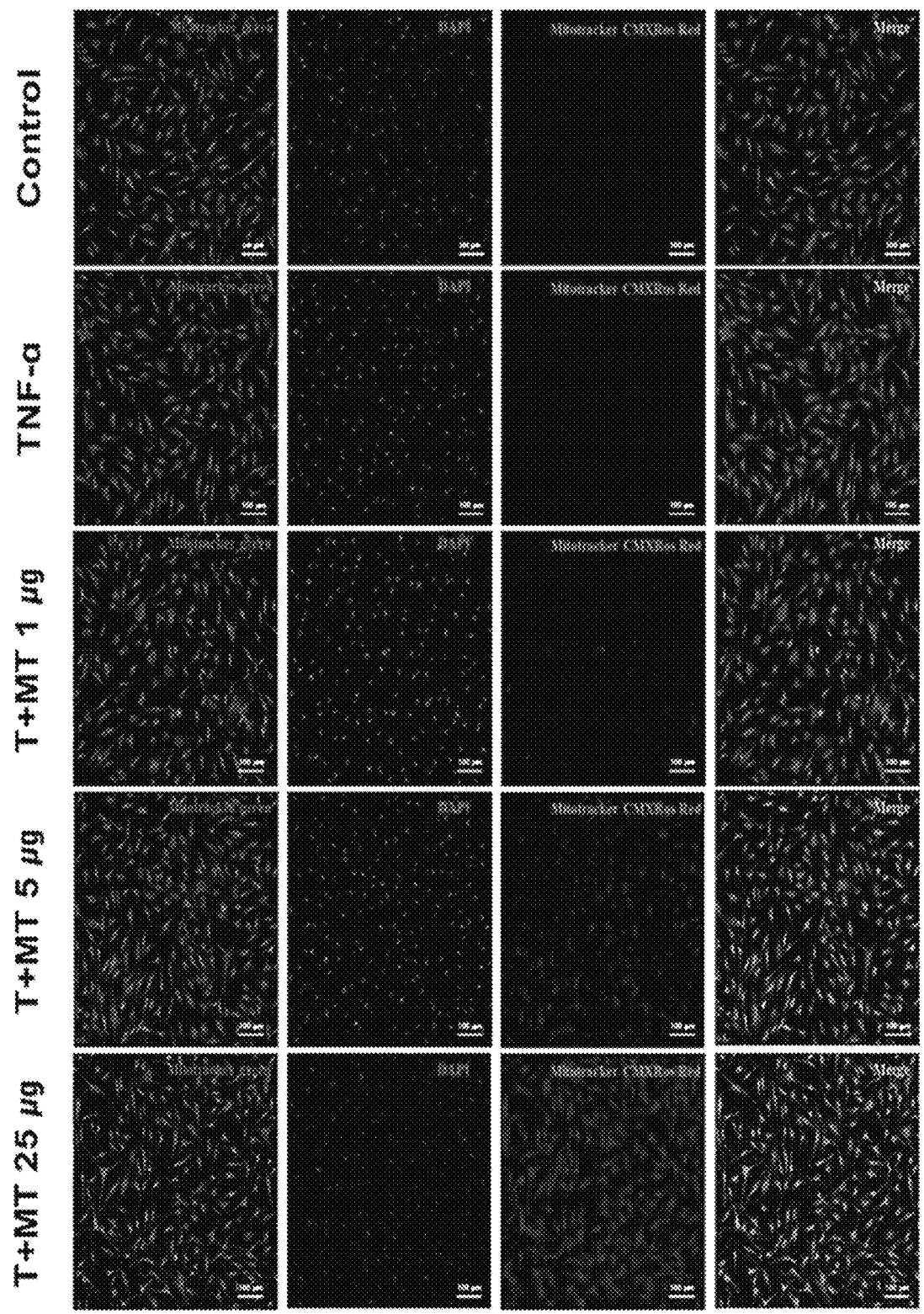
[FIG. 11]

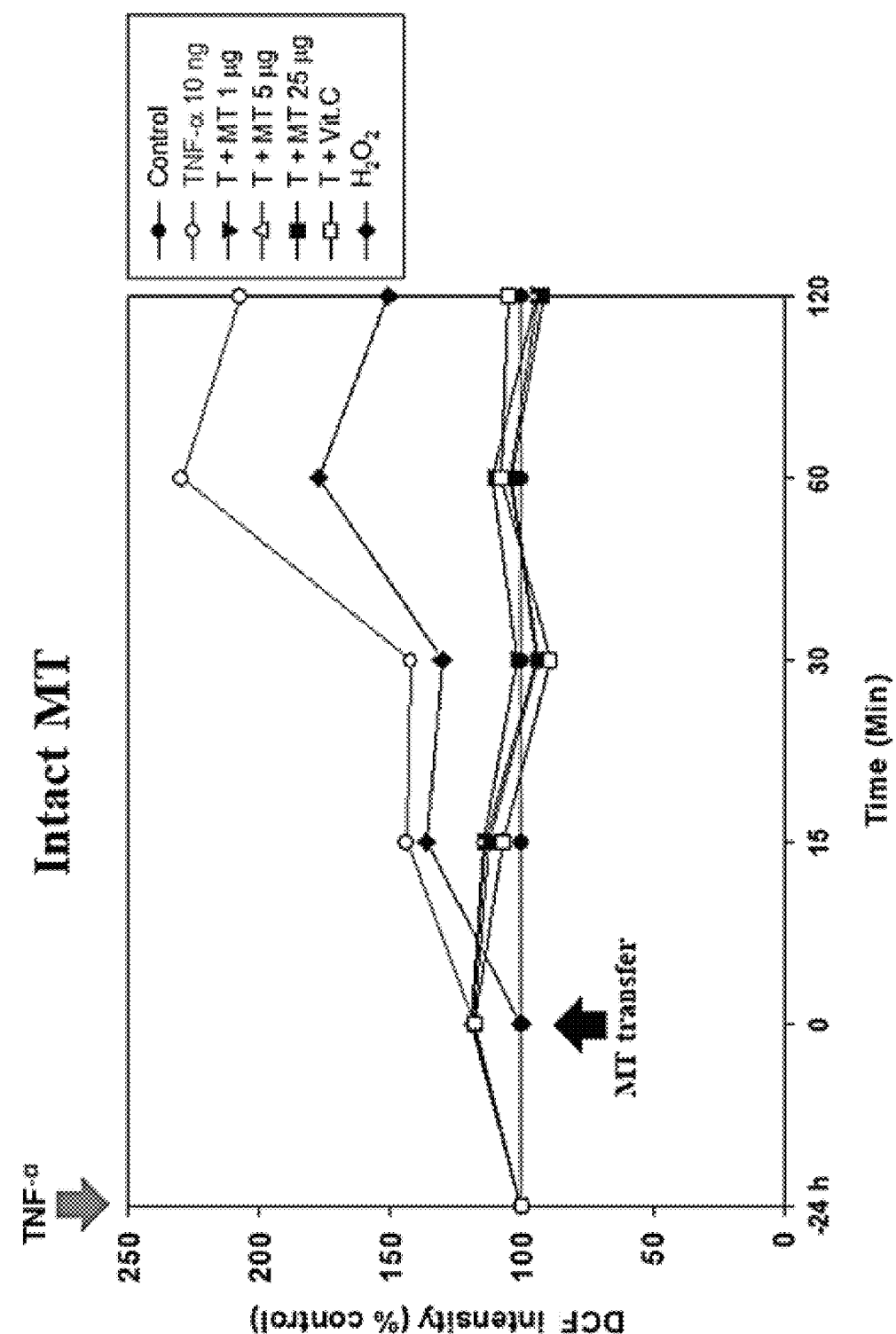
[FIG. 12]

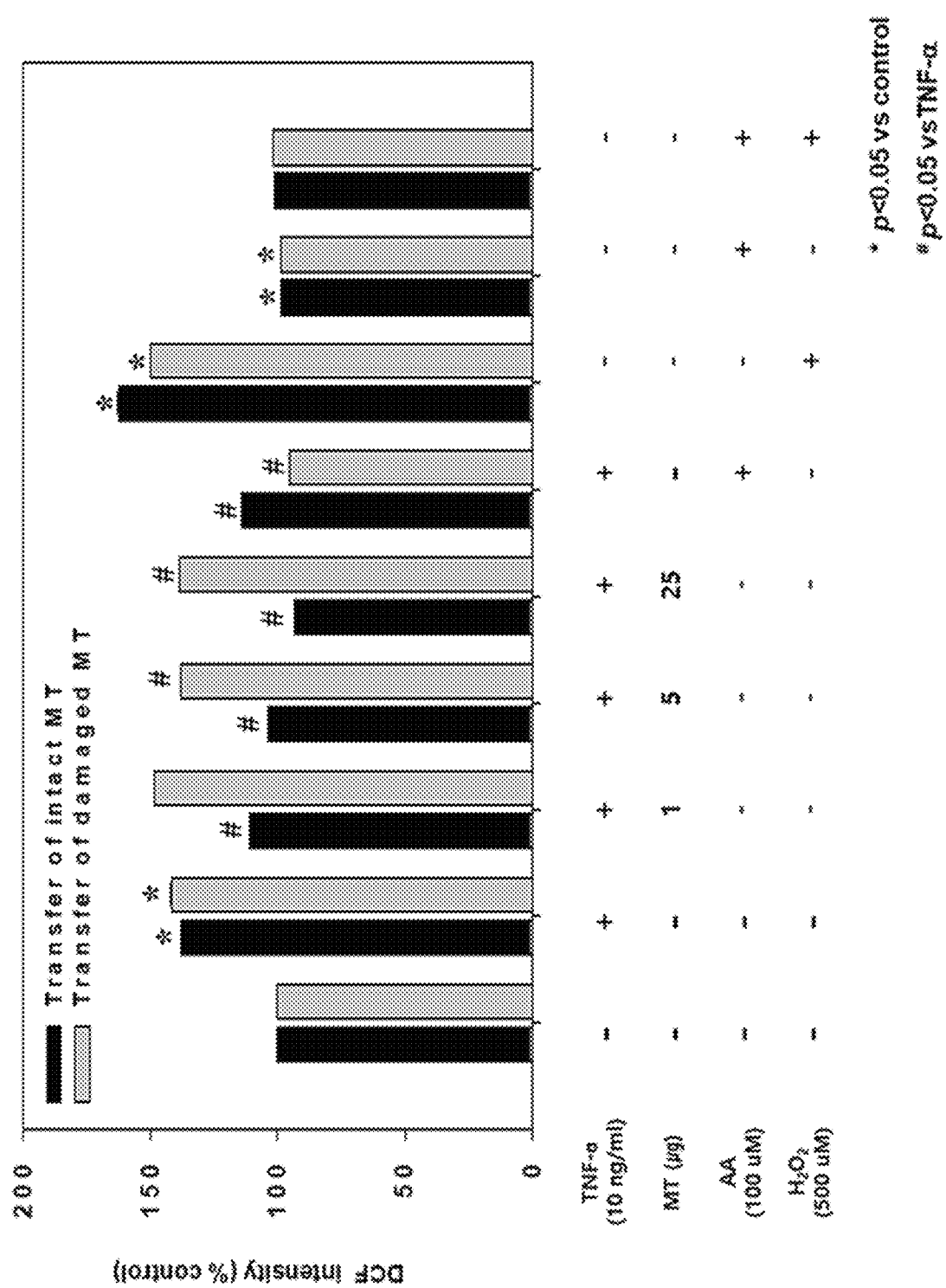
[FIG. 13]

[FIG. 14]
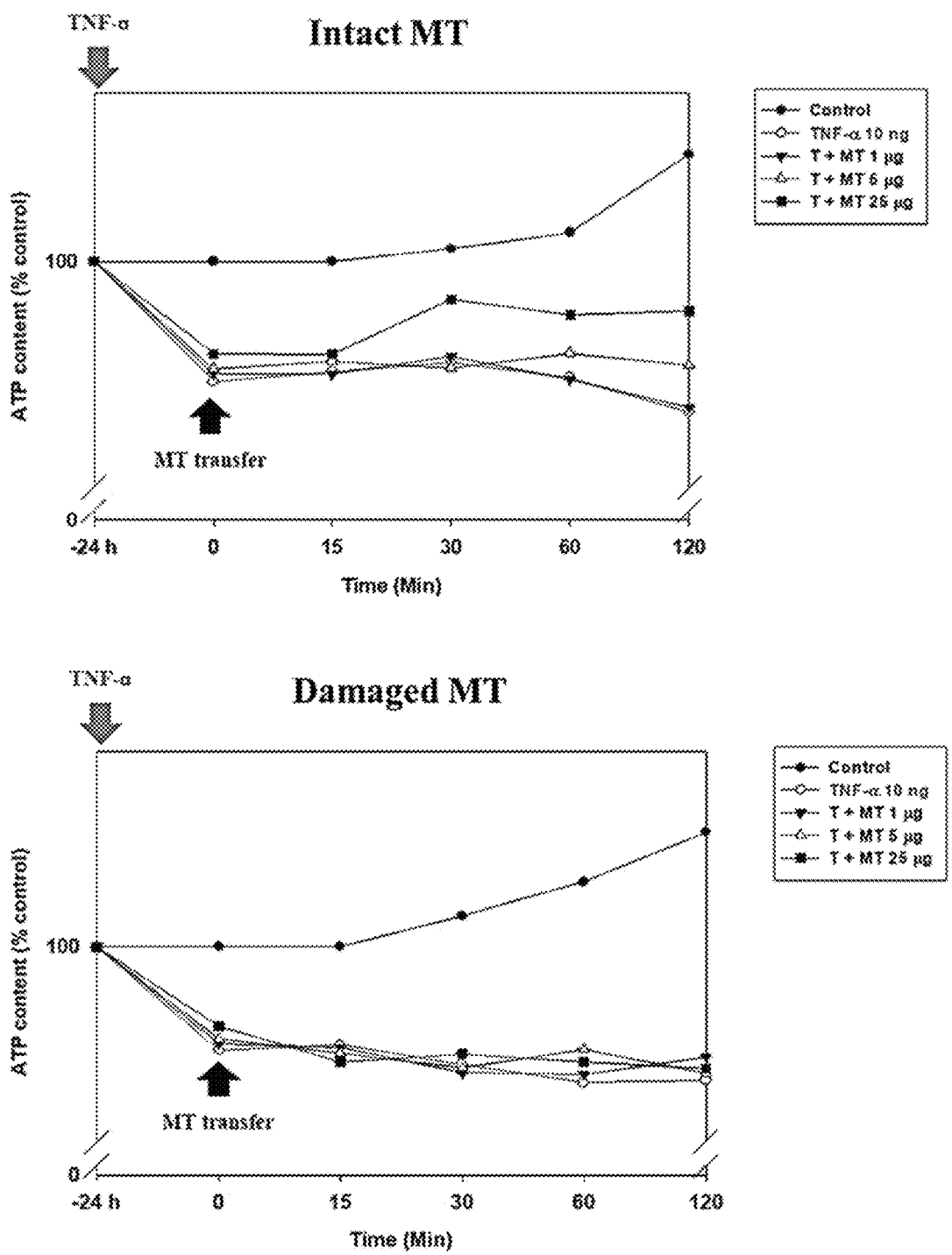

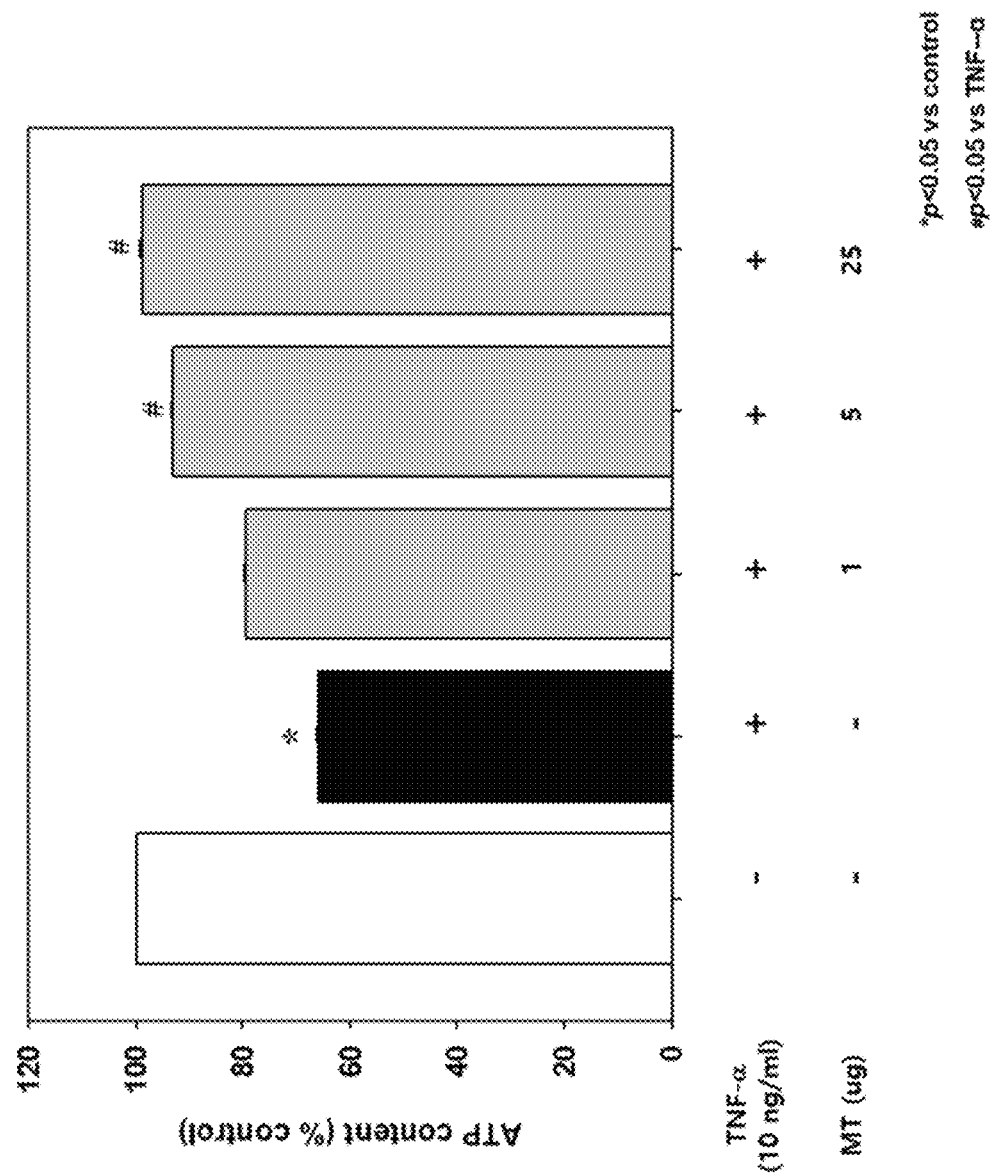
[FIG. 15]

[FIG. 16]
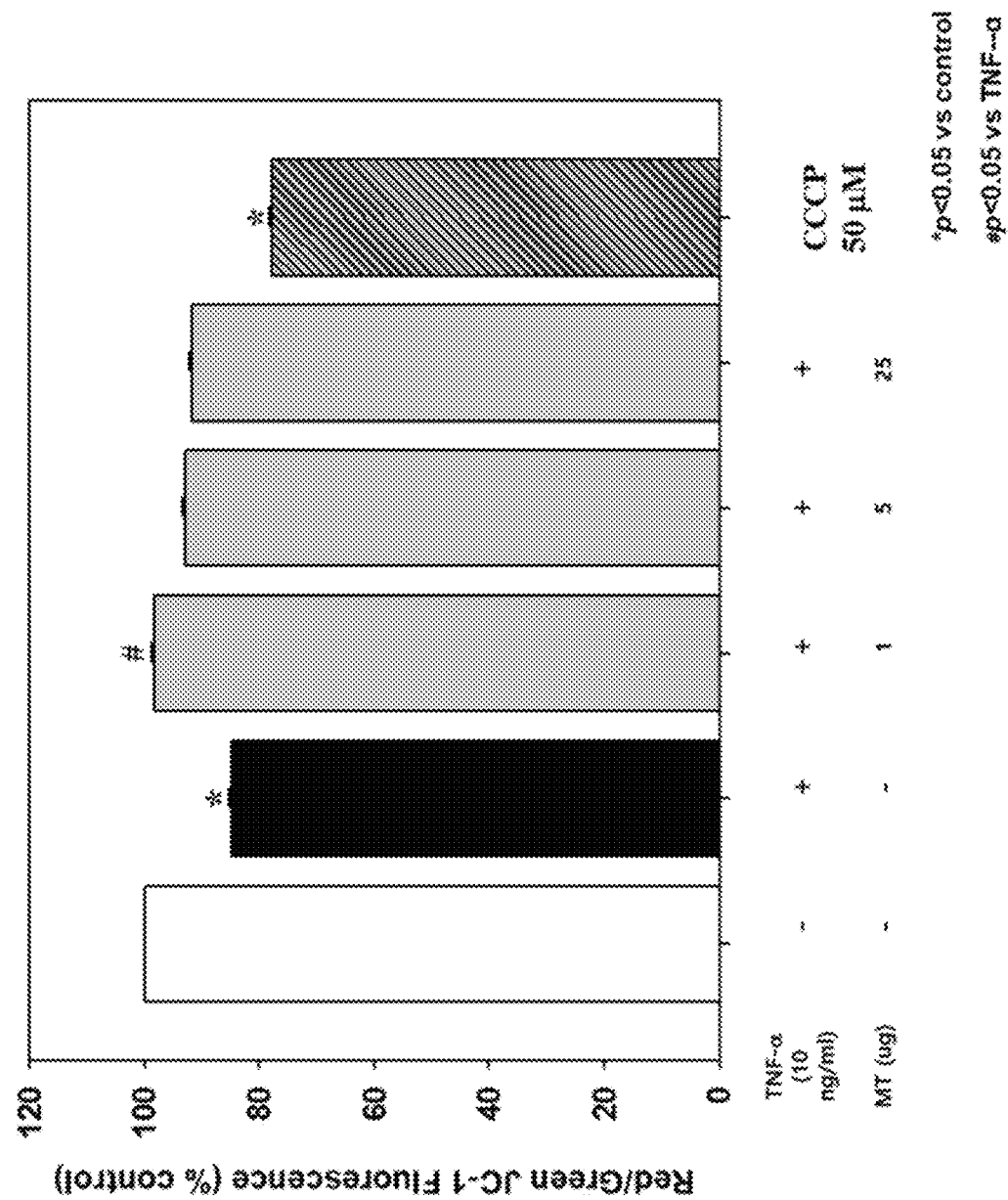

[FIG. 17]
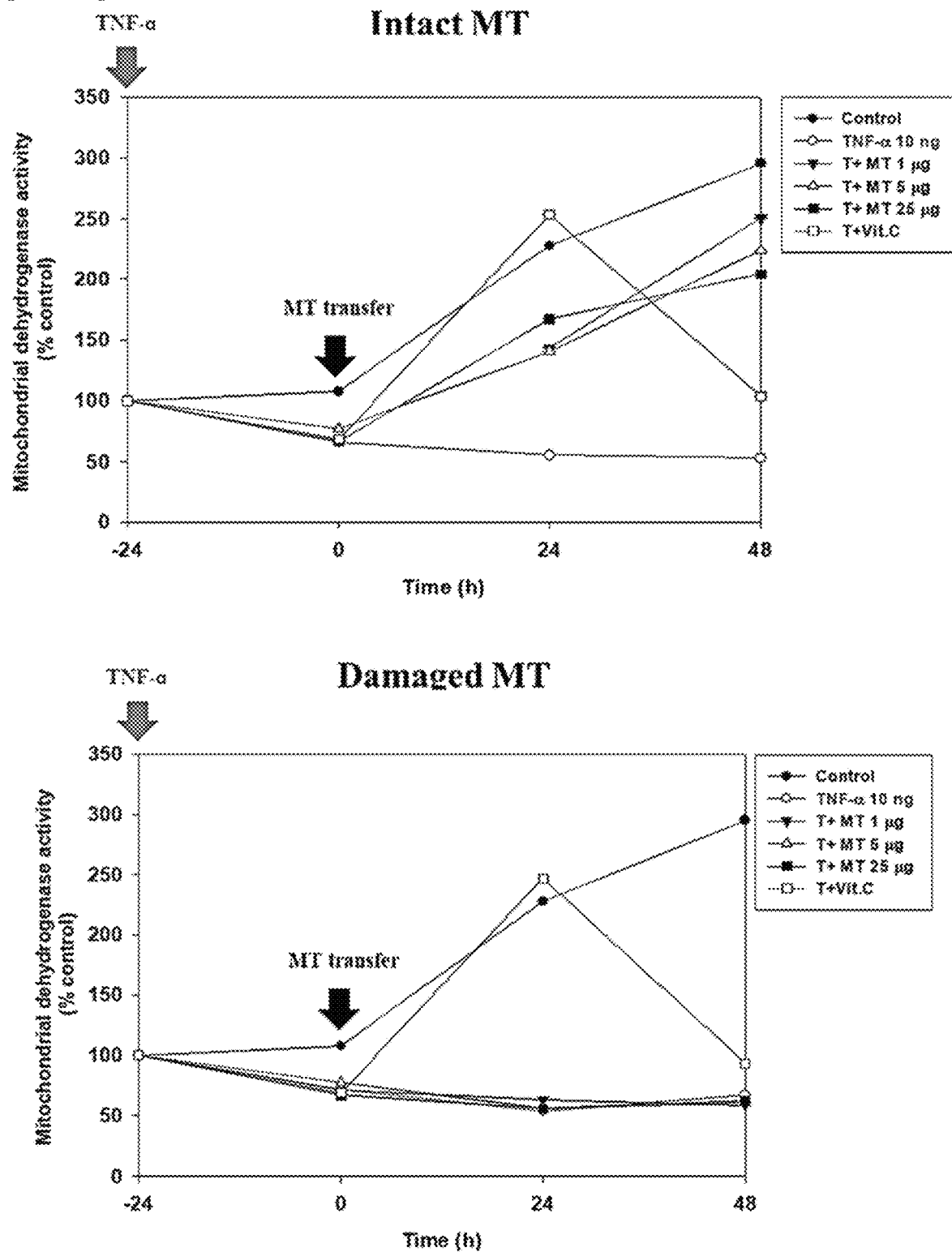

[FIG. 18]
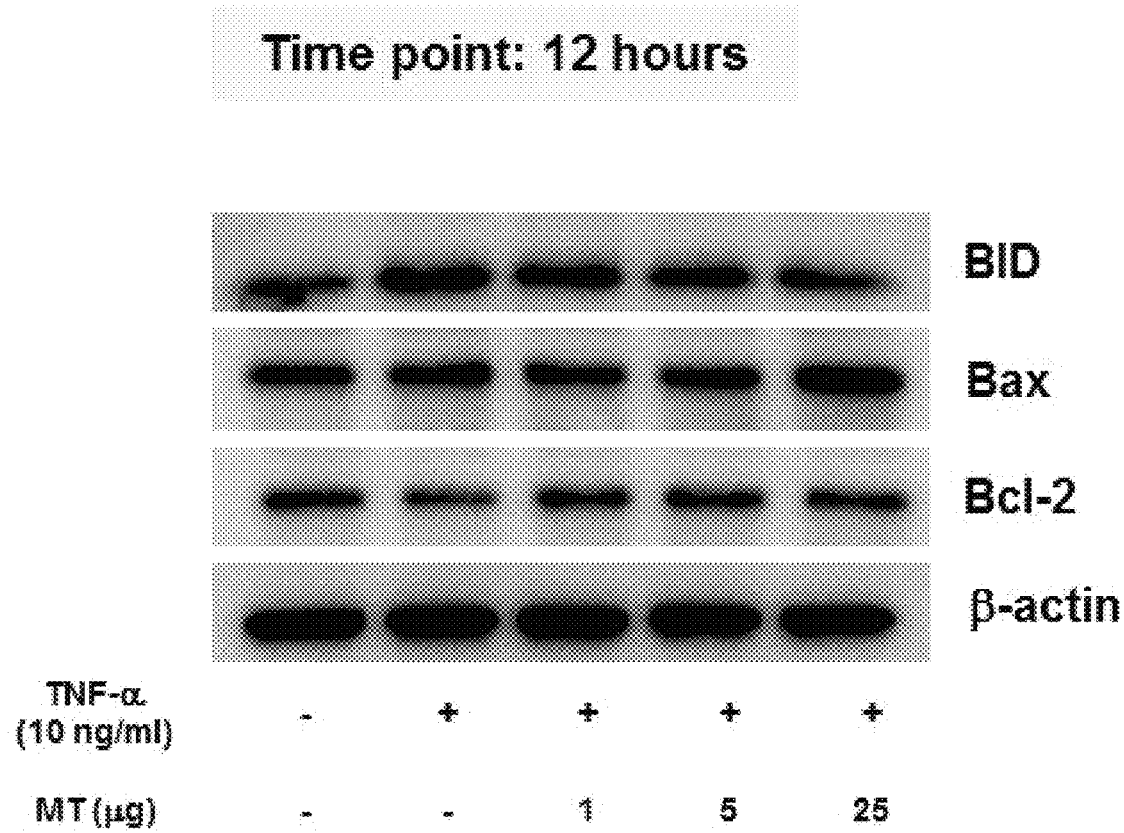

[FIG. 19]
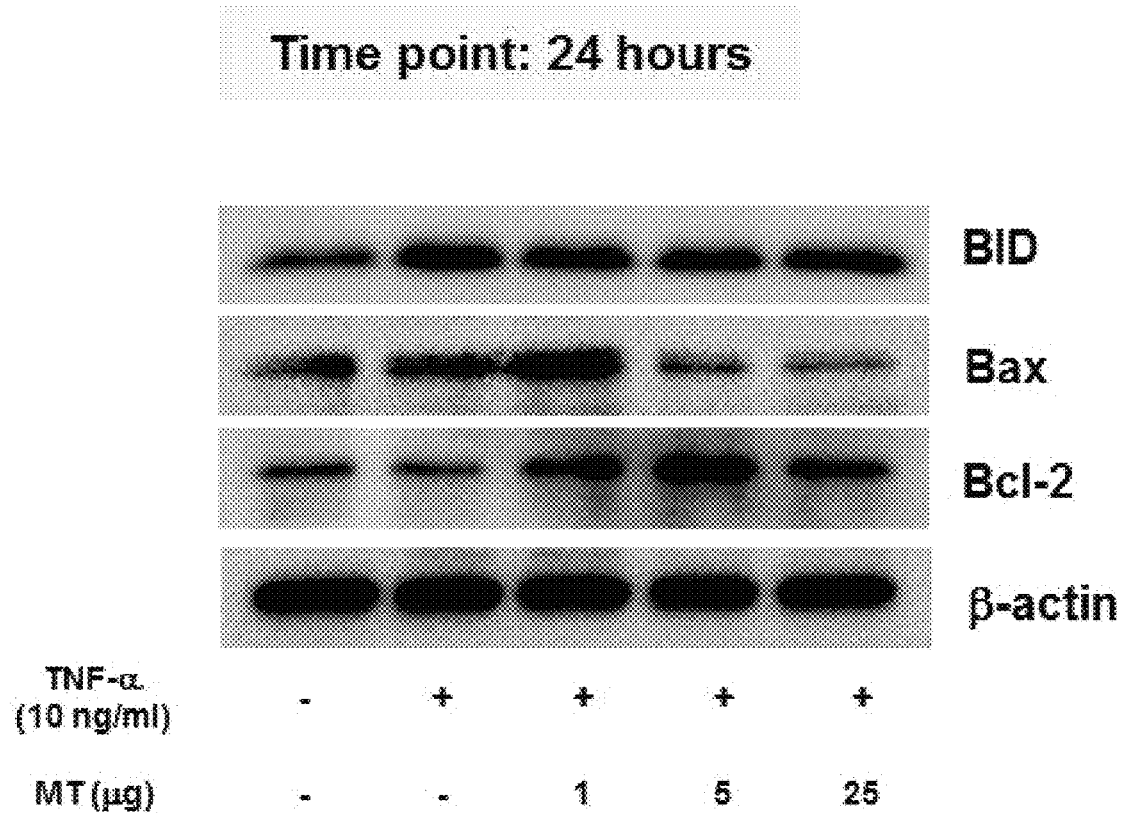

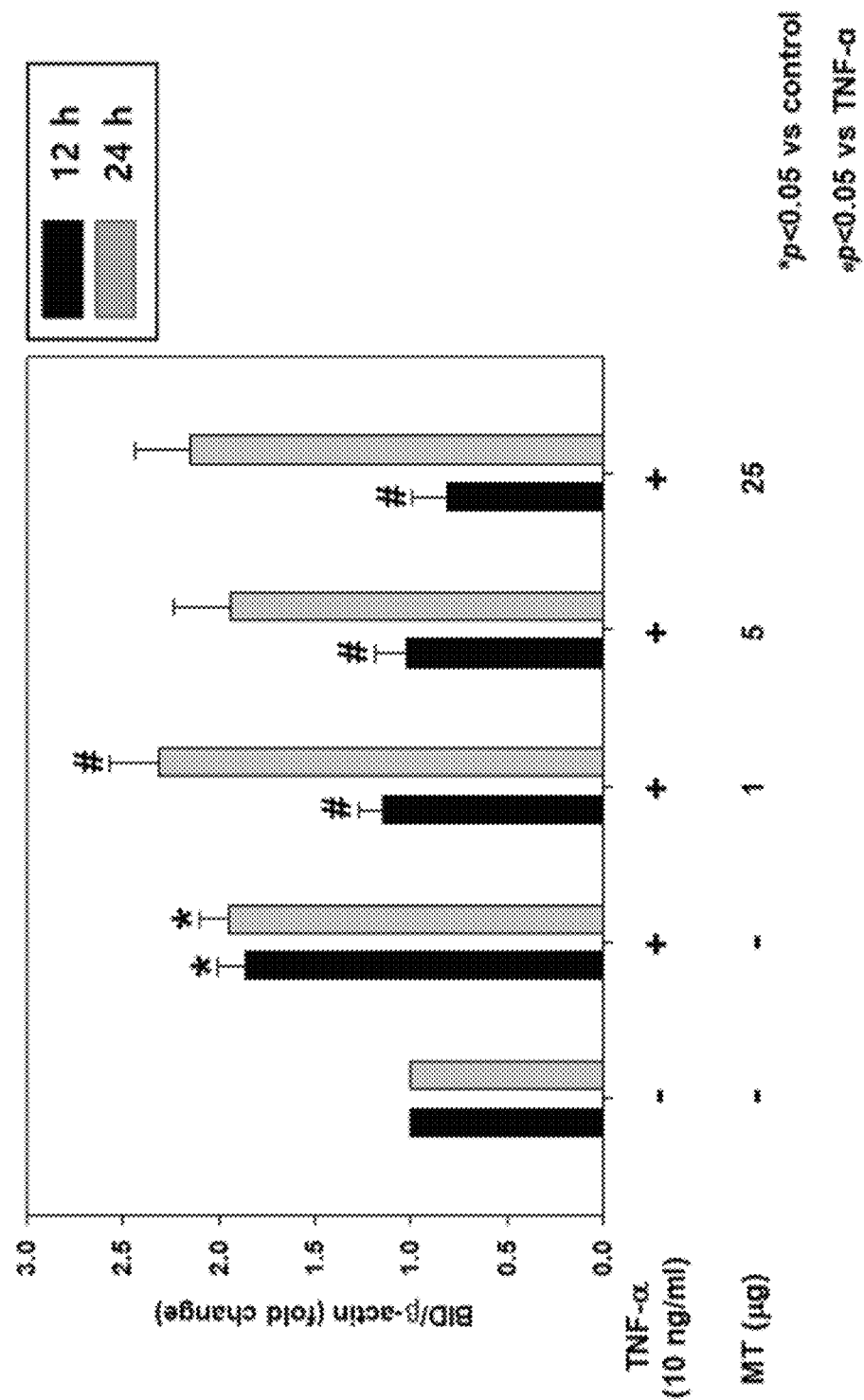
[FIG. 20]

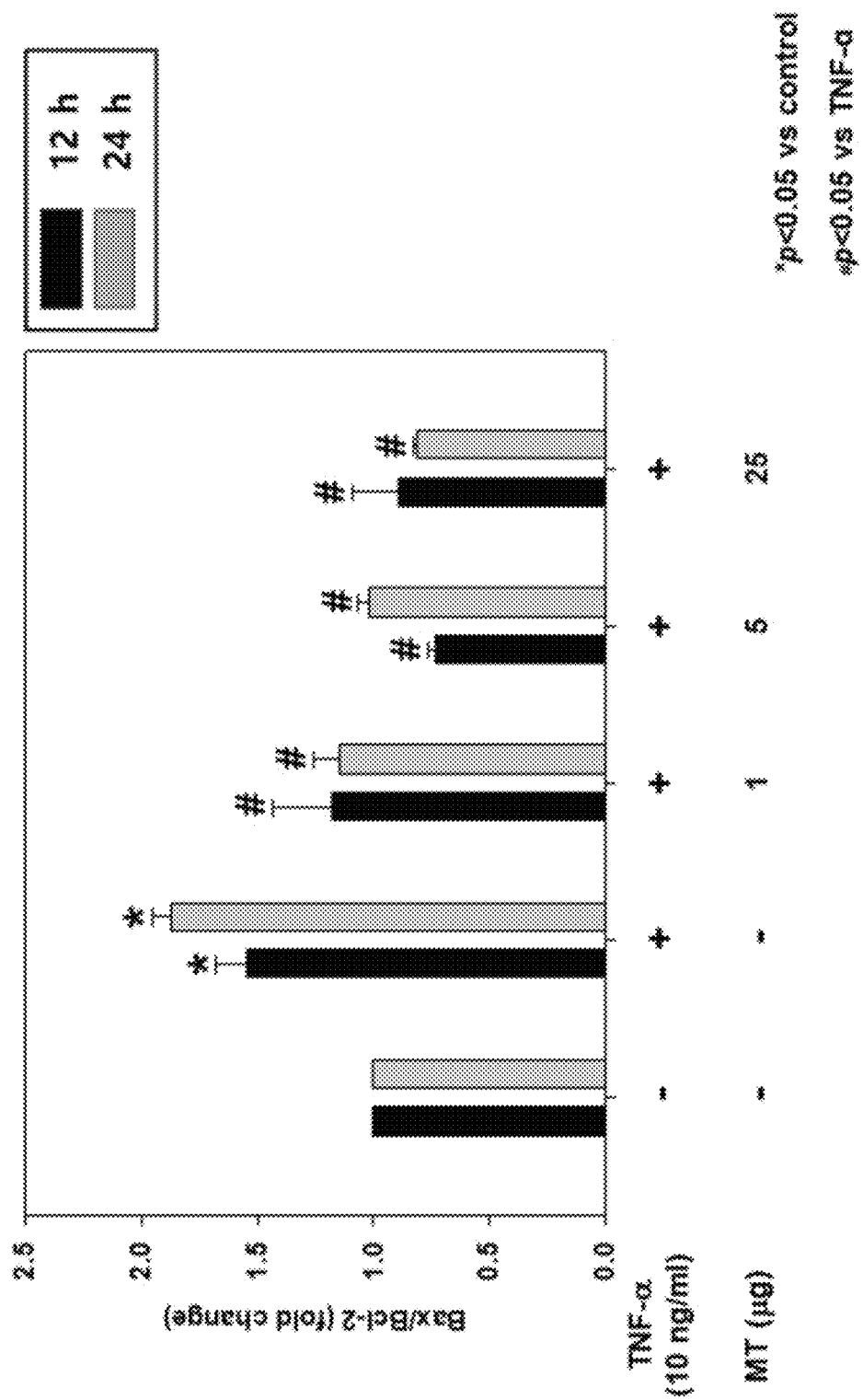
[FIG. 21]

[FIG. 22]
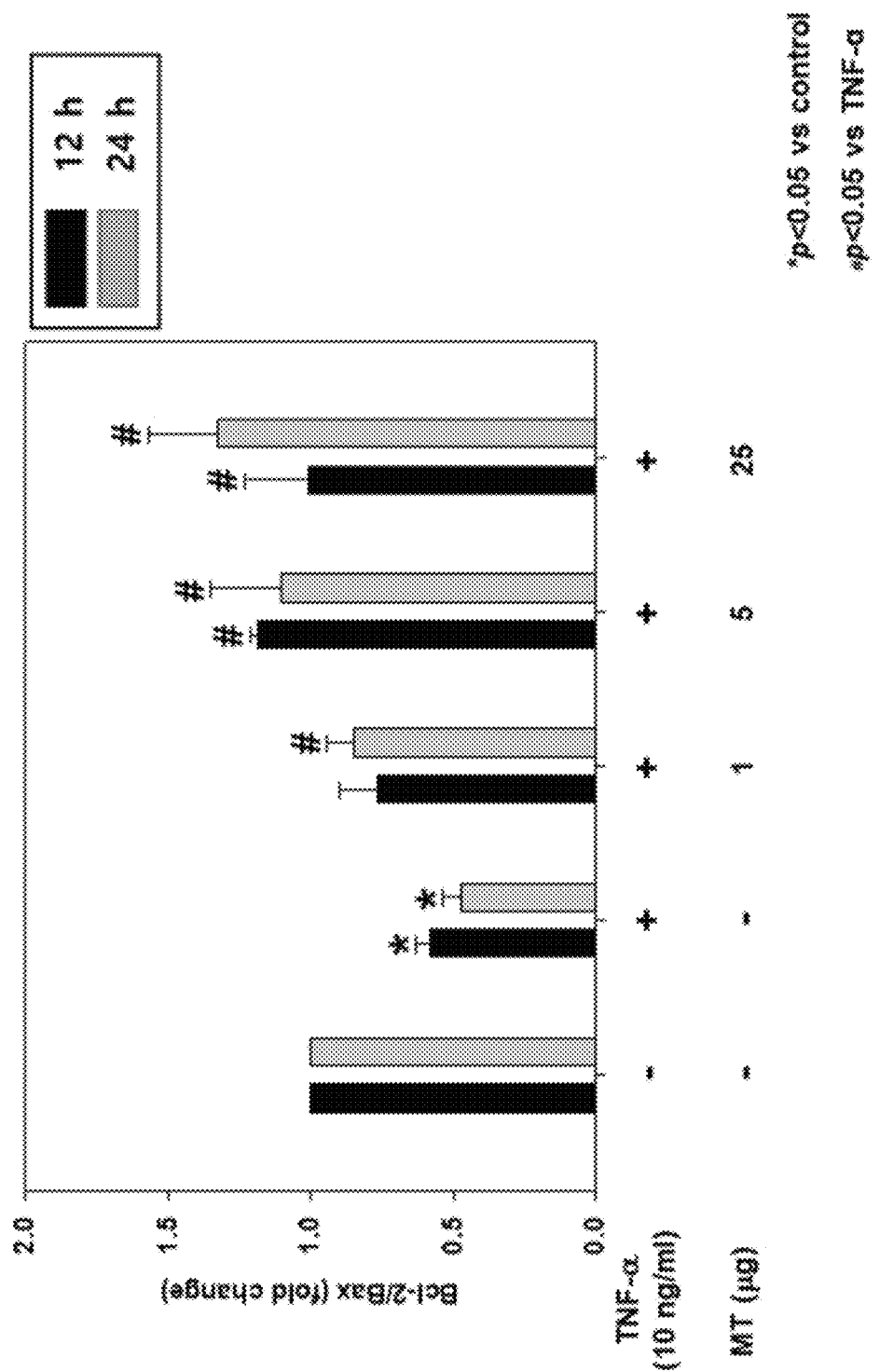

[FIG. 23]
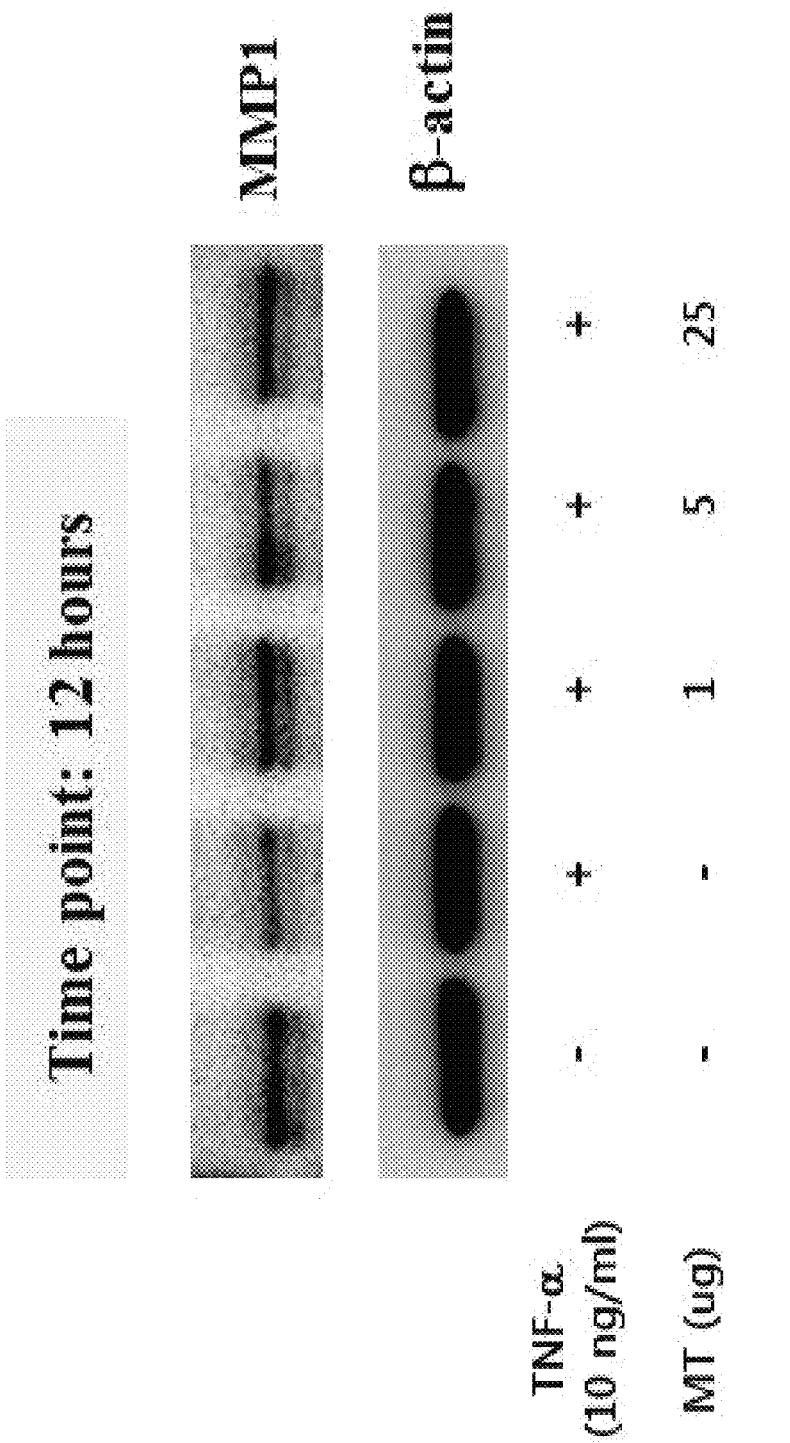

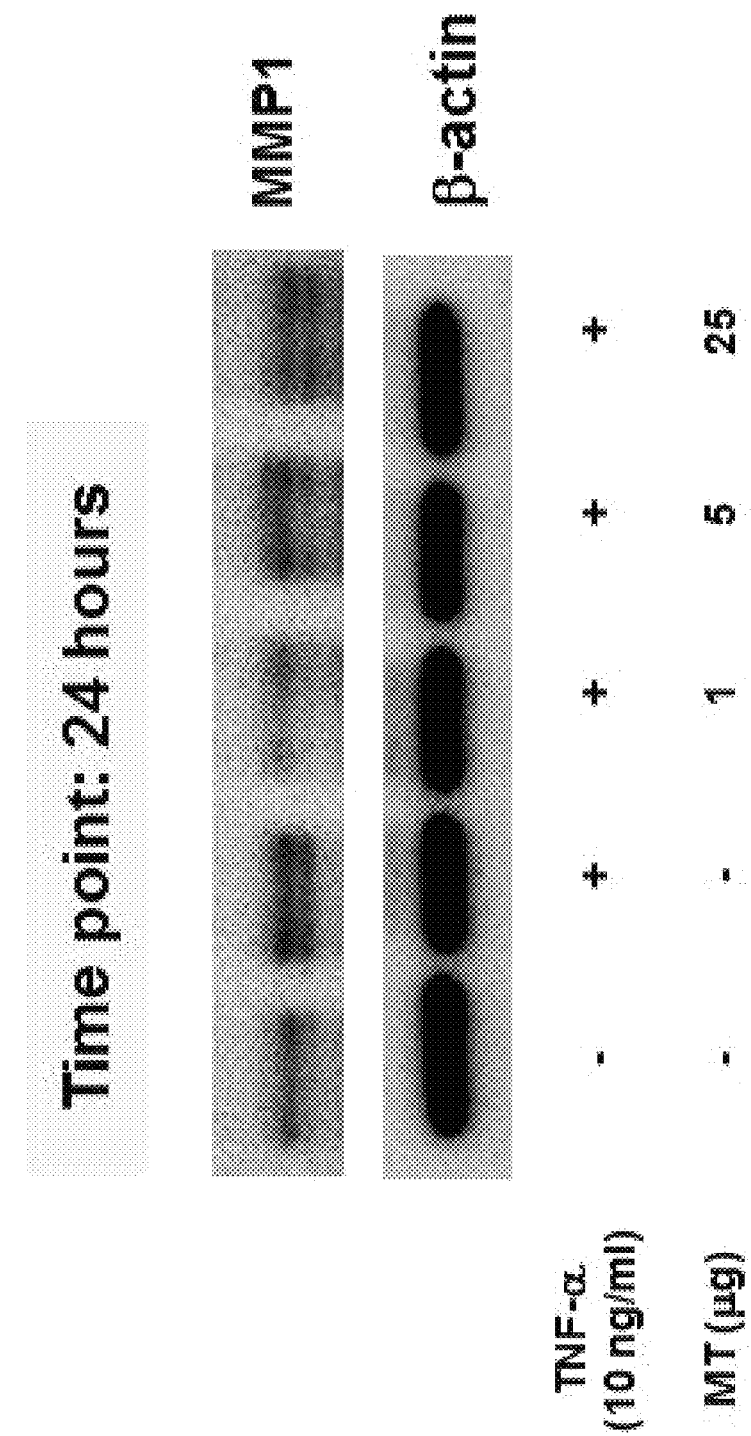
[FIG. 24]

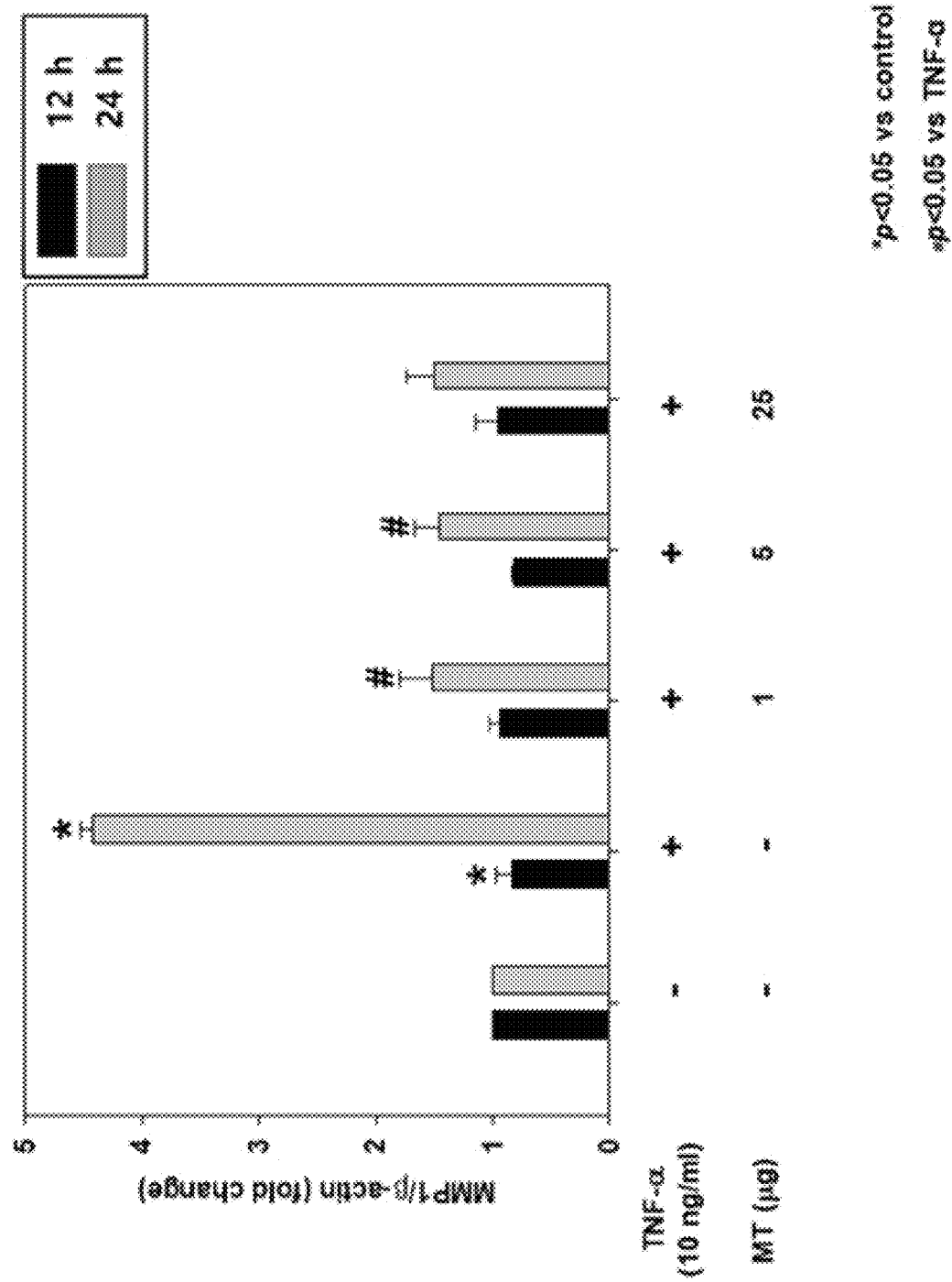
[FIG. 25]

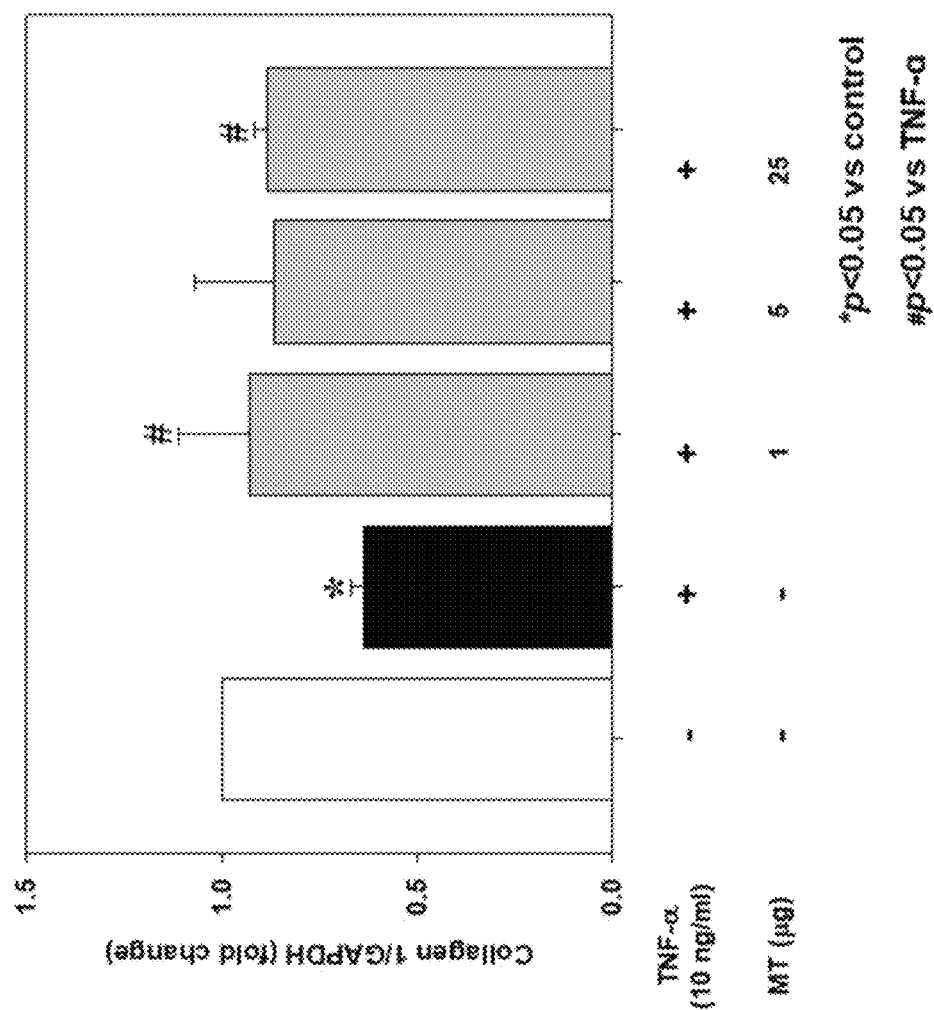
[FIG. 26]

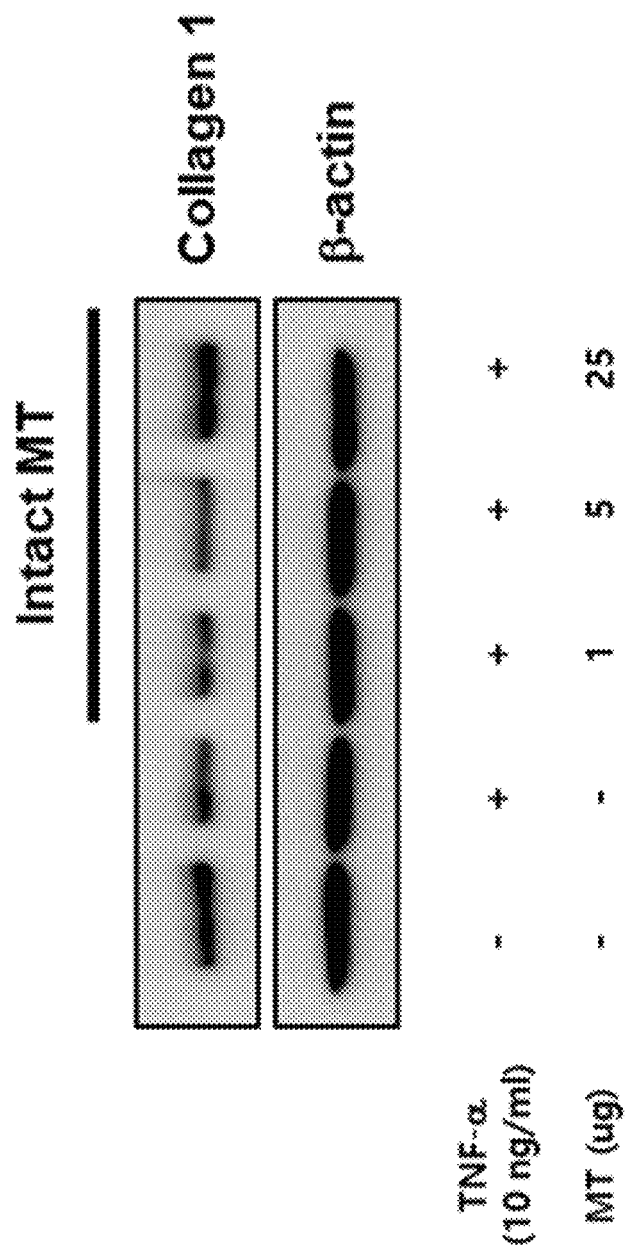
[FIG. 27]

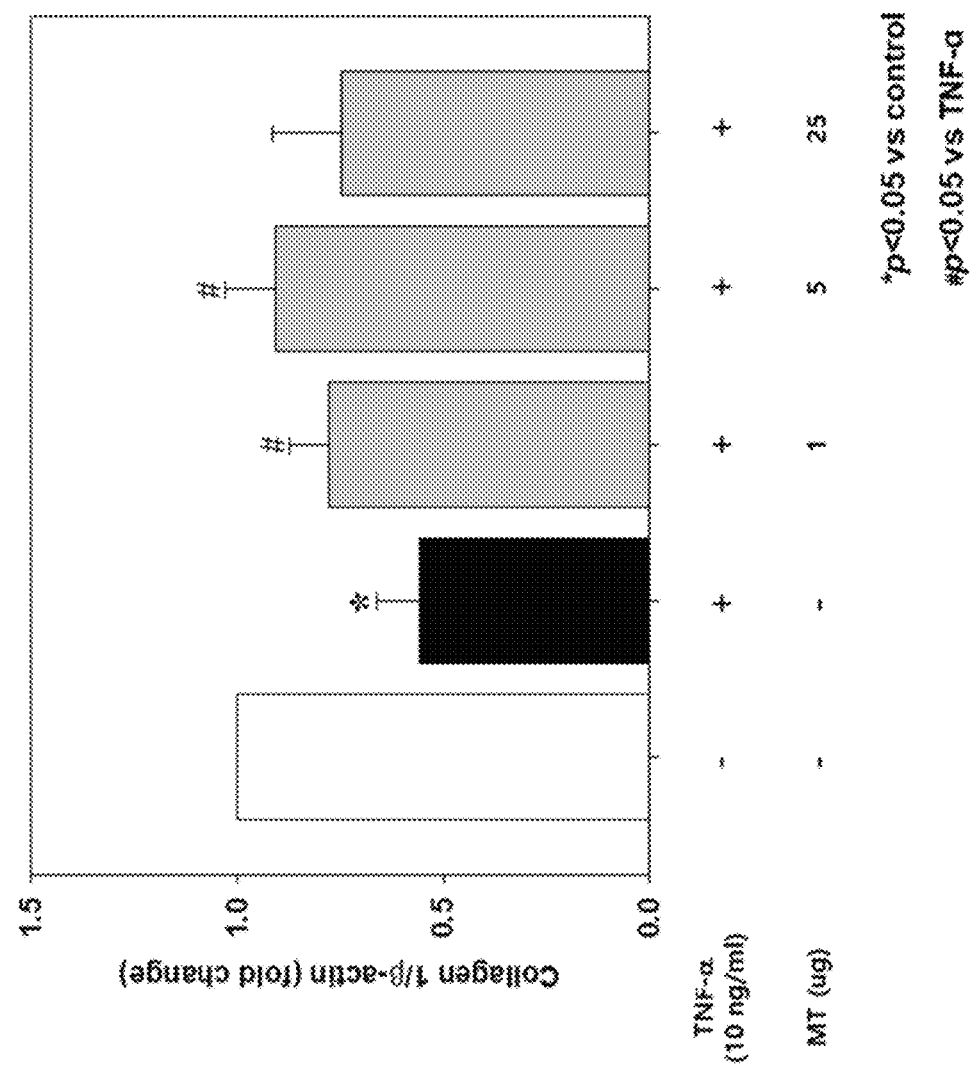
[FIG. 28]

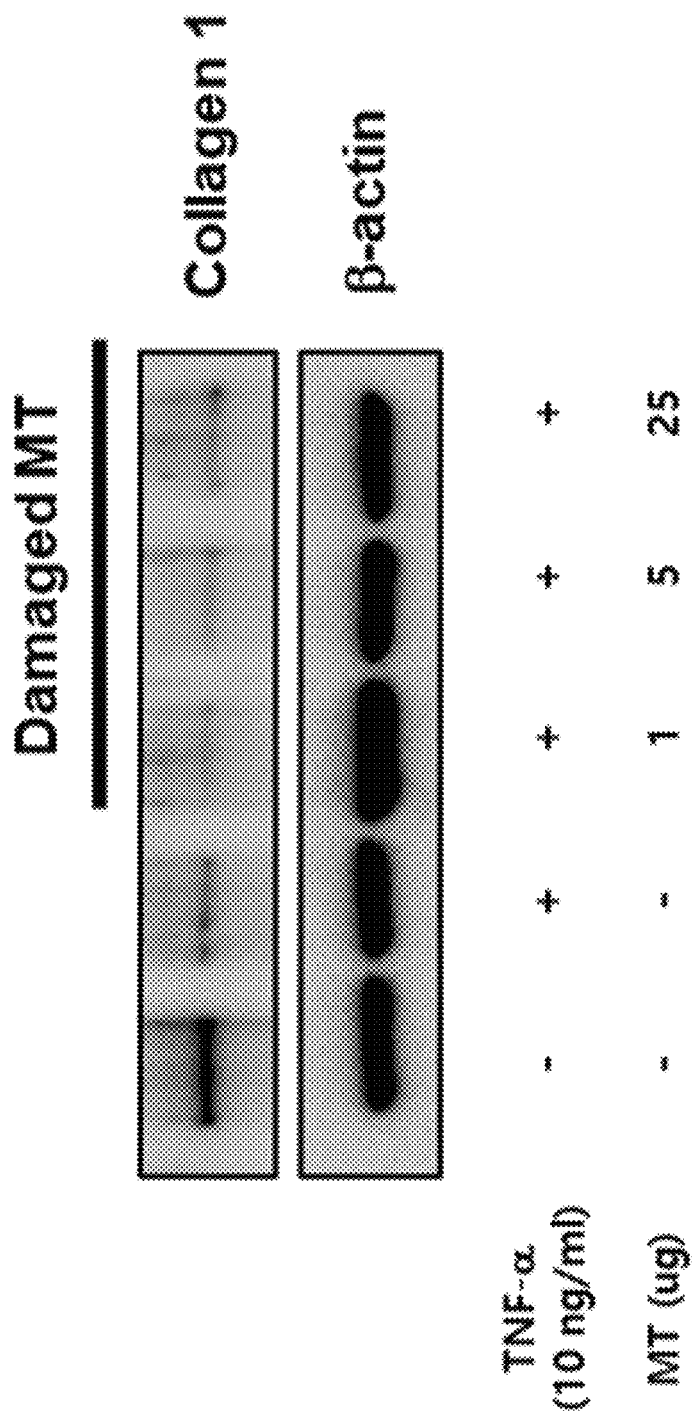
[FIG. 29]

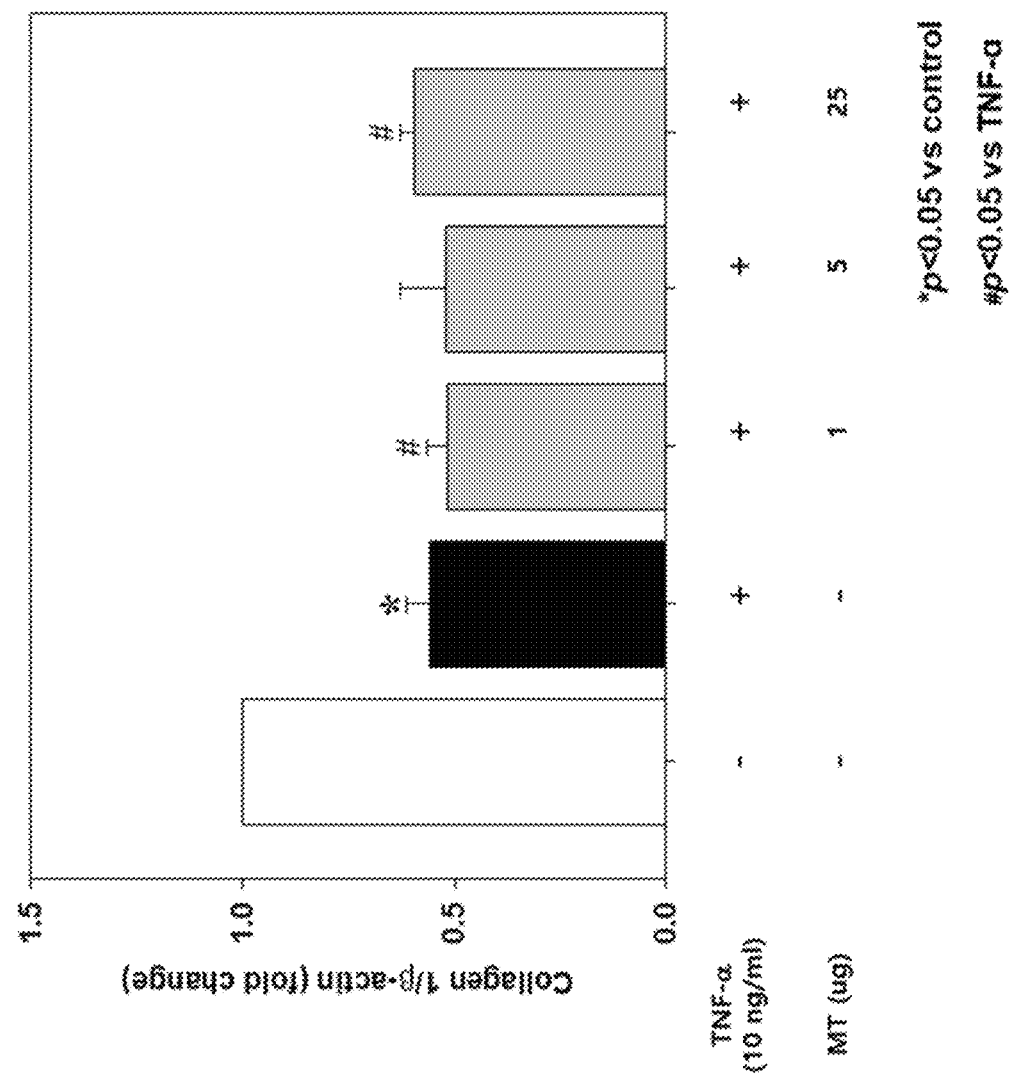
[FIG. 30]

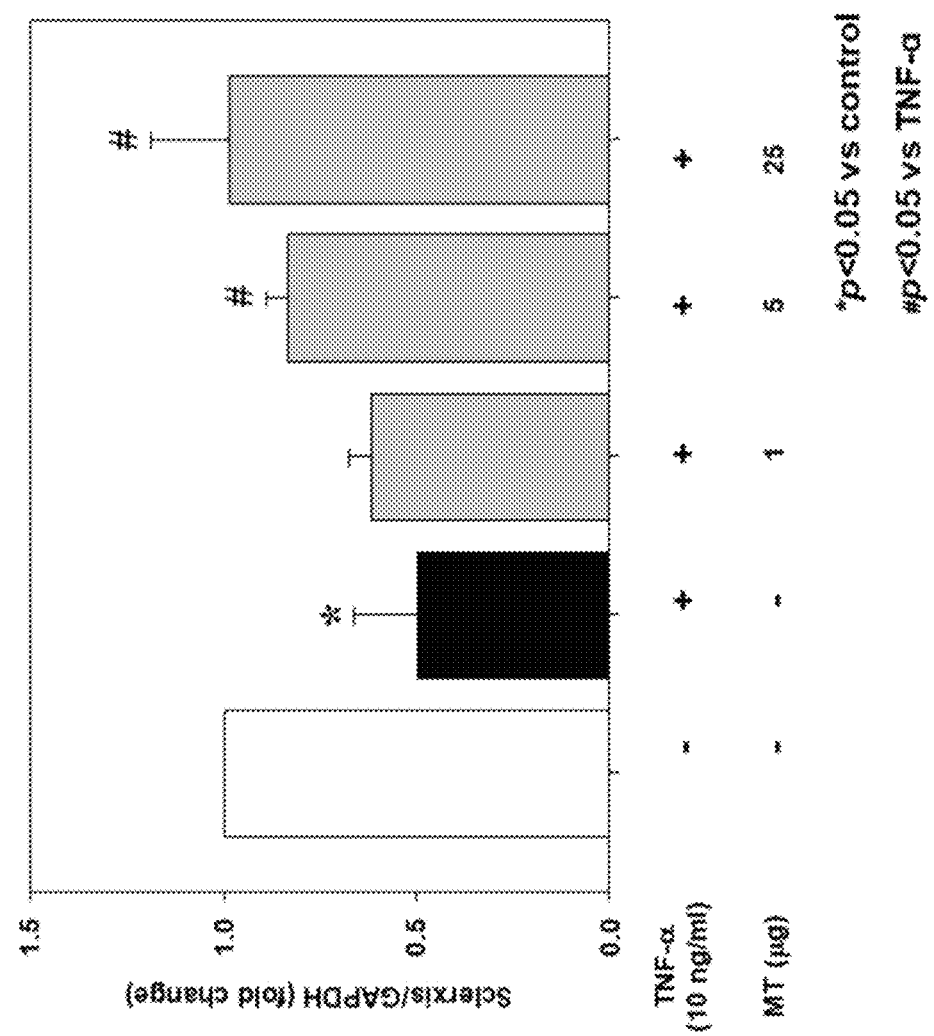
[FIG. 31]

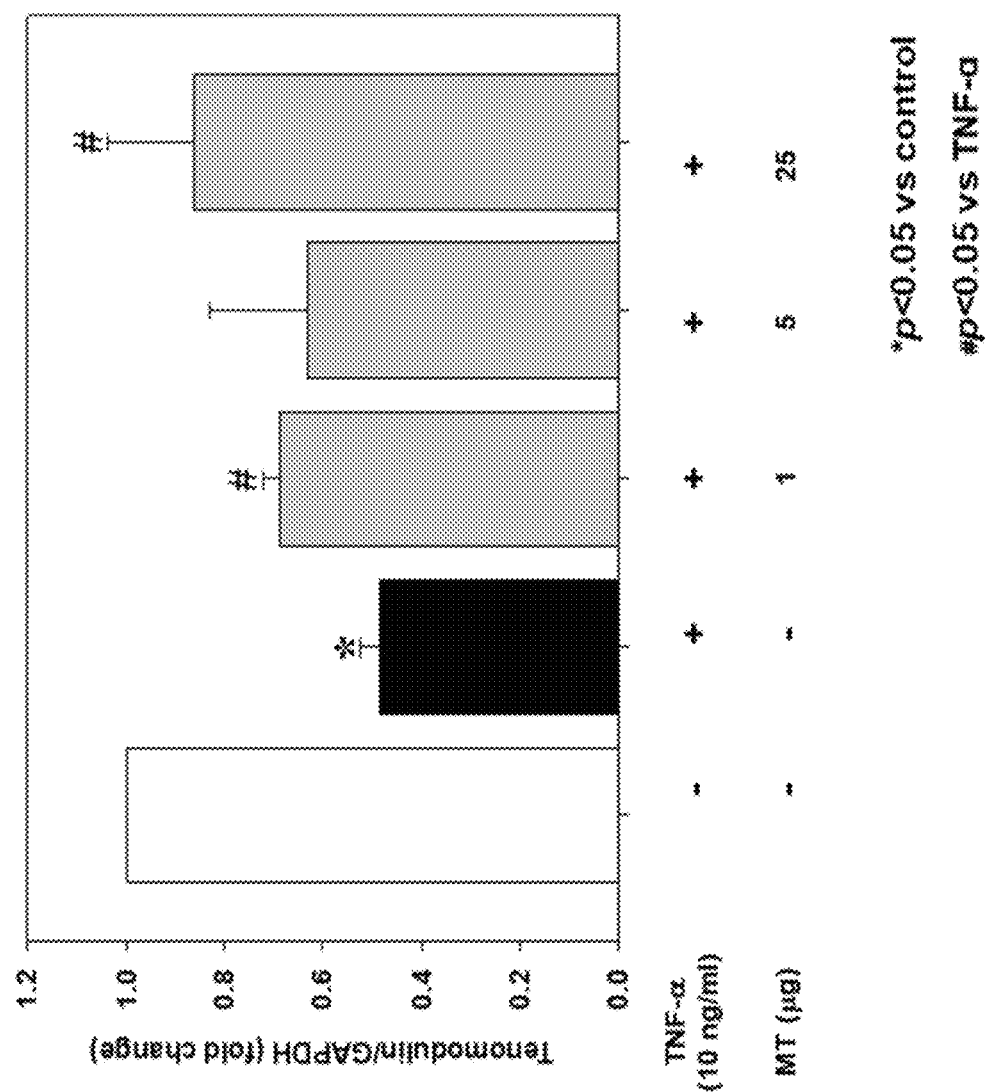
[FIG. 32]

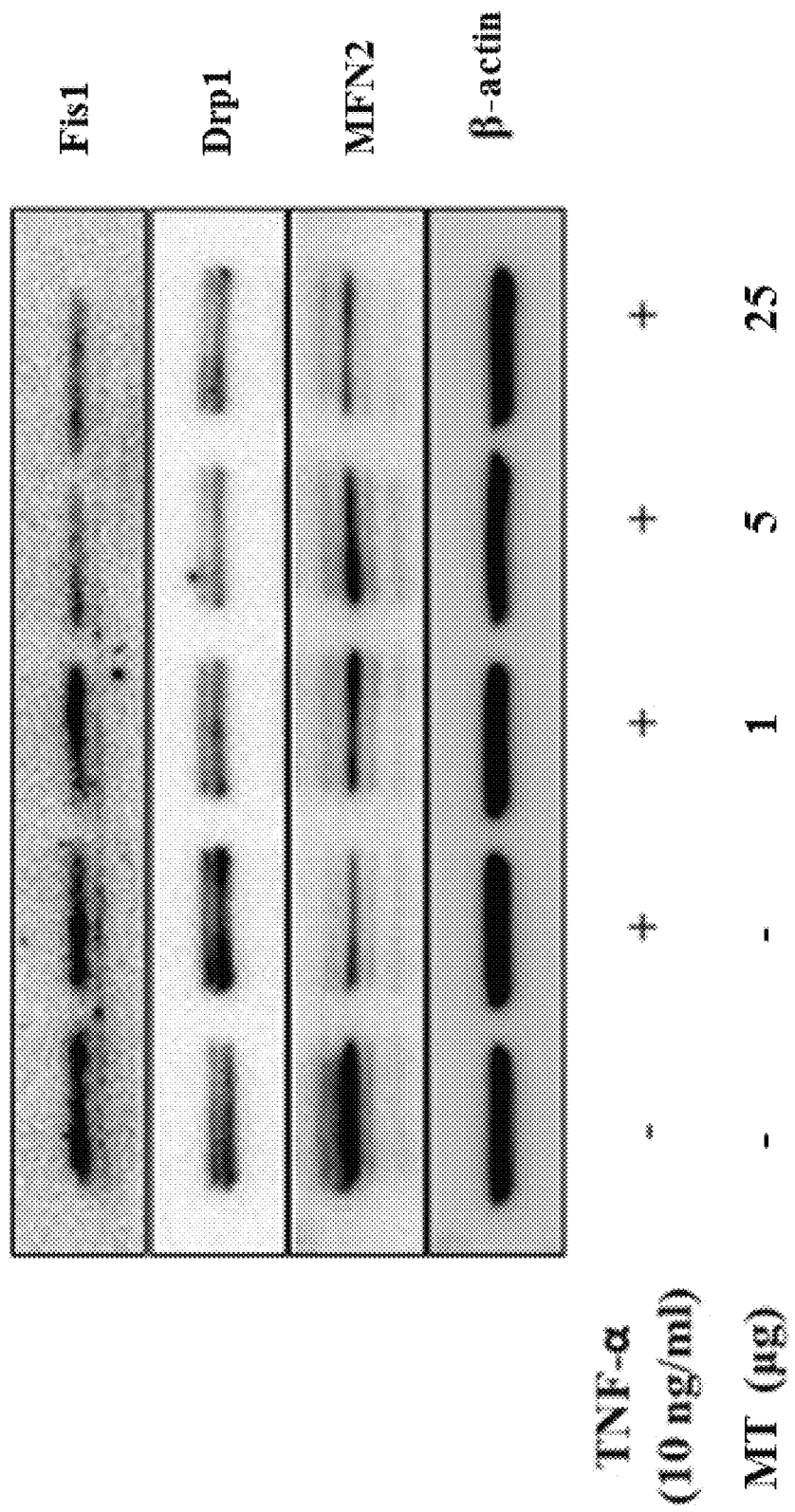
[FIG. 33]

[FIG. 34]
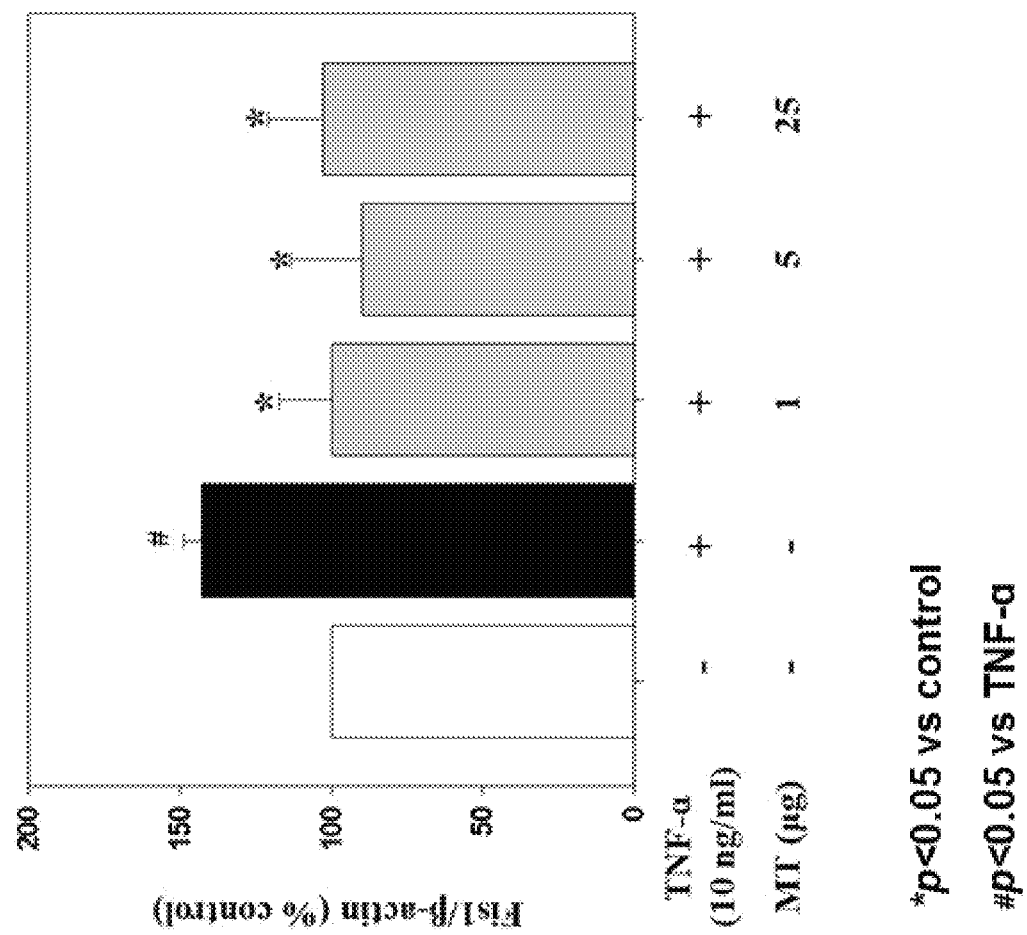

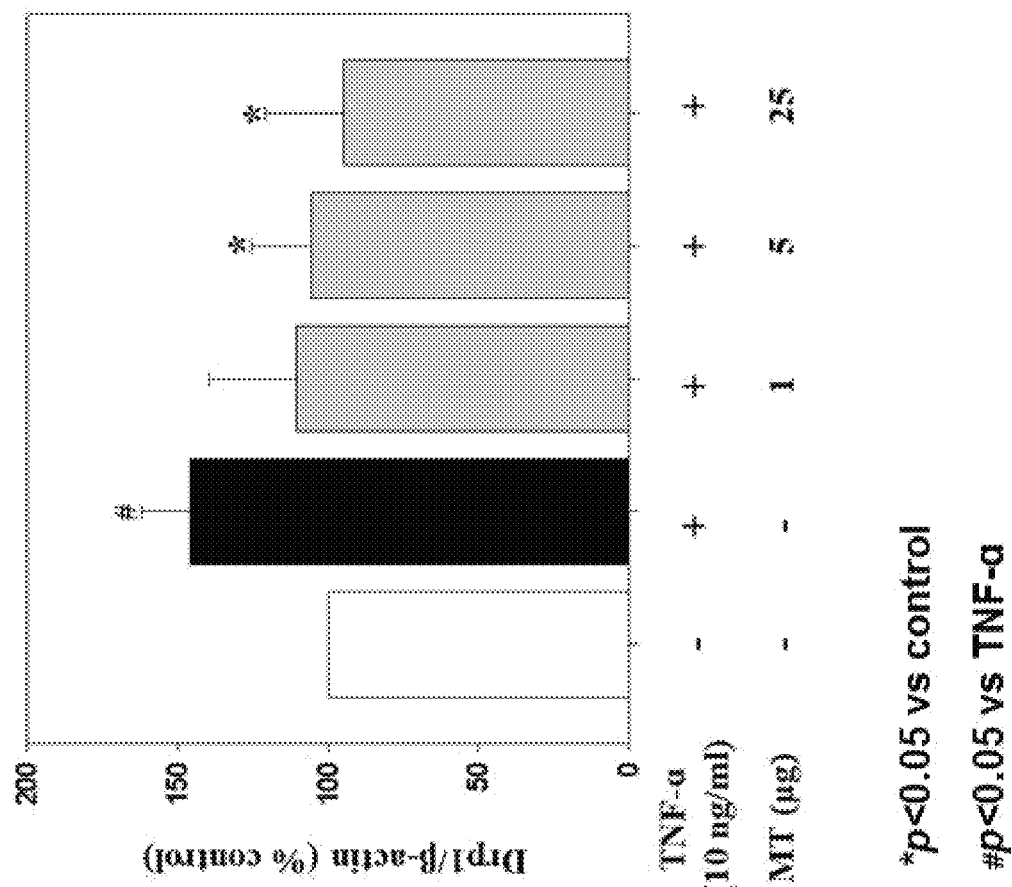
[FIG. 35]

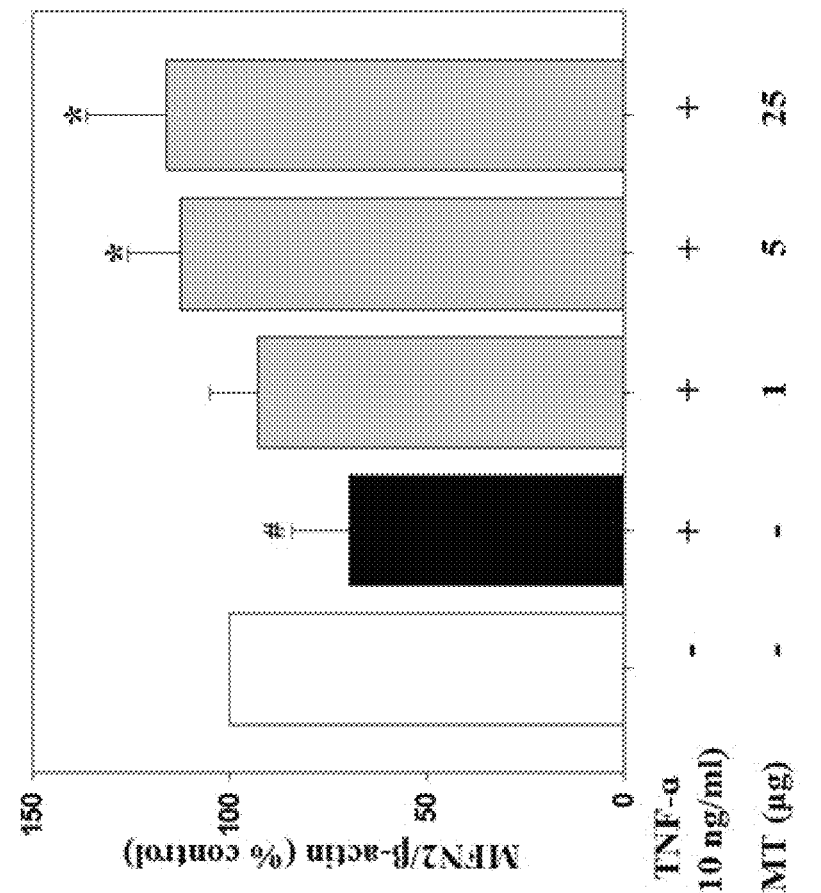
[FIG. 36]

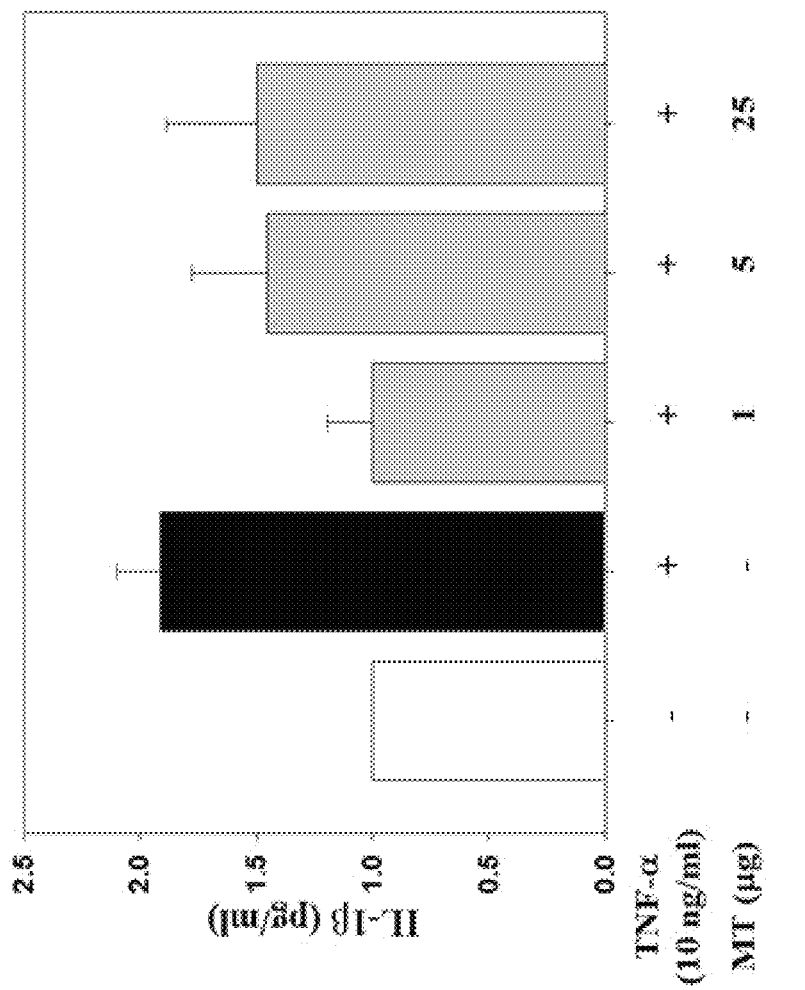
[FIG. 37]

[FIG. 38]
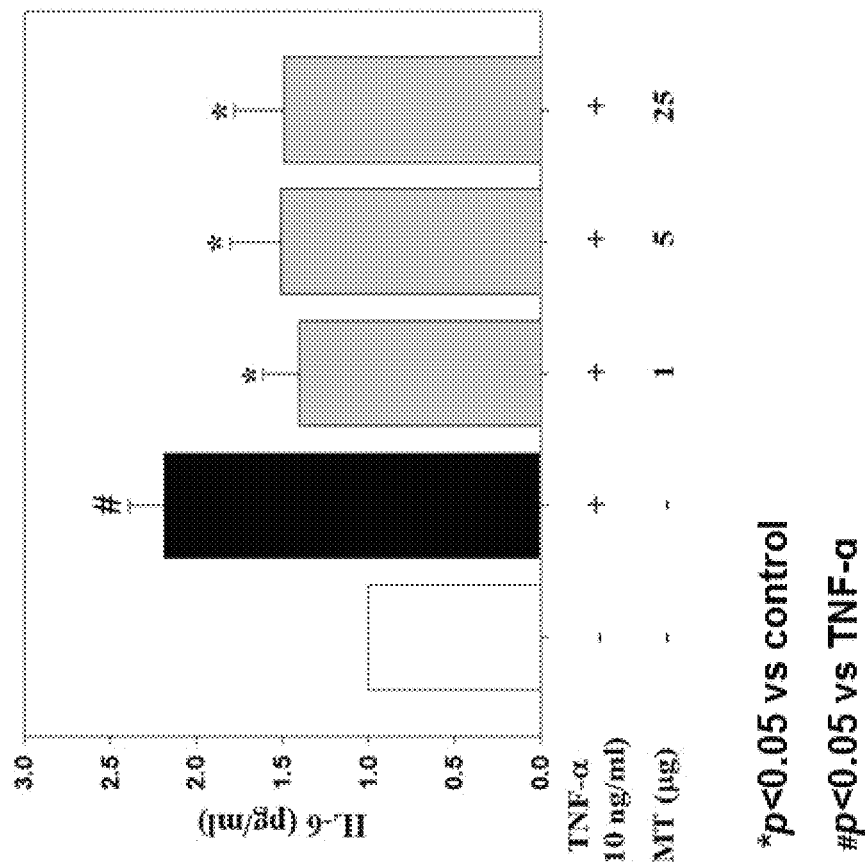

[FIG. 39]
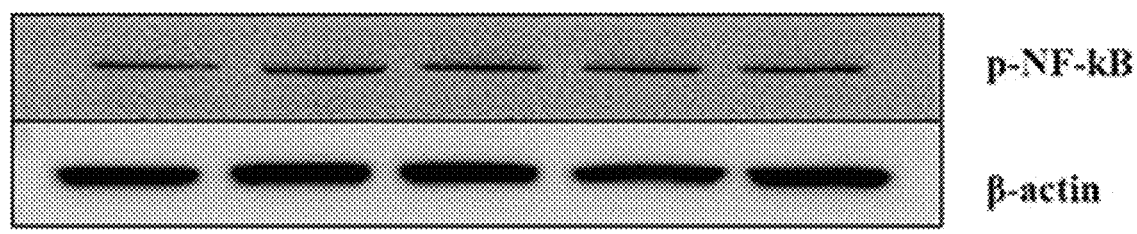
[FIG. 40]
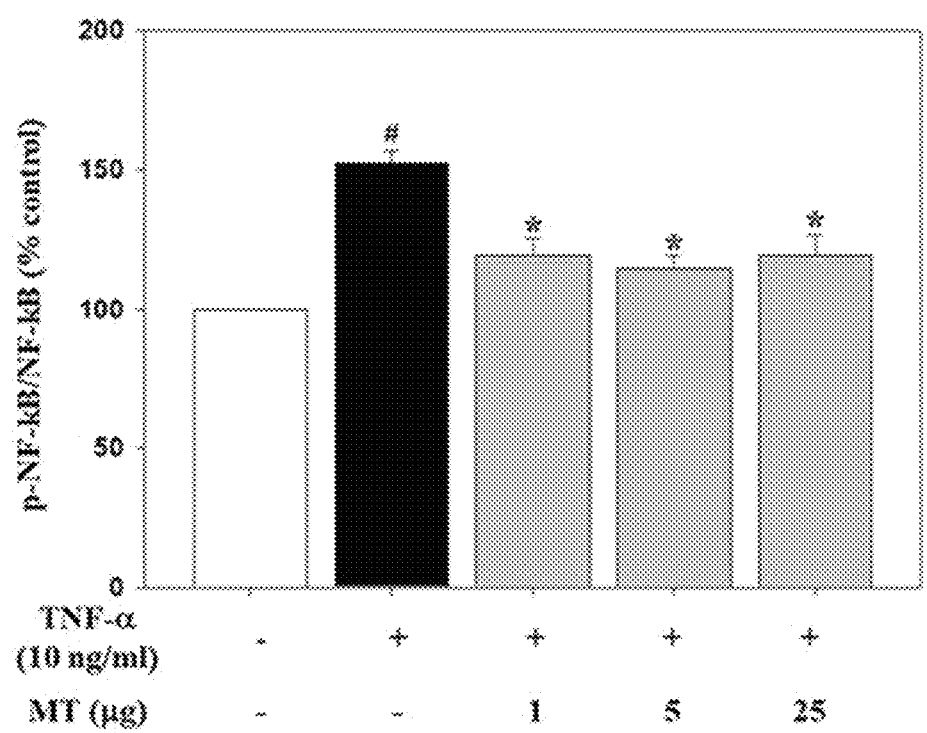
*$p<0.05$ vs control
$p<0.05$ vs TNF-α

[FIG. 41]
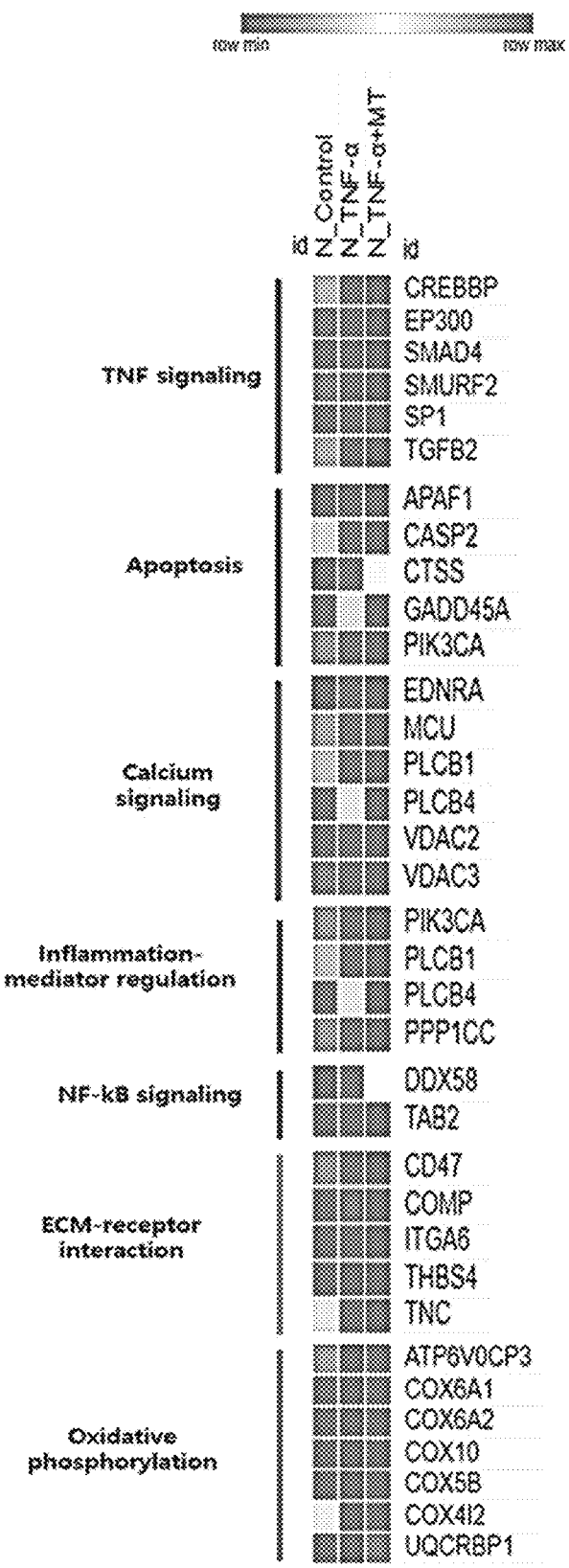

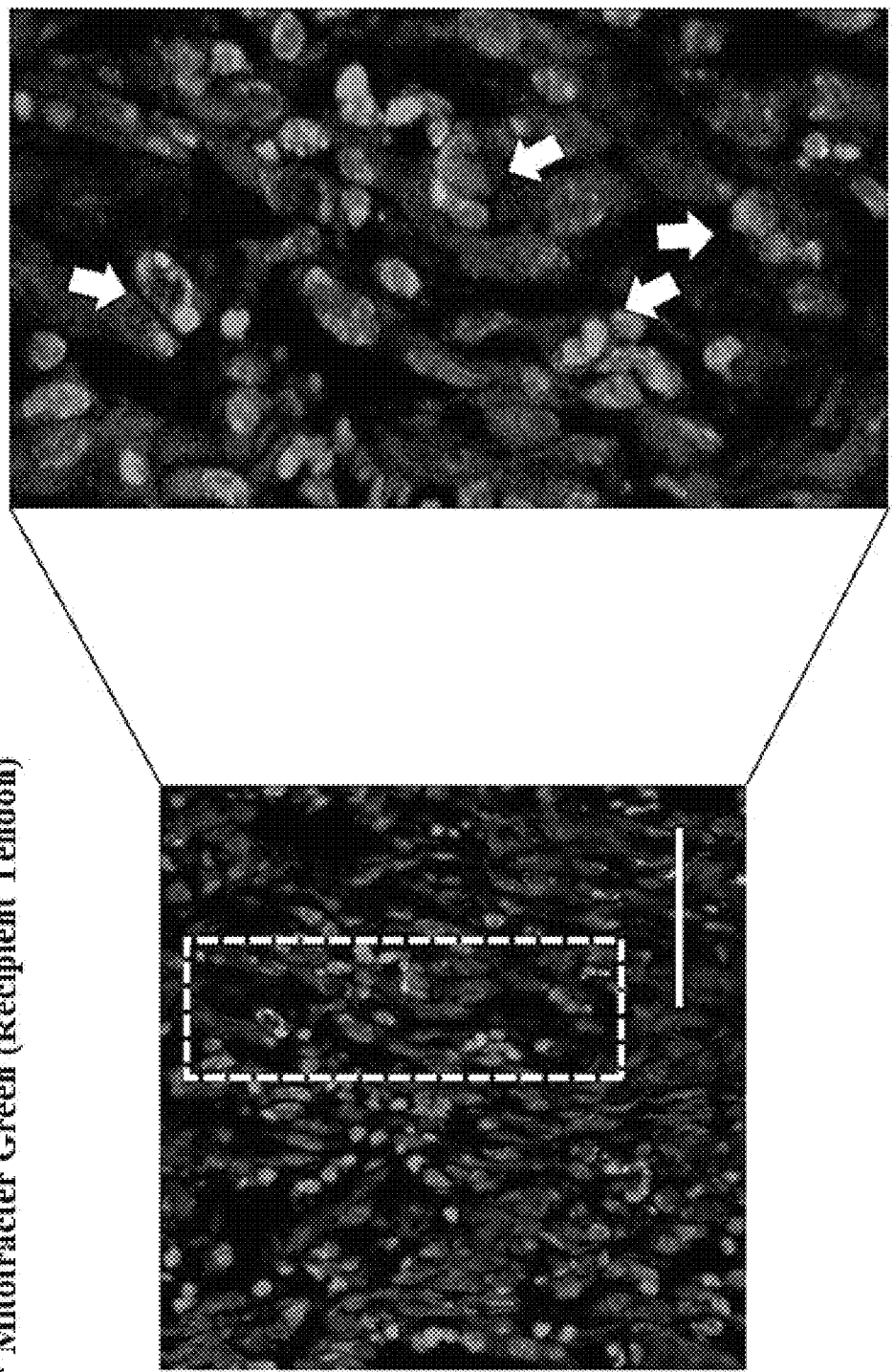
[FIG. 42]

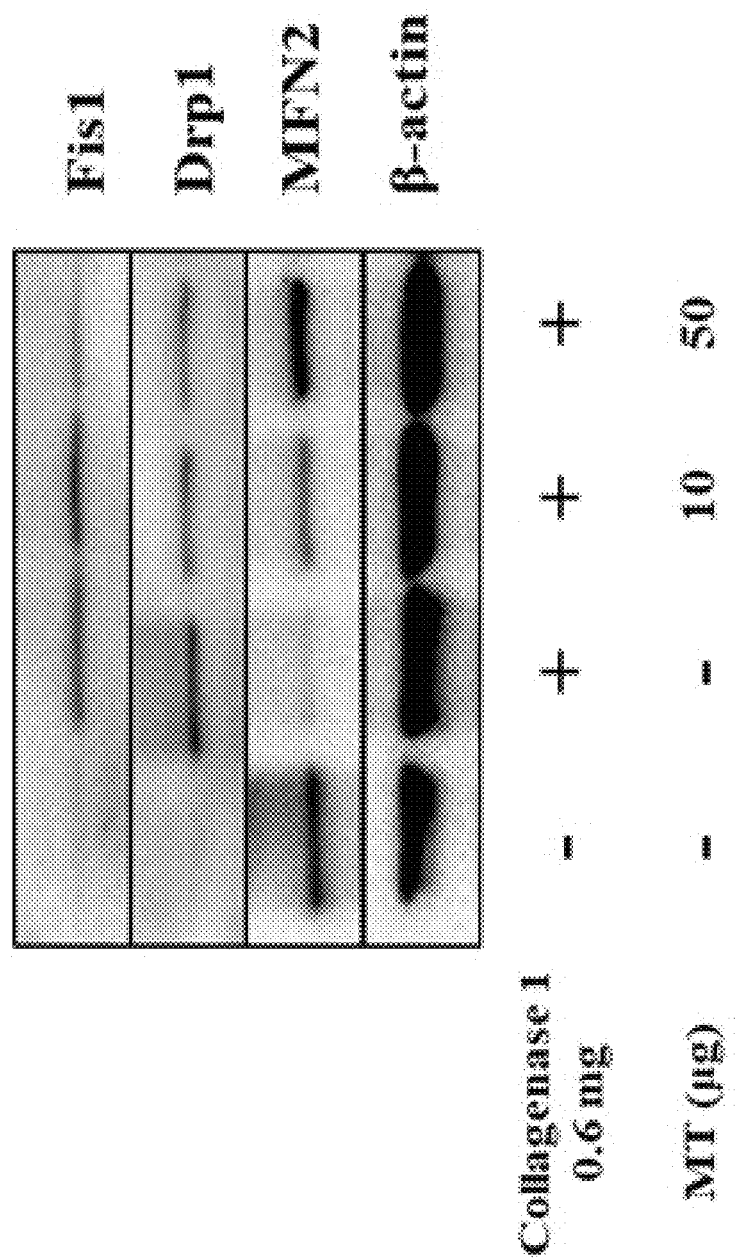
[FIG. 43]

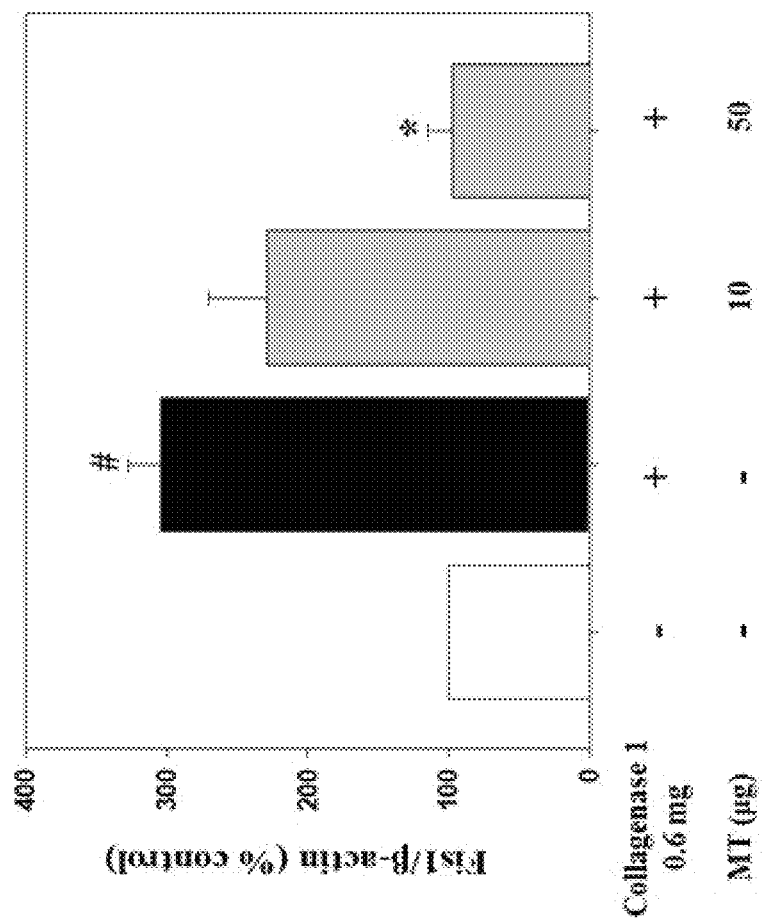
[FIG. 44]

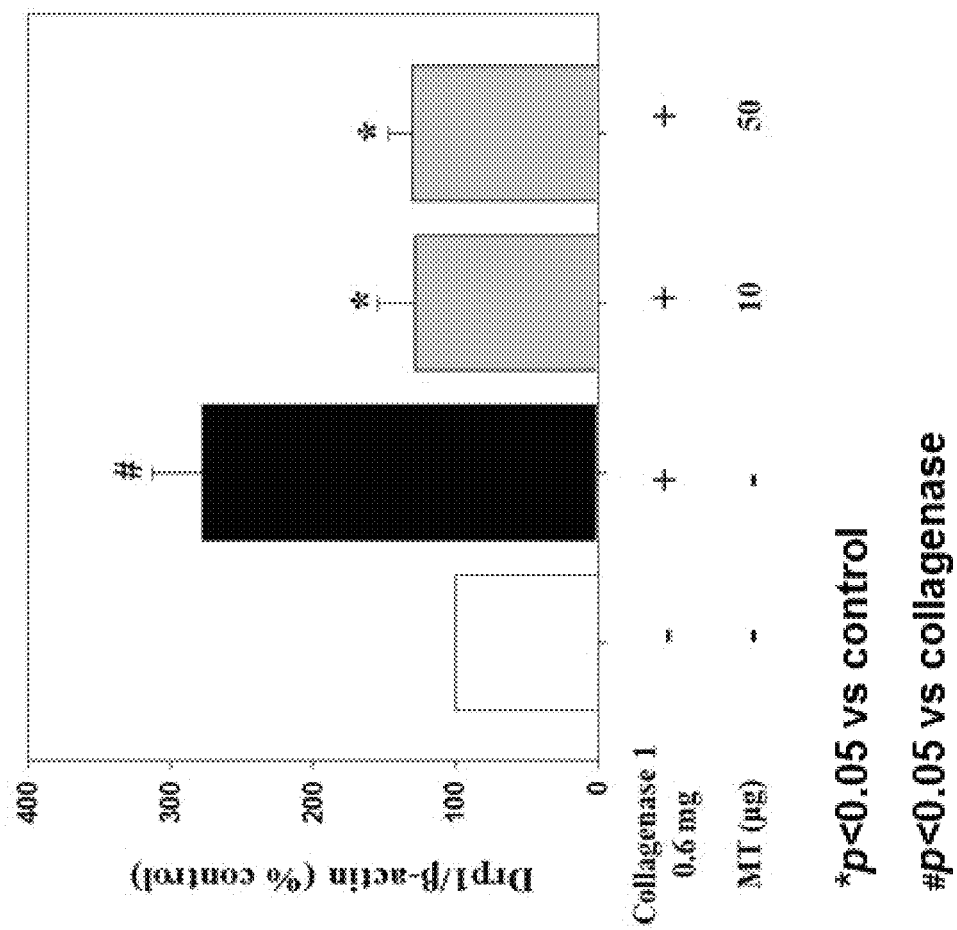
[FIG. 45]

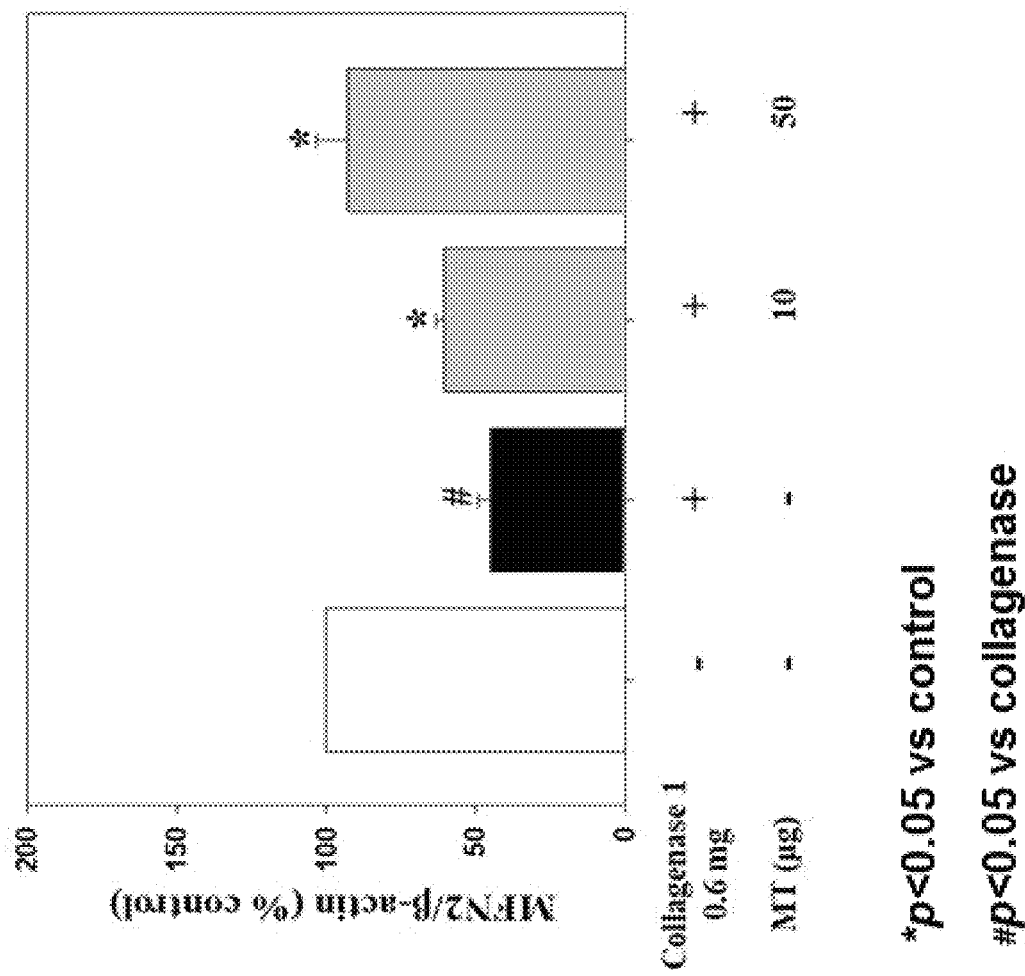
[FIG. 46]

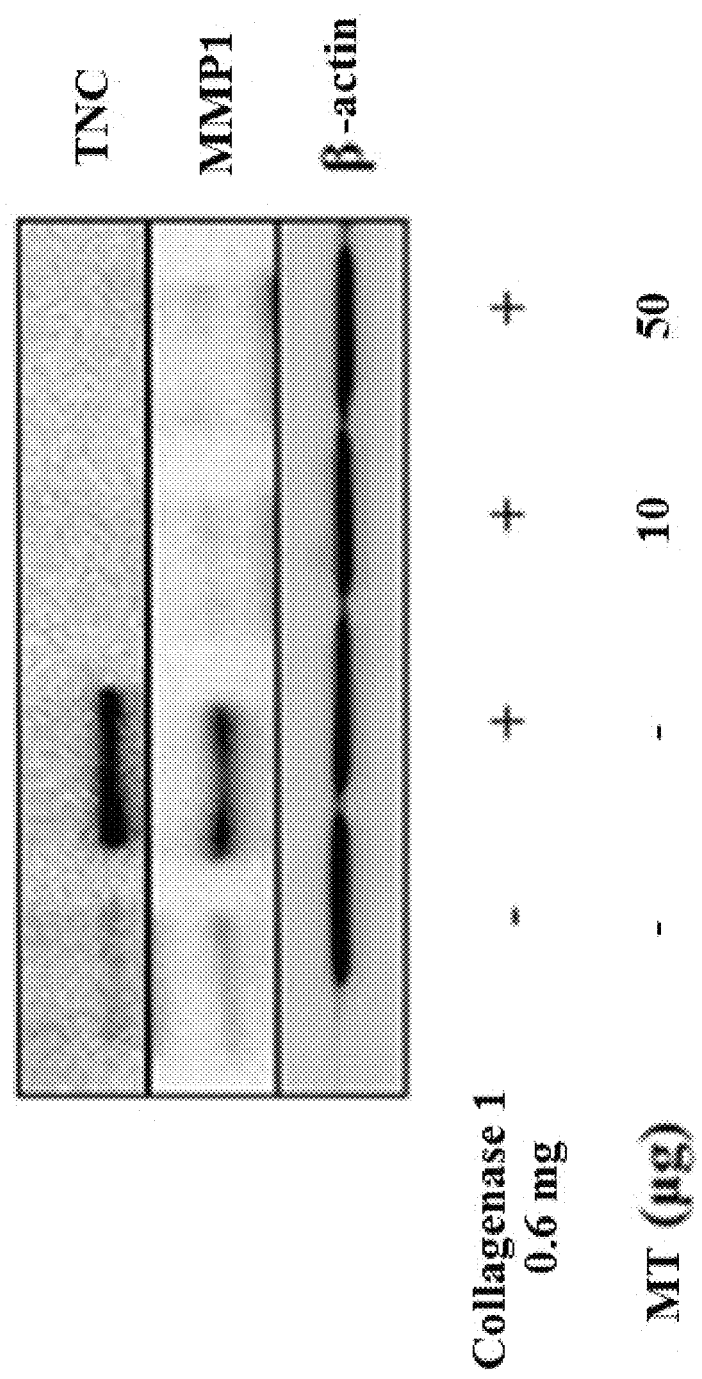
[FIG. 47]

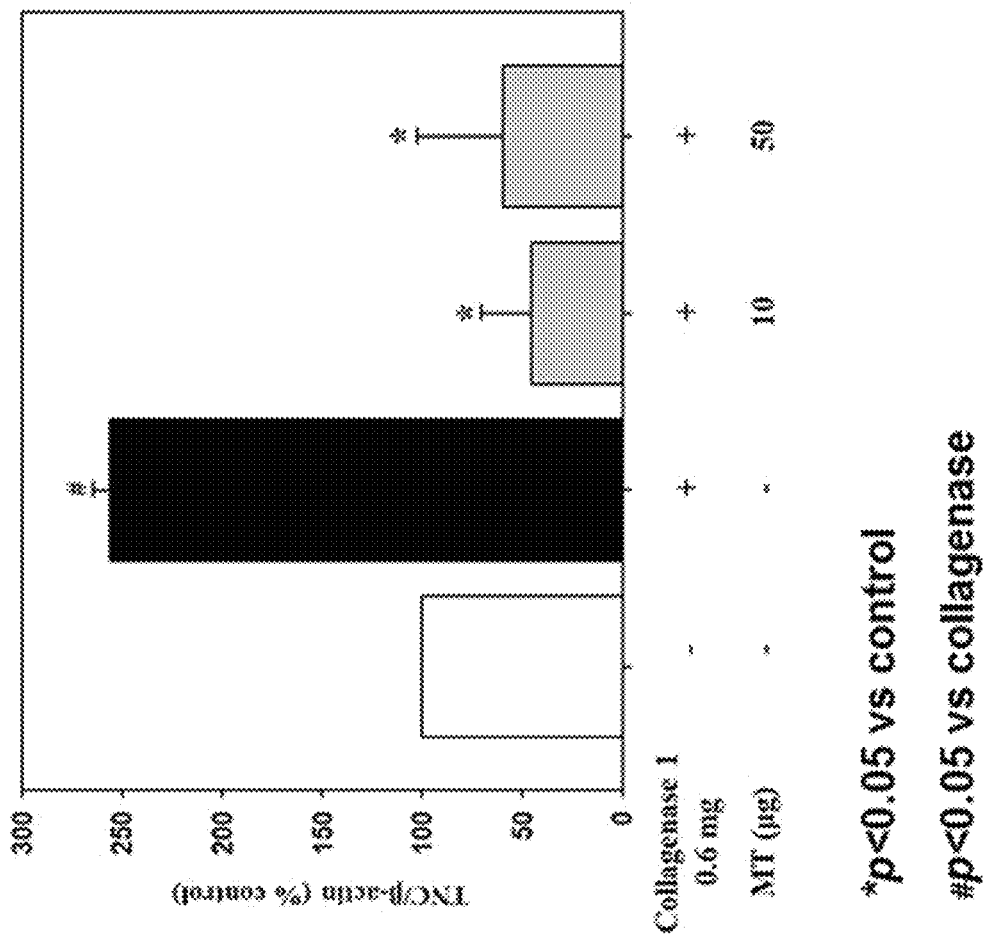
[FIG. 48]

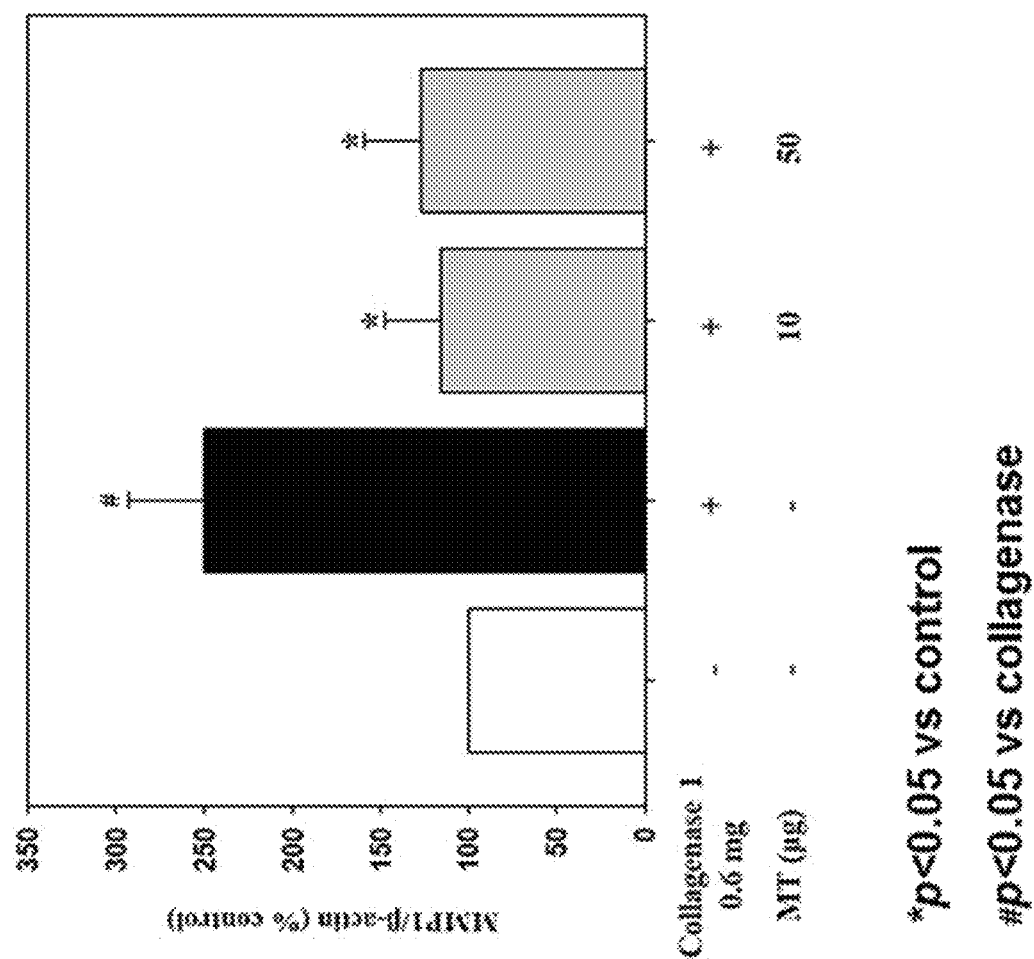
[FIG. 49]

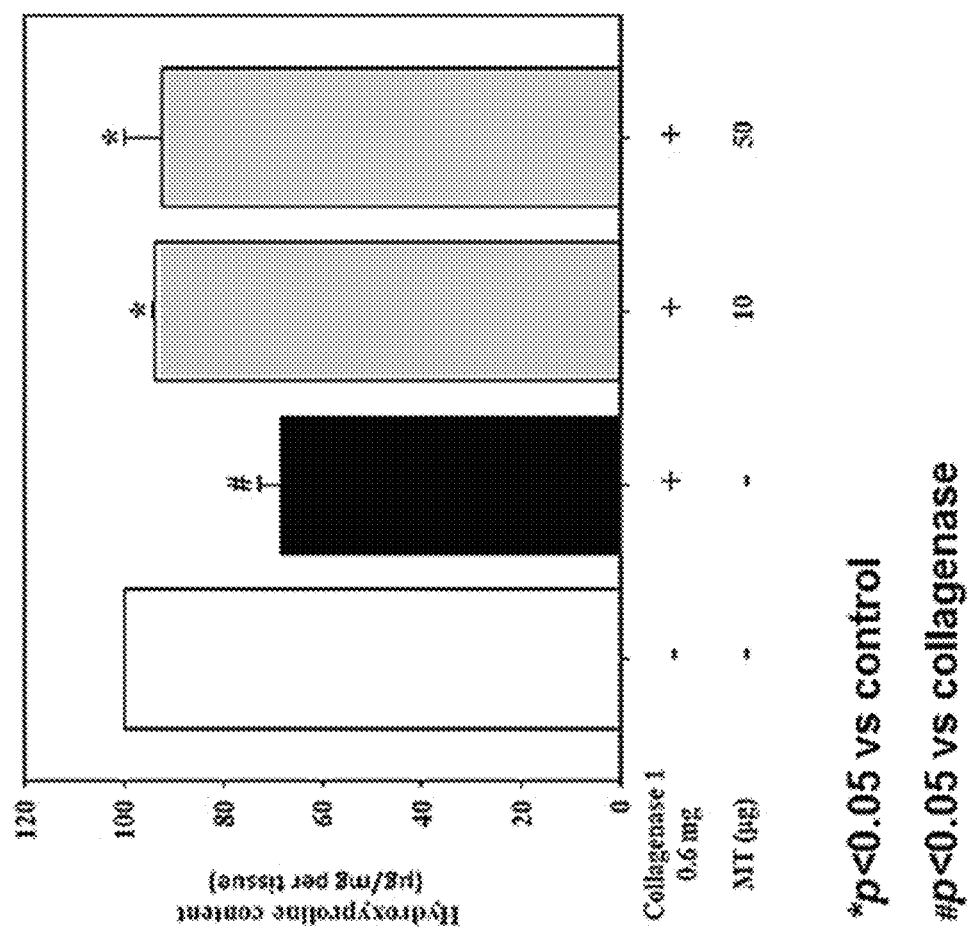
[FIG. 50]

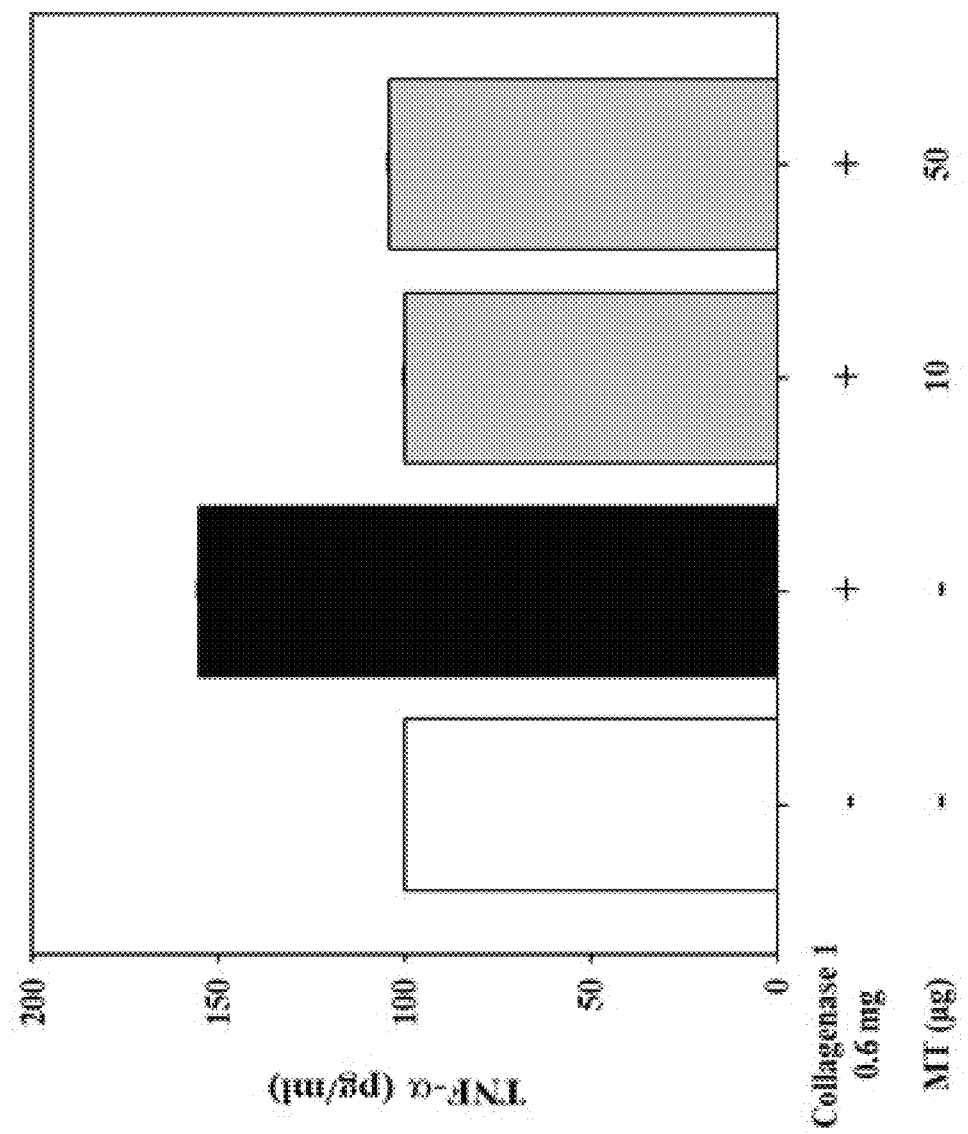
[FIG. 51]

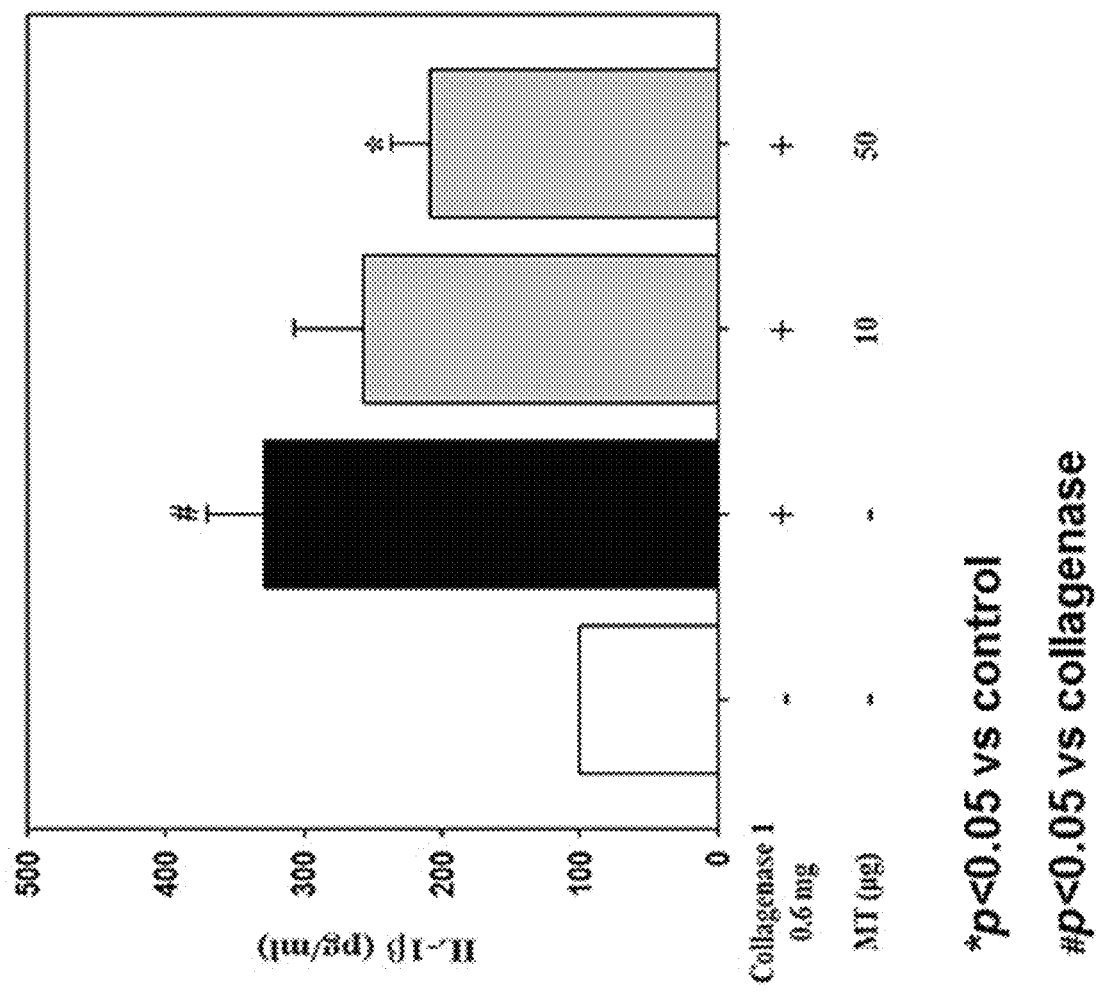
[FIG. 52]

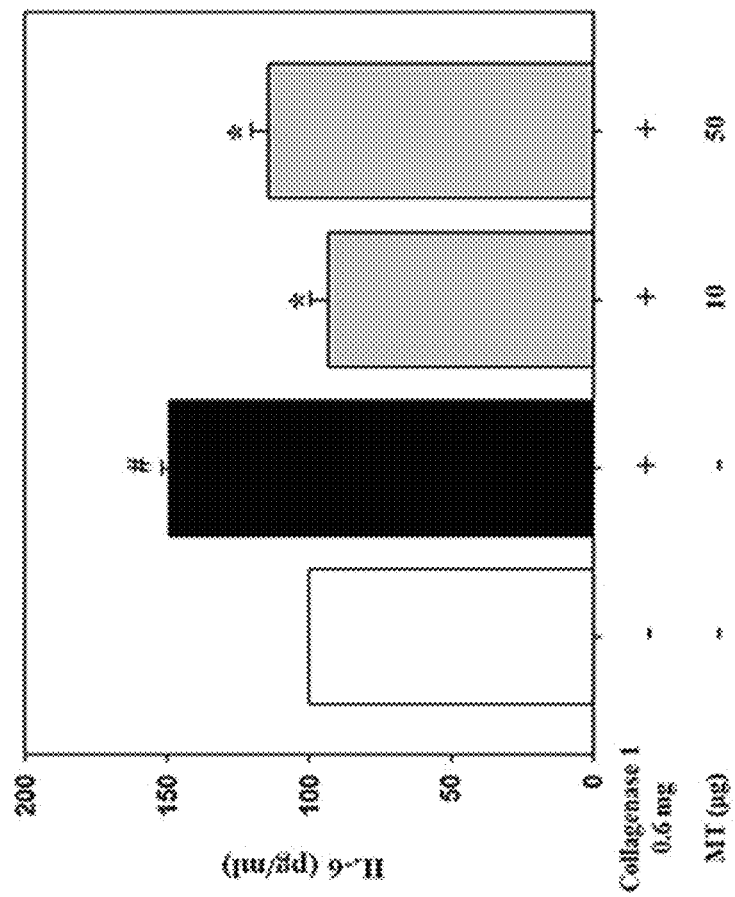
[FIG. 53]

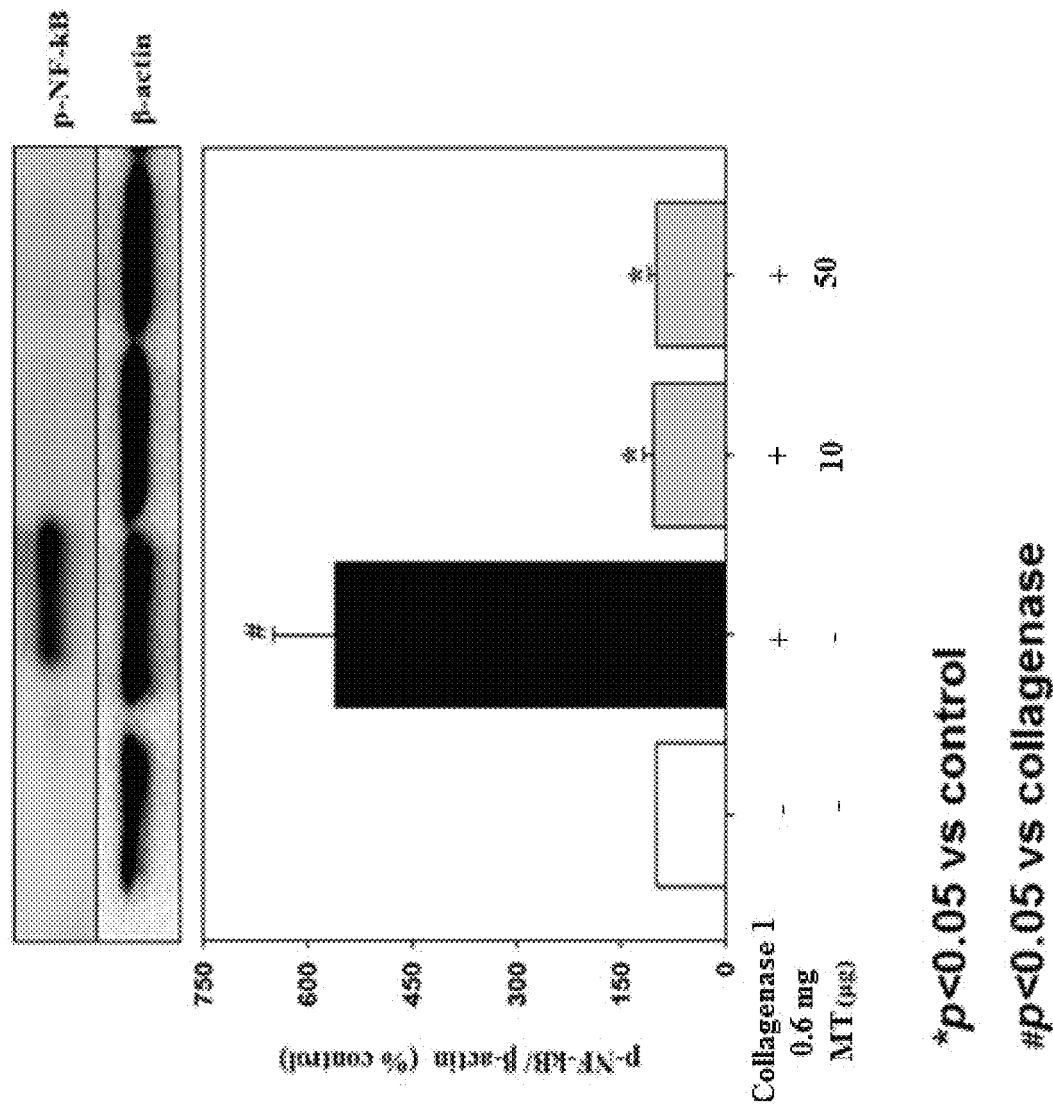
[FIG. 54]

[FIG. 55]
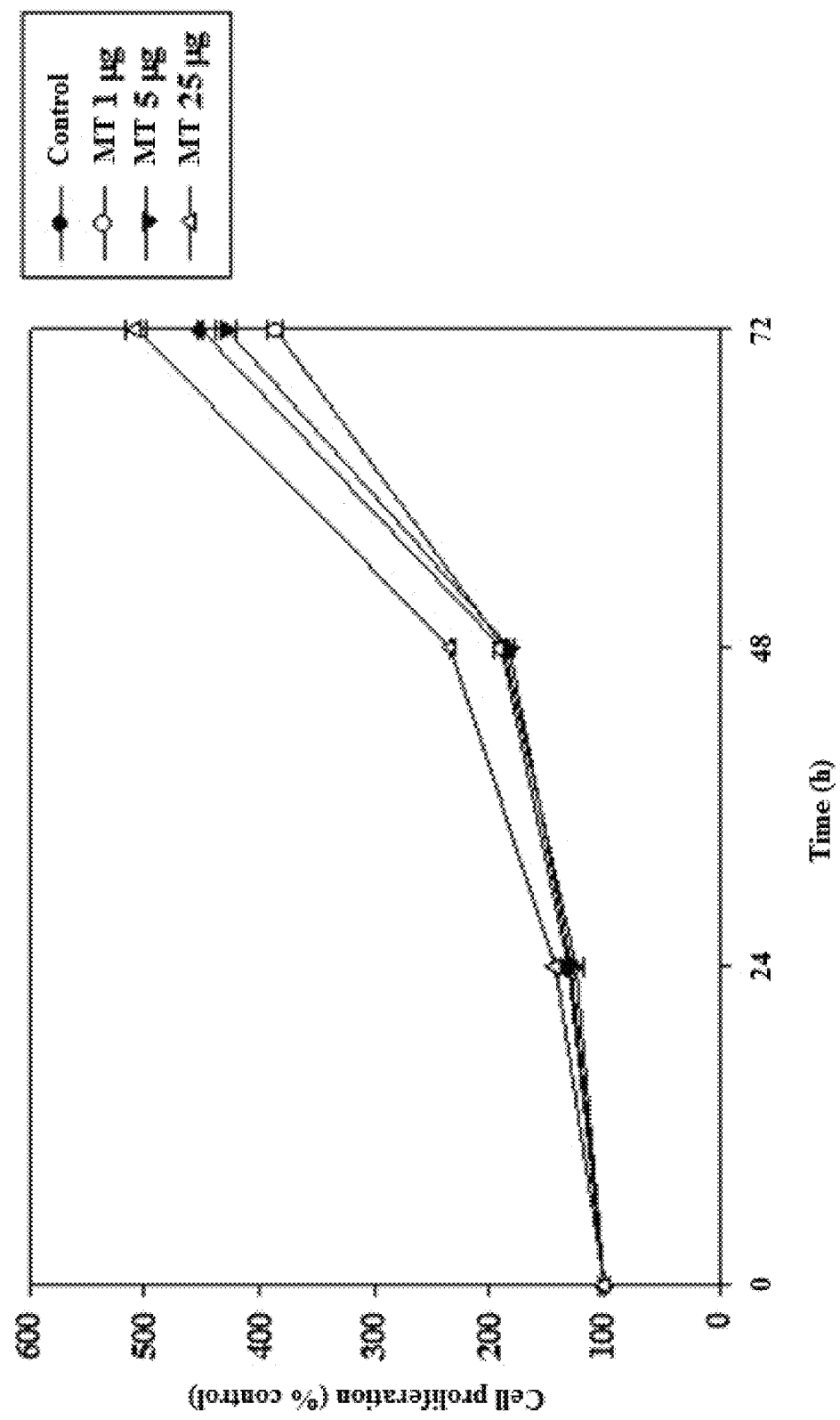

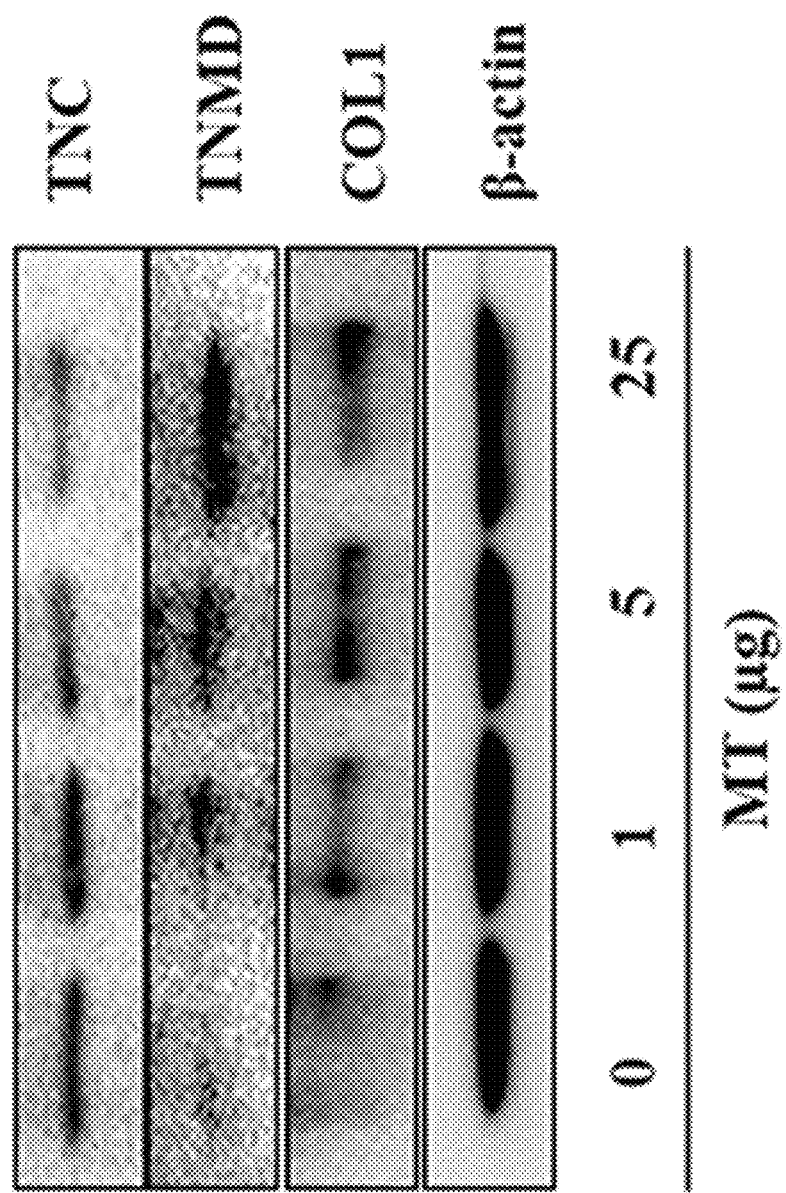
[FIG. 56]

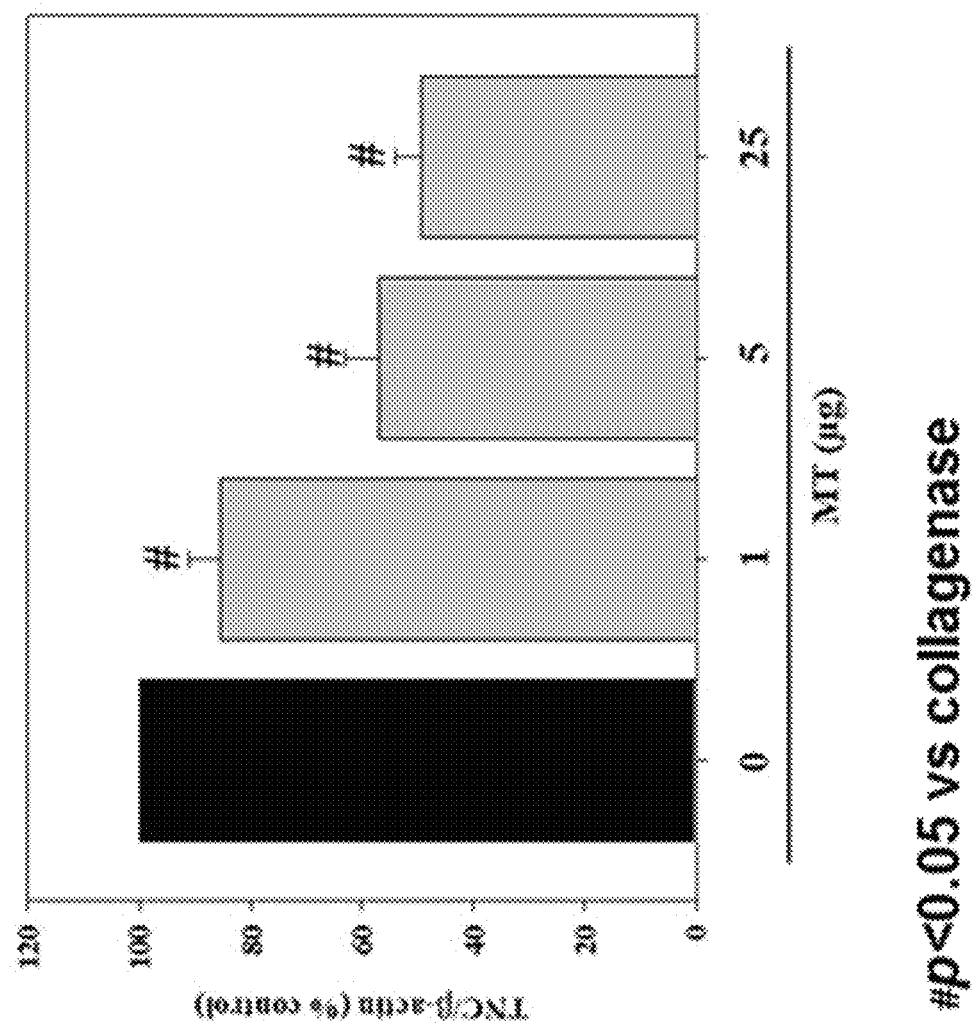
[FIG. 57]

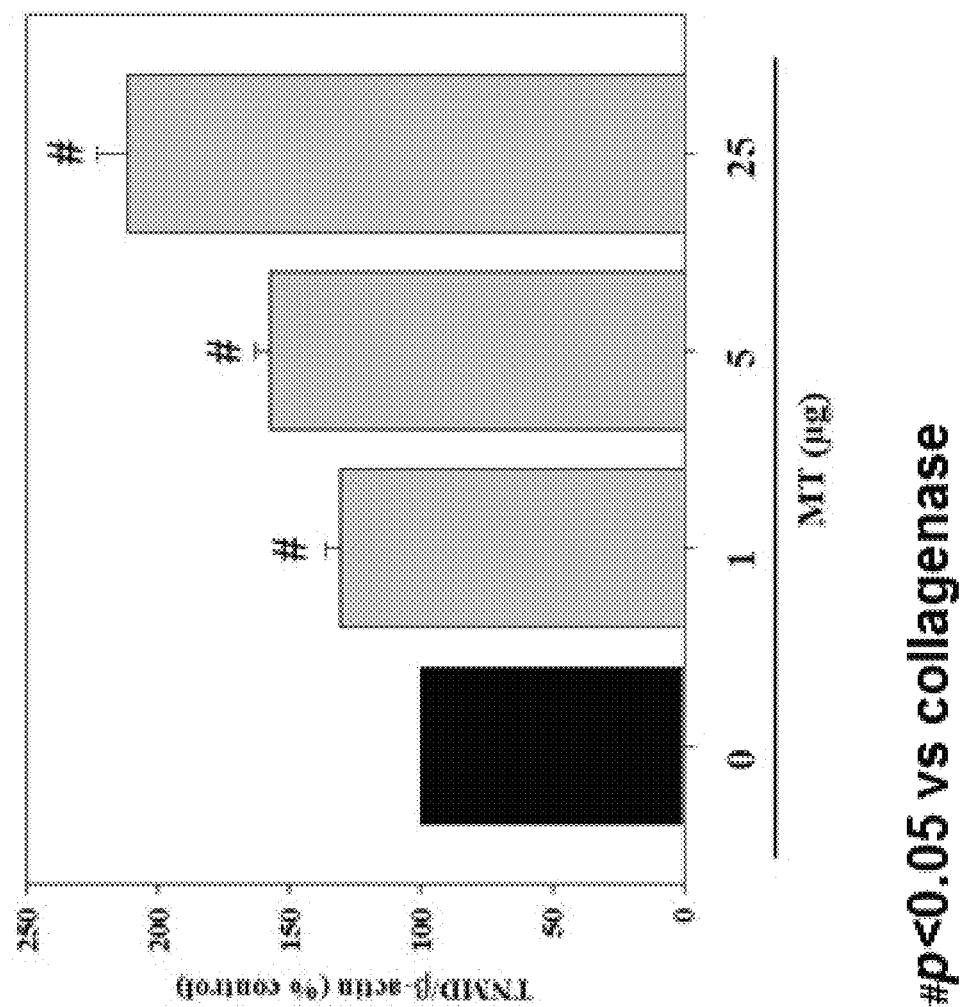
[FIG. 58]

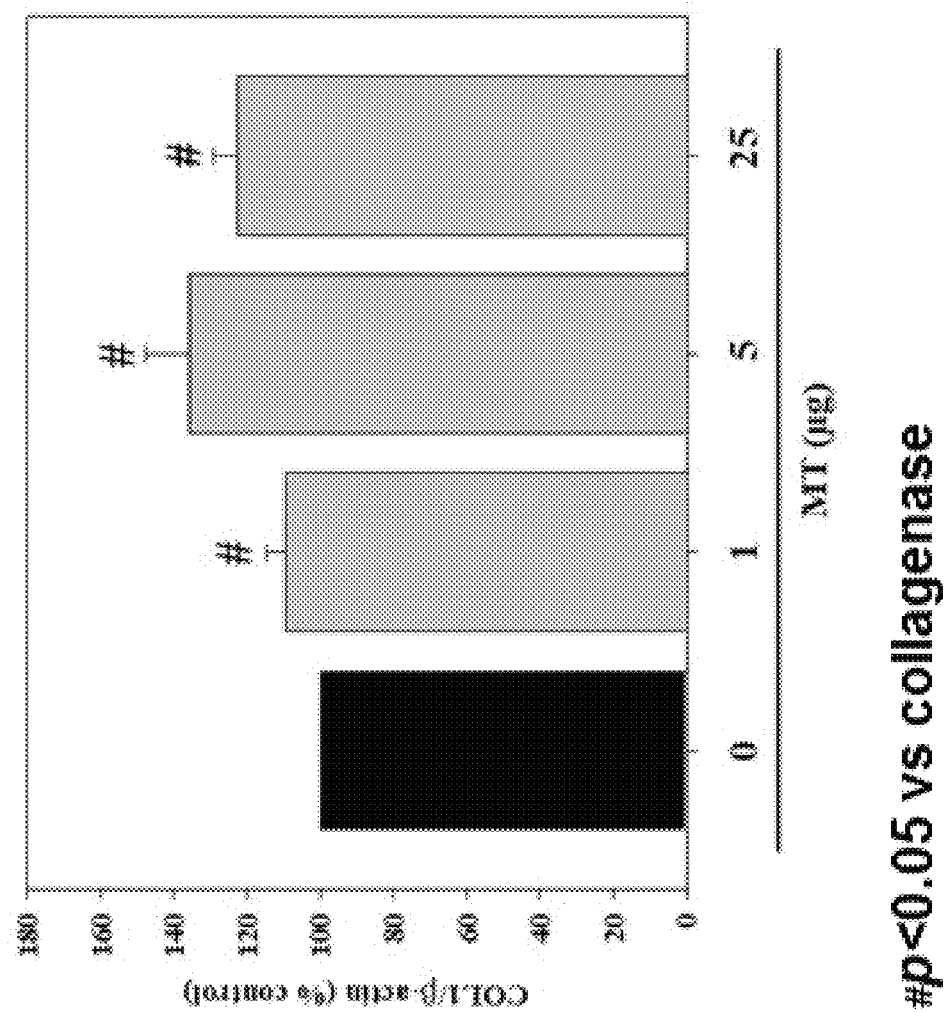
[FIG. 59]

PHARMACEUTICAL COMPOSITION COMPRISING ISOLATED MITOCHONDRIA FOR PREVENTING OR TREATING TENDINOPATHY

CROSS-REFERENCE TO RELATED APPLICATIONS

This application is a National Stage of International Application No. PCT/KR2019/014605 filed Oct. 31, 2019, which claims priority under U.S.C. § 119 (a) to Korean Patent Application No. 10-2018-0132211 filed on Oct. 31, 2018.

TECHNICAL FIELD

The present invention relates to a pharmaceutical composition for preventing or treating tendinopathy, comprising isolated mitochondria as an active ingredient.

BACKGROUND ART

Tendinopathy is a disease caused by degenerative changes in collagen in tendon tissue that connects the ankle joint and muscles. When the tendon tissue is damaged, tendinopathy occurs in a case where no time is given for the tendon tissue to recover due to not having enough rest. In this case, the tendon tissue is not recovered due to repeated sprains or excessive use thereof. In addition, in tendinopathy, abnormal alignment of collagen fibers, fibrinoid or myxoid degeneration of collagen, fibrosis, and the like proceed in tendon tissue, and weakened tendon tissue may rupture.

As an etiology of tendinopathy, an inflammatory reaction is emerging as the main cause. Cytokines involved in the inflammatory response play an important role in the damage and wound healing process in soft tissues such as muscles, tendons, and blood vessels. Specifically, expression of inflammatory cytokines such as TNF-$\alpha$, IL-1$\beta$, IL-6, VEGF, and TGF-$\beta$ in tenocytes is closely related to the function of tissues in vivo. In this regard, it has been reported that the tendon tissue of IL-6-deficient mice has better physical properties such as tissue strength or arrangement than the tendon tissue of other mice; and it has been reported that TNF-$\alpha$ and IL-1$\beta$ cause mitochondrial DNA damage and induce apoptosis in chondrocytes (Neal L. Millar et al., *Scientific Reports* volume 6, Article number: 27149, 2016).

On the other hand, matrix metalloproteases (MMPs) play a role in maintaining the balance of extracellular matrix in normal tendon tissue, and it has been reported that imbalanced matrix metalloproteases were observed in patients with tendinopathy (Graham Riley, *Nature Clinical Practice Rheumatology* volume 4, p82-89, 2008).

Although tendinopathy is very common clinically, there is still no definitive treatment method therefor. Currently, treatments for tendinopathy include conservative treatments such as stretching, physical therapy, taking anti-inflammatory drugs, steroid injections, extracorporeal shock wave therapy, and autologous platelet-rich plasma injections; however, most of them have little scientific basis. Treatment with steroid injections is mainly performed; however, it has been reported that steroid injections destroy soft tissues or reduce muscle strength. In addition, there is a limitation to the therapeutic range of steroid injections in that no anti-inflammatory effect can be seen in a case where inflammation is not accompanied. In a case where conservative treatments fail, a surgical treatment may be performed. However, surgery is a treatment for symptom relief, which includes removing the degenerated portions and suturing the remaining portions in affected tendons, or transplanting thereinto other surrounding tendons, and thus is not a fundamental solution.

Recently, regarding treatment of tendinopathy, regenerative therapy using proteins or stem cells has been actively studied. Korean Patent Application No. 2016-0091029 discloses a composition comprising autologous and allogeneic adipose-derived mesenchymal stem cells for treatment of tendon or ligament injury and a method for preparing the same. The above-mentioned document discloses that in a case where a composition comprising autologous and allogeneic adipose-derived mesenchymal stem cells is administered, collagen, extracellular matrix (ECM) protein, and various growth factors are secreted; however, there is a technical limitation in that the effect does not last in a case where the composition is administered once. Therefore, there is a need for research on new treatments that can lead to effective regeneration of tendon tissue.

DISCLOSURE OF INVENTION

Technical Problem

Research has been conducted to treat tendinopathy; however, the treatments developed so far have limitations in that they are treatments which temporarily relieve symptoms only, have a short duration of therapeutic effect, or the like, and no breakthrough treatment has been developed yet. There is a need for continuous research and development on effective treatments for tendinopathy.

Accordingly, an object of the present invention is to provide a pharmaceutical composition for treating tendinopathy and a method for treating tendinopathy using the same.

Solution to Problem

In order to achieve the above-mentioned object, in an aspect of the present invention, there is provided a pharmaceutical composition for preventing or treating tendinopathy, comprising mitochondria as an active ingredient.

In another aspect of the present invention, there is provided a method for preventing or treating tendinopathy, comprising a step of administering the pharmaceutical composition to an individual.

In yet another aspect of the present invention, there is provided a use of a pharmaceutical composition comprising mitochondria as an active ingredient, for treating tendinopathy.

In still yet another aspect of the present invention, there is provided a use of a pharmaceutical composition comprising mitochondria as an active ingredient, for manufacture of a medicament for treating tendinopathy.

Advantageous Effects of Invention

The pharmaceutical composition comprising mitochondria as an effective component, of the present invention, can restore the ATP synthesis capacity and antioxidant capacity of tenocytes, which have been damaged by an inflammatory reaction, to levels of normal tenocytes. In addition, in a case where the pharmaceutical composition of the present invention is administered to damaged tenocytes, it is possible to inhibit expression of Bax, which is an apoptotic factor, and increase expression of Bcl-2, which is an apoptotic inhibitor. In addition, in a case where the pharmaceutical composition of the present invention is administered to damaged tenocytes, it is possible to restore an expression level of MMP1 to that in normal tenocytes. Accordingly, the pharmaceutical composition of the present invention can be beneficially used to prevent or treat tendinopathy.

BRIEF DESCRIPTION OF DRAWINGS

FIG. 1 illustrates results obtained by subjecting tenocytes to treatment with TNF-α at respective concentrations, and then comparing expression levels of apoptosis-related factors in the tenocytes.

FIG. 2 illustrates expression levels of BID protein in tenocytes, observed in a case where the tenocytes are subjected to treatment with TNF-α at respective concentrations.

FIG. 3 illustrates Bax/Bcl-2 levels in tenocytes, observed in a case where the tenocytes are subjected to treatment with TNF-α at respective concentrations.

FIG. 4 illustrates Bcl-2/Bax levels in tenocytes, observed in a case where the tenocytes are subjected to treatment with TNF-α at respective concentrations.

FIG. 5 illustrates results obtained by subjecting tenocytes to treatment with TNF-α, and then comparing expression levels of apoptosis-related factors in the tenocytes over time.

FIG. 6 illustrates expression levels of BID protein in tenocytes over time, observed in a case where the tenocytes are subjected to treatment with TNF-α.

FIG. 7 illustrates Bax/Bcl-2 levels in tenocytes over time, observed in a case where the tenocytes are subjected to treatment with TNF-α.

FIG. 8 illustrates Bcl-2/Bax levels in tenocytes over time, observed in a case where the tenocytes are subjected to treatment with TNF-α.

FIG. 9 illustrates fluorescence intensity of DCF in tenocytes, which have been subjected to treatment with TNF-α, observed in a case where the tenocytes are subjected to treatment with DCFH-DA.

FIG. 10 illustrates ATP contents in tenocytes that have been subjected to treatment with TNF-α.

FIG. 11 illustrates results obtained by subjecting tenocytes to treatment with TNF-α, or TNF-α and healthy mitochondria, and then causing the tenocytes to be fluorescently stained with Mitotracker Green, Mitotracker CMXRos Red, and DAPI.

FIG. 12 illustrates changes in fluorescence intensity of DCF in tenocytes, which have been subjected to treatment with TNF-α, hydrogen peroxide, vitamin C, or TNF-α and healthy mitochondria, observed in a case where the tenocytes are subjected to treatment with DCFH-DA.

FIG. 13 illustrates fluorescence intensity of DCF in tenocytes, which have been subjected to treatment with TNF-α, hydrogen peroxide, vitamin C, TNF-α and healthy mitochondria, or TNF-α and damaged mitochondria, observed in a case where the tenocytes are subjected to treatment with DCFH-DA.

FIG. 14 illustrates changes in ATP content in tenocytes, observed in a case where the tenocytes are subjected to treatment with TNF-α, TNF-α and healthy mitochondria, or TNF-α and damaged mitochondria.

FIG. 15 illustrates ATP contents in tenocytes, observed in a case where the tenocytes are subjected to treatment with TNF-α, or TNF-α and mitochondria.

FIG. 16 illustrates mitochondrial membrane potential in tenocytes, observed in a case where the tenocytes are subjected to treatment with TNF-α, CCCP, or TNF-α and healthy mitochondria.

FIG. 17 illustrates mitochondrial dehydrogenase activity in tenocytes, observed in a case where the tenocytes are subjected to treatment with TNF-α, TNF-α and vitamin C, TNF-α and healthy mitochondria, or TNF-α and damaged mitochondria.

FIG. 18 illustrates results obtained by subjecting tenocytes to treatment with TNF-α, or TNF-α and healthy mitochondria, and 12 hours after the treatment, comparing expression levels of apoptosis-related factors in the tenocytes.

FIG. 19 illustrates results obtained by subjecting tenocytes to treatment with TNF-α, or TNF-α and healthy mitochondria, and 24 hours after the treatment, comparing expression levels of apoptosis-related factors in the tenocytes.

FIG. 20 illustrates expression levels of BID protein in tenocytes, observed 12 hours or 24 hours after treatment of the tenocytes with TNF-α, or TNF-α and healthy mitochondria.

FIG. 21 illustrates Bax/Bcl-2 levels in tenocytes, observed 12 hours or 24 hours after treatment of the tenocytes with TNF-α, or TNF-α and healthy mitochondria.

FIG. 22 illustrates Bcl-2/Bax levels in tenocytes, observed 12 hours or 24 hours after treatment of the tenocytes with TNF-α, or TNF-α and healthy mitochondria.

FIG. 23 illustrates results obtained by subjecting tenocytes to treatment with TNF-α, or TNF-α and healthy mitochondria, and 12 hours after the treatment, comparing expression levels of MMP1 protein in the tenocytes.

FIG. 24 illustrates results obtained by subjecting tenocytes to treatment with TNF-α, or TNF-α and healthy mitochondria, and 24 hours after the treatment, comparing expression levels of MMP1 protein in the tenocytes.

FIG. 25 illustrates expression levels of MMP1 protein in tenocytes, observed 12 hours or 24 hours after treatment of the tenocytes with TNF-α, or TNF-α and healthy mitochondria.

FIG. 26 illustrates expression levels of collagen 1 gene in tenocytes, observed 24 hours after treatment of the tenocytes with TNF-α, or TNF-α and healthy mitochondria.

FIG. 27 illustrates results obtained by subjecting tenocytes to treatment with TNF-α, or TNF-α and healthy mitochondria, and 24 hours after the treatment, comparing expression levels of collagen 1 protein in the tenocytes.

FIG. 28 illustrates expression levels of collagen 1 protein in tenocytes, observed 24 hours after treatment of the tenocytes with TNF-α, or TNF-α and healthy mitochondria.

FIG. 29 illustrates results obtained by subjecting tenocytes to treatment with TNF-α, or TNF-α and damaged mitochondria, and 24 hours after the treatment, comparing expression levels of collagen 1 protein in the tenocytes.

FIG. 30 illustrates expression levels of collagen 1 protein in tenocytes, observed 24 hours after treatment of the tenocytes with TNF-α, or TNF-α and damaged mitochondria.

FIG. 31 illustrates results obtained by subjecting tenocytes to treatment with TNF-α, or TNF-α and healthy mitochondria, and 24 hours after the treatment, comparing expression levels of scleraxis gene in the tenocytes.

FIG. 32 illustrates results obtained by subjecting tenocytes to treatment with TNF-α, or TNF-α and healthy mitochondria, and 24 hours after the treatment, comparing expression levels of tenomodulin gene in the tenocytes.

FIG. 33 illustrates results obtained by subjecting tenocytes to treatment with TNF-α, or TNF-α and healthy mitochondria, and 24 hours after the treatment, comparing expression levels of Fis1, Drp1, and MFN2 proteins in the tenocytes.

FIG. 34 illustrates expression levels of Fis1 protein in tenocytes, observed 24 hours after treatment of the tenocytes with TNF-α, or TNF-α and healthy mitochondria.

FIG. 35 illustrates expression levels of Drp1 protein in tenocytes, observed 24 hours after treatment of the tenocytes with TNF-α, or TNF-α and healthy mitochondria.

FIG. 36 illustrates expression levels of MFN2 protein in tenocytes, observed 24 hours after treatment of the tenocytes with TNF-α, or TNF-α and healthy mitochondria.

FIG. 37 illustrates expression levels of IL-1β in tenocytes, observed 24 hours after treatment of the tenocytes with TNF-α, or TNF-α and healthy mitochondria.

FIG. 38 illustrates expression levels of IL-6 in tenocytes, observed 24 hours after treatment of the tenocytes with TNF-α, or TNF-α and healthy mitochondria.

FIG. 39 illustrates results obtained by subjecting tenocytes to treatment with TNF-α, or TNF-α and healthy mitochondria, and 24 hours after the treatment, comparing expression levels of p-NF-kB protein in the tenocytes.

FIG. 40 illustrates expression levels of p-NF-kB protein in tenocytes, observed 24 hours after treatment of the tenocytes with TNF-α, or TNF-α and healthy mitochondria.

FIG. 41 illustrates results obtained by subjecting tenocytes to treatment with TNF-α, or TNF-α and healthy mitochondria, and 24 hours after the treatment, comparing expression levels of signaling-related genes in the tenocytes.

FIG. 42 illustrates results obtained by injecting collagenase 1 and healthy mitochondria into tendon tissue, and then causing the tendon tissue to be fluorescently stained with Mitotracker Green, Mitotracker CMXRos Red, and DAPI.

FIG. 43 illustrates results obtained by subjecting tendon tissue to treatment with collagenase 1, or collagenase 1 and healthy mitochondria, and 2 weeks after the treatment, comparing expression levels of Fis1, Drp1, and MFN2 proteins in the tendon tissue.

FIG. 44 illustrates expression levels of Fis1 protein in tendon tissue, observed 2 weeks after treatment of the tendon tissue with collagenase 1, or collagenase 1 and healthy mitochondria.

FIG. 45 illustrates expression levels of Drp1 protein in tendon tissue, observed 2 weeks after treatment of the tendon tissue with collagenase 1, or collagenase 1 and healthy mitochondria.

FIG. 46 illustrates expression levels of MFN2 protein in tendon tissue, observed 2 weeks after treatment of the tendon tissue with collagenase 1, or collagenase 1 and healthy mitochondria.

FIG. 47 illustrates results obtained by subjecting tendon tissue to treatment with collagenase 1, or collagenase 1 and healthy mitochondria, and 2 weeks after the treatment, comparing expression levels of TNC and MMP1 proteins in the tendon tissue.

FIG. 48 illustrates expression levels of TNC protein in tendon tissue, observed 2 weeks after treatment of the tendon tissue with collagenase 1, or collagenase 1 and healthy mitochondria.

FIG. 49 illustrates expression levels of MMP1 protein in tendon tissue, observed 2 weeks after treatment of the tendon tissue with collagenase 1, or collagenase 1 and healthy mitochondria.

FIG. 50 illustrates results obtained by subjecting tendon tissue to treatment with collagenase 1, or collagenase 1 and healthy mitochondria, and 2 weeks after the treatment, checking collagen contents in the tendon tissue through hydroxyproline assay.

FIG. 51 illustrates expression levels of TNF-α in tendon tissue, observed 2 weeks after treatment of the tendon tissue with collagenase 1, or collagenase 1 and healthy mitochondria.

FIG. 52 illustrates expression levels of IL-1β in tendon tissue, observed 2 weeks after treatment of the tendon tissue with collagenase 1, or collagenase 1 and healthy mitochondria.

FIG. 53 illustrates expression levels of IL-6 in tendon tissue, observed 2 weeks after treatment of the tendon tissue with collagenase 1, or collagenase 1 and healthy mitochondria.

FIG. 54 illustrates expression levels of p-NF-kB protein in tendon tissue, observed 2 weeks after treatment of the tendon tissue with collagenase 1, or collagenase 1 and healthy mitochondria.

FIG. 55 illustrates results obtained by subjecting tendinopathy patient-derived tenocytes to treatment with foreign healthy mitochondria at respective concentrations, and 24 hours after the treatment, comparing proliferation of the tenocytes.

FIG. 56 illustrates results obtained by subjecting tendinopathy patient-derived tenocytes to treatment with foreign healthy mitochondria at respective concentrations, and 24 hours after the treatment, comparing expression levels of TNC, TNMD, and COL1 proteins in the tenocytes.

FIG. 57 illustrates expression levels of TNC protein in tendinopathy patient-derived tenocytes, observed 24 hours after treatment of the tenocytes with foreign healthy mitochondria at respective concentrations.

FIG. 58 illustrates expression levels of TNMD protein in tendinopathy patient-derived tenocytes, observed 24 hours after treatment of the tenocytes with foreign healthy mitochondria at respective concentrations.

FIG. 59 illustrates expression levels of COL1 protein in tendinopathy patient-derived tenocytes, observed 24 hours after treatment of the tenocytes with foreign healthy mitochondria at respective concentrations.

BEST MODE FOR CARRYING OUT THE INVENTION

Hereinafter, the present invention will be described in detail.

In an aspect of the present invention, there is provided a pharmaceutical composition for preventing or treating tendinopathy, comprising mitochondria as an active ingredient.

Unless otherwise specified in the specification, the term "active ingredient" refers to an ingredient that exhibits activity alone or in combination with an adjuvant (carrier) that is not active on its own.

The mitochondria may be obtained from a mammal and may be obtained from a human. Specifically, the mitochondria may be isolated from cells or tissues. For example, the mitochondria may be obtained from somatic cells, germ cells, or stem cells. In addition, the mitochondria may be normal healthy mitochondria obtained from cells whose mitochondrial biological activity is normal. In addition, the mitochondria may be cultured ex vivo.

In addition, the mitochondria may be of autologous, allogenic, or xenogenic origin. Specifically, autologous mitochondria refer to mitochondria obtained from tissues or cells of the same individual. Also, allogenic mitochondria refer to mitochondria obtained from an individual that belongs to the same species as the individual to which the mitochondria are to be applied and has different genotypes therefrom for alleles. In addition, xenogenic mitochondria refer to mitochondria obtained from an individual that belongs to a different species from the individual to which the mitochondria are to be applied.

Specifically, the somatic cells may be muscle cells, hepatocytes, neurons, fibroblasts, epithelial cells, adipocytes, osteocytes, leukocytes, lymphocytes, platelets, or mucosal cells.

In addition, the germ cells are cells that undergo meiosis and mitosis, and may be sperms or eggs. In addition, the stem cells may be any one selected from the group consisting of mesenchymal stem cells, adult stem cells, induced pluripotent stem cells, embryonic stem cells, bone marrow stem cells, neural stem cells, limbal stem cells, and tissue-derived stem cells. Here, the mesenchymal stem cells may be derived from any one selected from the group consisting of umbilical cord, umbilical cord blood, bone marrow, fat, muscle, nerve, skin, amniotic membrane, and placenta.

The term "healthy mitochondria", as used herein, refers to mitochondria extracted from normal cells. In addition, the term "damaged mitochondria", as used herein, refers to mitochondria whose ATP synthesis function is inhibited. Specifically, the damaged mitochondria refer to mitochondria of cells that have been treated with an ATP synthesis inhibitor such as oligomycin so that their intracellular mitochondrial ATP synthesis function has been inhibited. Meanwhile, in a case where the mitochondria are isolated from specific cells, the mitochondria may be isolated, for example, through various known methods such as using a specific buffer solution or using an electric potential difference and a magnetic field.

The mitochondrial isolation may be achieved by disrupting cells and performing centrifugation, in terms of maintaining mitochondrial dynamics. In an embodiment, the mitochondrial isolation may be performed by a method that comprises a step of culturing cells and subjecting a pharmaceutical composition containing such cells to primary centrifugation, to produce a pellet, a step of resuspending the pellet in a buffer solution and performing homogenization, a step of subjecting the homogenized solution to secondary centrifugation, to prepare supernatant, and a step of subjecting the supernatant to tertiary centrifugation, to purify mitochondria. Here, it is preferable, in terms of maintaining cell activity, that the time during which the secondary centrifugation is performed is regulated to be shorter than the time during which the primary and tertiary centrifugations are performed. A centrifugation speed may be increased as centrifugation proceeds from the primary centrifugation to the tertiary centrifugation.

Specifically, the primary to tertiary centrifugations may be performed at a temperature of 0° C. to 10° C., preferably at a temperature of 3° C. to 5° C. In addition, the time during which the centrifugation is performed may be for 1 to 50 minutes, and may be appropriately adjusted depending on the number of centrifugations, the amount of a sample, and the like.

In addition, the primary centrifugation may be performed at a speed of 100×g to 1,000×g, or 200×g to 700×g, or 300×g to 450×g. In addition, the secondary centrifugation may be performed at a speed of 1×g to 2,000×g, or 25×g to 1,800×g, or 500×g to 1,600×g. In addition, the tertiary centrifugation may be performed at a speed of 100×g to 20,000×g, or 500×g to 18,000×g, or 800×g to 15,000×g.

In addition, the mitochondria may be contained in a concentration of 0.1 µg/ml to 500 µg/ml, 0.2 µg/ml to 450 µg/ml, or 0.5 µg/ml to 400 µg/ml, with respect to the pharmaceutical composition. In a case where the mitochondria are contained in the above-mentioned range, a mitochondrial dose can be easily regulated upon administration, and an amelioration degree of the patient's tendinopathy can be further improved.

In particular, for the pharmaceutical composition according to the present invention, the mitochondria may be administered in an amount of 0.01 mg/kg to 5 mg/kg, 0.1 mg/kg to 4 mg/kg, or 0.25 mg/kg to 2.5 mg/kg, per single administration, based on the body weight of an individual to which the pharmaceutical composition is to be administered. That is, it is most preferable, in terms of cell activity, that the pharmaceutical composition contains the mitochondria such that the mitochondria are administered in an amount within the above-mentioned range based on the body weight of an individual with tendinopathy. In addition, the pharmaceutical composition may be administered once to 10 times, 3 to 8 times, or 5 to 6 times, with 5 times being preferred. Here, administration may be performed at 1- to 7-day intervals or 2- to 5-day intervals, with 3-day intervals being preferred.

In addition, the pharmaceutical composition may be administered to a human or other mammal, who is at risk of or suffering from tendinopathy. The pharmaceutical composition may be characterized by inhibiting inflammation of tendon tissue. The pharmaceutical composition may be characterized by being applied to a patient with tendon tissue having damaged collagen or a patient with tendon tissue that is chronic degenerative.

Specifically, the pharmaceutical composition may be characterized by increasing expression of any one selected from the group consisting of collagen 1, tenomodulin (TNMD), scleraxis, and combinations thereof in a patient with tendinopathy. In addition, the pharmaceutical composition may be characterized by decreasing expression of any one selected from the group consisting of BH3 interacting-domain death agonist (BID), Bcl-2-associated X protein (Bax), MMP1, mitochondrial fission 1 protein (Fis1), dynamin-1-like protein (Drp1), mitofusin-2 (MFN2), IL-1β, IL-6, p-NF-kB, tenascin C (TNC), TNF-α, and combinations thereof in a patient with tendinopathy.

The term "tenomodulin (TNMD)", as used herein, refers to a protein encoded by the TNMD (Tnmd) gene, and this protein is an important marker of tendon maturation. In addition, the TNMD promotes self-renewal and inhibits aging, thereby affecting the development of tendon-derived stem cells or progenitor cells.

The term "scleraxis", as used herein, refers to a transcriptional regulatory factor that is one of the members belonging to the basic helix-loop-helix (bHLH) superfamily. Progenitor cells expressing early scleraxis contribute to the formation of tendon tissue and other muscle attachments.

The term "BH3 interacting-domain death agonist (BID)", as used herein, refers to a pro-apoptotic member of the Bcl-2 protein family, and this is a pro-apoptotic Bcl-2 protein that contains only the BH3 domain. In response to apoptosis signaling, the BID interacts with Bax, which is another Bcl-2 family protein, so that Bax is inserted into the organelle membrane, mainly the outer mitochondrial membrane. The Bcl-2-associated X protein (Bax) interacts with the mitochondrial voltage-dependent anion channel (VDAC) and induces its opening.

In addition, the pharmaceutical composition may be an injectable that can be administered intravenously, and may preferably be an injectable preparation.

Therefore, in order to ensure product stability due to distribution of the injectables to be prescribed, the pharmaceutical composition may be prepared as an injectable which is physically or chemically very stable, by regulating pH thereof using an aqueous acid solution or a buffer solution such as phosphate which can be used for injectables.

Specifically, the pharmaceutical composition may contain water for injection. The water for injection may be distilled water prepared for dissolving a solid injectable or diluting a water-soluble injectable. Examples thereof include glucose injection, xylitol injection, D-mannitol injection, fructose injection, physiological saline, dextran 40 injection, dextran 70 injection, amino acid injection, Ringer's solution, lactic acid-Ringer's solution, phosphate buffer solution in the range of pH 3.5 to 7.5, sodium dihydrogen phosphate-citric acid buffer solution, and the like.

In addition, the pharmaceutical composition of the present invention may contain a stabilizer or a solubilizing agent. For example, the stabilizer may be sodium pyrosulfite or ethylene diaminetetraacetic acid, and the solubilizing agent may be hydrochloric acid, acetic acid, sodium hydroxide, sodium bicarbonate, sodium carbonate, or potassium hydroxide.

In another aspect of the present invention, there may be provided a method for preventing or treating tendinopathy, comprising a step of administering the pharmaceutical composition to an individual. The individual may be a mammal, preferably a human. In addition, the individual may have damaged tendon tissue.

The pharmaceutical composition may be administered parenterally, using a suitable method such as intramuscular, intravenous, or intratendinous administration. Preferably, the administration may be intravenous or intratendinous administration.

This allows the pharmaceutical composition according to the present invention to supply foreign mitochondria having normal activity to the vein of an individual suffering from tendinopathy. Therefore, the pharmaceutical composition may be effectively used to increase activity of cells with decreased mitochondrial function or to regenerate cells with mitochondrial dysfunction, and thus may be used to prevent or treat tendinopathy.

In yet another aspect of the present invention, there is provided a use of a pharmaceutical composition comprising mitochondria as an active ingredient, for treating tendinopathy. The pharmaceutical composition is the same as described above.

In still yet another aspect of the present invention, there is provided a use of a pharmaceutical composition comprising mitochondria as an active ingredient, for manufacture of a medicament for treating tendinopathy. The pharmaceutical composition is the same as described above.

MODE FOR THE INVENTION

Hereinafter, preferred examples of the present invention will be described in order to facilitate understanding of the present invention. However, the following examples are provided only for the purpose of easier understanding of the present invention, and the present invention is not limited by the following examples.

Example 1. Identification of Changes in Expression Level of Apoptosis-Related Factors in Tenocytes Depending on TNF-α Concentrations Tenocytes (ZenBio, Inc., #TNE-F), which are human-derived tenocytes, were used to establish a tendinopathy-inducing cell model. The tenocytes were cultured, in a flask/plate coated with collagen type 1 (Sigma; code: C8919), together with Dulbecco's modified eagle's medium high glucose medium containing 10% fetal bovine serum and 1% penicillin/streptomycin antibiotics. The culture conditions were maintained so that the number of passages for the cells did not exceed 4.

Recombinant human tumor necrosis factor-α (TNF-α) was purchased from PeproTech (No. 300-01A). The purchased recombinant human TNF-α was dissolved in purified ethanol. Then, the resultant was adjusted so that the stock solution had a concentration of 20 mg/ml, and stored at −4° C. until use. The TNF-α was diluted in a medium and used at a concentration of 10 ng/ml, 50 ng/ml, 100 ng/ml, or 500 ng/ml, which was the final concentration. The tenocytes were treated with TNF-α at a concentration of 10 ng/ml, 50 ng/ml, 100 ng/ml, or 500 ng/ml, and then incubated for 24 hours at 37° C. and 5% $CO_2$.

Changes in apoptosis in the tenocytes, caused by the treatment with TNF-α at the respective concentrations, were observed. Expression levels of BID and Bax, which are apoptosis signaling proteins in the tenocytes, were analyzed using Western blotting. Specifically, for protein extraction, 100 μl of RIPA buffer to which a protease inhibitor had been added was dispensed into each well, and then the tenocytes were separated. Then, the separated tenocytes were centrifuged for 15 minutes at 4° C. and 12,000 rpm, to obtain supernatant. The bicinchoninic acid (BCA) assay was used to measure the protein concentration in the supernatant; and the absorbance was measured at a wavelength of 562 nm using an ELISA microplate reader device. Each sample was heated with SDS-PAGE sample buffer (62.5 mM Tris-HCl, pH 6.8, 2% SDS, 10% glycerol, and 5% 2-mercaptoethanol) at 100° C. for 3 minutes.

The heated sample was loaded on a 10% SDS PAGE gel and subjected to electrophoresis. Then, each of the proteins separated by electrophoresis was transferred to a PVDF membrane at a condition of 0.35 mA for 3 hours. The PVDF membrane was immersed in pure methanol before use. A blocking buffer was prepared by treating 3% bovine serum albumin (BSA; Bio Basic Inc., Ontario, Canada) with 1×TBS to which 0.1% Tween-20 was added. Then, to prevent a non-specific binding reaction, the PVDF membrane was treated with the blocking buffer and the reaction was allowed to proceed for 1 hour. The PVDF membrane was treated with primary antibodies, which had been diluted 1:1000, and then the reaction was allowed to proceed at 4° C. overnight. The primary antibodies used were anti-BID antibody (Santa Cruz Biotechnology Inc.; FL-195), anti-Bax antibody (Santa Cruz Biotechnology Inc.; sc-7480), anti-Bcl2 antibody (Santa Cruz Biotechnology Inc.; sc-7480), anti-β-actin antibody (Santa Cruz Biotechnology Inc.; sc-4778).

The next day, the PVDF membrane was washed three times with TBST buffer for 10 minutes each, and then treated with horseradish peroxidase (HRP)-labeled goat anti-mouse antibody (Santa Cruz Biotechnology Inc.; sc-2005) that had been diluted 1:5000. Then, the reaction was allowed to proceed at room temperature for 1 hour. Then, the PVDF membrane was washed 3 times with TBST buffer for 10 minutes each. Then, a color development reaction was induced using chemiluminescence detection (ECL component from Pierce Clarity™ and Western ECL Substrate from Bio-Rad), and expression levels of BID, Bax, and Bcl-2 were checked using LAS-4000 (Fuji Photo Film Co., Ltd., Tokyo, Japan).

As a result, the expression levels of BID and Bax proteins, which are apoptosis signaling proteins, increased in the TNF-α-treated tenocytes; on the contrary, the expression level of Bcl-2 protein, which is an apoptotic inhibitor, decreased (FIGS. 1 to 4).

Example 2. Identification of Changes in Expression Level of Apoptotic Factors in Tenocytes Over Time After Treatment with TNF-α

To identify at which time point apoptosis is most activated after treatment of tenocytes with TNF-α, the tenocytes were treated with 10 ng of TNF-α, and then expression levels of BID and Bax proteins, which are apoptotic factor proteins, were checked through Western blotting 6, 12, or 24 hours after the treatment. Western blotting was performed in the same manner as in Example 1.

As a result, the expression levels of the apoptotic factors increased over time after treatment of the tenocytes with TNF-α; in particular, it was identified that apoptosis in the tenocytes was most activated when 24 hours elapsed after the treatment of the tenocytes with TNF-α (FIGS. 5 to 8).

Example 3. Identification of Mitochondrial Dysfunction in Tenocytes by Treatment with TNF-α

It was identified whether mitochondrial dysfunction occurred in tenocytes by the treatment of the tenocytes with TNF-α. The tenocytes were treated with recombinant human TNF-α, and then intracellular ATP and reactive oxygen species (ROS) levels were checked.

Specifically, a level of ROS generated in the tenocytes was measured using a 2',7'-dichlorodihydrofluorescein diacetate (DCFH-DA) probe. The tenocytes were dispensed into a 96-well plate so that the number of cells per well was $5 \times 10^3$, and then incubated for 24 hours at 37° C. and 5% $CO_2$. When the tenocytes in culture reached a cell density of about 80% to 90%, the tenocytes were treated with recombinant human TNF-α at an amount of 10 ng, 50 ng, 100 ng, or 500 ng, and then incubated for 24 hours at 37° C. and 5% $CO_2$. As a positive control, hydrogen peroxide ($H_2O_2$) at a concentration of 500 μM was used to treat the tenocytes. The incubated tenocytes were washed once with PBS, and then treated with DCFH-DA at a concentration of 10 mM. Incubation was performed for 30 minutes. Then, the absorbance was measured at a wavelength of 517 nm to 522 nm using Synergy Mix Multi-Mode Reader (BioTek, Instruments, Inc.). Data were measured individually, and the mean and standard deviation were calculated.

As a result, in the TNF-α-treated tenocytes, the fluorescence intensity of DCF was measured to be higher than that in the normal tenocytes, which is interpreted as indicating that there was a large amount of ROS which reacted with intracellular DCFH, and thus the tenocytes had a high ROS level (FIG. 9).

In addition, a content of ATP in the tenocytes was measured using a CellTiter-Glo luminescence kit (Promega, Madison, WI). The tenocytes were treated with TNF-α at an amount of 10 ng, 50 ng, 100 ng, or 500 ng, and then incubated for 24 hours at 37° C. and 5% $CO_2$. As a positive control, hydrogen peroxide ($H_2O_2$) at a concentration of 500 μM was used to treat the tenocytes. Then, each well was treated with 100 μl of growth medium and 100 μl of CellTiter-Glo luminescence test solution, and the reaction was allowed to proceed in a plate shaker for 2 minutes. Then, the reaction was further allowed to proceed at room temperature for 10 minutes. Then, the luminescence signal was measured using a luminescene microplate reader.

As a result, the ATP content in the TNF-α-treated tenocytes was measured to be lower than that in the normal tenocytes (FIG. 10). From this, it was identified that in a case where the tenocytes were treated with TNF-α, mitochondria in the tenocytes did not function normally.

Example 4. Preparation of Composition Containing Mitochondria

Umbilical cord-derived mesenchymal stem cells provided by CHA University Bundang Medical Center were inoculated into alpha-minimum essential medium (MEM) containing 10% (v/v) fetal bovine serum (FBS, Gibco), 100 μg/ml streptomycin, and 100 U/ml ampicillin, and cultured for 72 hours. After completion of the culture, the cells were washed twice using Dulbecco's phosphate buffered saline (DPBS, Gibco). The washed cells were treated with 0.25% (v/v) Trypsin-EDTA (TE, Gibco) to obtain cells.

In addition, to obtain damaged mitochondria, the umbilical cord-derived mesenchymal stem cells were treated with a mitochondrial ATP synthesis inhibitor (oligomycin, Sigma-Aldrich, St. Louis, MO, USA) so that the mitochondrial function was artificially inhibited. After 24 hours, the cells were washed twice using DPBS. The washed cells were treated with 0.25% TE to obtain cells.

For the respective cells thus obtained, to extract mitochondria, cells at a concentration of $1 \times 10^7$ cells/ml were collected therefrom using a hemocytometer. The cells were subjected to primary centrifugation at a speed of 350×g for 10 minutes at a temperature of about 4° C. Here, the obtained pellet was recovered, resuspended in a buffer solution, and then homogenized for 10 to 15 minutes. Then, the pellet-containing composition was subjected to secondary centrifugation at a speed of 1,100 xg for 3 minutes at a temperature of about 4° C., to obtain supernatant. The supernatant was subjected to tertiary centrifugation at a speed of 12,000×g for 15 minutes at a temperature of about 4° C., to isolate mitochondria from the cells. The respective mitochondria thus obtained were mixed, in an amount of 5 μg or 50 μs, with 100 μl of water for injection, and then each mixture was drawn into an insulin syringe.

Example 5. Identification of Mitochondrial Delivery into Tenocytes

The healthy mitochondria (intact MT), which had been extracted from the normal umbilical cord-derived stem cells through the method in Example 4, were delivered into the target tenocytes.

The mitochondrial delivery was performed through a centrifuge as follows. First, 24 hours before the experiment, the tenocytes were treated with TNF-α whose concentration was adjusted to 10 ng/ml. Before the mitochondrial delivery, $1 \times 10^5$ tenocytes were prepared by being mixed with 100 μl of PBS, and kept on ice. The tenocytes were treated with the mitochondria isolated in Example 4 at 1 μg, 5 μg, or 25 μg, and slowly mixed. Then, the mixture was placed in a centrifuge tube and centrifuged at 1,500×g for 5 minutes. After completion of the centrifugation, washing with PBS was performed twice to remove impurities. After causing only the pellet to be left, 100 μl of PBS was added thereto, mixed, and then incubated on a plate.

To identify the delivered mitochondria, the tenocytes were stained using Mitotracker Green, Mitotracker CMXRos Red, and DAPI. Here, the Mitotracker Green is a dye that stains mitochondria in tenocytes regardless of the mitochondrial membrane potential. The Mitotracker CMXRos Red is a dye that accumulates depending on the mitochondrial membrane potential, and indicates the viability of delivered mitochondria.

Specifically, the tenocytes to which $1 \times 10^5$ mitochondria had been delivered were dispensed into a 6-well plate, and then washing with DPBS was performed when the cell density reached 80% to 90%. The medium was treated with Mitotracker Green, CMXRos Red, and DAPI dyes at a concentration of 300 nM each, and incubation was performed for 20 minutes at 37° C. and 5% $CO_2$. Then, images were taken using a TCP SP5 II confocal fluorescence microscope (Leica, Heidelberg, Germany) and Leica LASAF software, ver 2.6 (Leica Microsystems, Mannheim, Germany).

As a result, it was identified that in the fluorescence images of the normal tenocytes (control) and the TNF-α-treated tenocytes, only green fluorescence (Mitotracker Green) and blue fluorescence (DAPI), except red fluorescence (Mitotracker CMXRos Red), were developed. On the other hand, in the fluorescence images of the healthy mitochondria-treated tenocytes, the red fluorescence intensity increased depending on the mitochondrial concentration treated. From this, it was identified that the healthy mitochondria were delivered into the tenocytes (FIG. 11).

Example 6. Identification of Functional Changes in Tenocytes by Mitochondrial Delivery It was identified whether for tenocytes damaged by TNF-α, the function within the tenocytes was restored by mitochondrial delivery thereinto. First, the tenocytes were treated with 10 ng of TNF-α, and then incubated for 24 hours at 37° C. and 5% $CO_2$. Then, the tenocytes were treated with the healthy or damaged mitochondria isolated in Example 4 at 1 μg, 5 μg, or 25 μg, and 24 hours after the treatment, ATP and ROS levels in the tenocytes were checked. Analysis of ATP and ROS was performed in the same manner as in Example 3.

As a result, the TNF-α-treated tenocytes showed an increased DCF level; on the contrary, the tenocytes treated with TNF-α and the healthy mitochondria showed a DCF level that decreased as much as that in the normal tenocytes (control). This is interpreted as indicating that there was a small amount of ROS which reacted with DCFH, and thus the tenocytes had a decreased ROS level. On the other hand, the tenocytes treated with TNF-α and the damaged mitochondria showed an increased DCF level (FIGS. 12 and 13).

In addition, the TNF-α-treated tenocytes showed a decreased ATP content; on the contrary, the tenocytes treated with TNF-α and the healthy mitochondria showed an increased ATP content. In particular, the tenocytes treated with TNF-α and 25 μg of the healthy mitochondria showed a remarkably increased ATP content, as compared with that in the TNF-α-treated tenocytes. On the other hand, the tenocytes treated with TNF-α and the damaged mitochondria showed no increase in ATP content (FIGS. 14 and 15).

In addition, the tenocytes were treated with the healthy mitochondria at 1 μg, 5 μg, or 25 μg, and 24 hours after the treatment, the mitochondrial membrane potential was measured. In addition, as a positive control, CCCP at a concentration of 50 μM was used to treat the tenocytes, and 30 minutes after the treatment, the mitochondrial membrane potential was measured. As a result, the TNF-α-treated tenocytes showed a decreased mitochondrial membrane potential level; on the contrary, the tenocytes treated with TNF-α and the healthy mitochondria showed an increased mitochondrial membrane potential level (FIG. 16).

In addition, the tenocytes were treated with the healthy or damaged mitochondria at 1 μg, 5 μg, or 25 μg, and then the mitochondrial dehydrogenase activity was measured. As a result, the TNF-α-treated tenocytes showed decreased mitochondrial dehydrogenase activity; on the contrary, the tenocytes treated with TNF-α and the healthy mitochondria showed increased mitochondrial dehydrogenase activity. On the other hand, the tenocytes treated with TNF-α and the damaged mitochondria showed no increase in mitochondrial dehydrogenase activity (FIG. 17).

From this, it was identified that the function within the damaged tenocytes was restored by the delivery of healthy mitochondria thereinto.

Example 7. Identification of Inhibited Apoptosis of Tenocytes by Mitochondrial Delivery To identify whether apoptosis of tenocytes was inhibited by the mitochondrial delivery, the tenocytes were treated with 10 ng of TNF-α, and then incubated for 12 hours or 24 hours at 37° C. and 5% $CO_2$. Then, the tenocytes were treated with the healthy mitochondria isolated in Example 4 at 1 μg, 5 μg, or 25 μg. Then, in the tenocytes, expression levels of apoptosis-related factors were checked by Western blotting. Western blotting was performed in the same manner as in Example 1.

As a result, the TNF-α-treated tenocytes showed an increased expression level of BID protein that is an apoptosis signaling factor. The tenocytes treated with TNF-α and the healthy mitochondria showed an expression level of BID protein which was not significantly different from that in the TNF-α-treated tenocytes (FIGS. 18 to 20).

In addition, the TNF-α-treated tenocytes showed an increased expression level of Bax protein that is an apoptosis signaling factor; on the contrary, the tenocytes treated with TNF-α and the healthy mitochondria showed a decreased expression level of Bax protein (FIGS. 18, 19, and 21).

On the other hand, the TNF-α-treated tenocytes showed a decreased expression level of Bcl-2 protein that is an apoptotic inhibitor; on the contrary, the tenocytes treated with TNF-α and the healthy mitochondria showed an increased expression level of Bcl-2 protein (FIGS. 18, 19, and 22). From this, it was identified that apoptotic factors in the damaged tenocytes were inhibited by the mitochondrial delivery thereinto.

Example 8. Identification of Matrix Restoration by Mitochondrial Delivery

It was identified whether the extracellular matrix of damaged tenocytes was restored by the delivery of healthy mitochondria thereinto. First, the tenocytes were treated with 10 ng of TNF-α, and then incubated for 12 hours or 24 hours at 37° C. and 5% $CO_2$. Then, the tenocytes were treated with the healthy or damaged mitochondria isolated in Example 4 at 1 μg, 5 μg, or 25 μg, and then an expression level of MMP1 protein in the tenocytes was measured by Western blotting. Western blotting was performed in the same manner as in Example 1, in which the primary antibodies used were anti-MMP1 antibody (Santa Cruz Biotechnology Inc.; sc-21731) and anti-collagen type 1 antibody (Abcam; ab6308).

As a result, the TNF-α-treated tenocytes showed a remarkably increased expression level of MMP1 protein. This indicates imbalanced metalloproteases in the tenocytes. On the contrary, the tenocytes treated with TNF-α and the healthy mitochondria showed a remarkably decreased expression level of MMP1 protein, as compared with that in the TNF-α-treated tenocytes, and such an expression level was not significantly different from that in the normal tenocytes (FIGS. 23 to 25).

In addition, the TNF-α-treated tenocytes showed a remarkably decreased expression level of collagen 1 protein. This indicates degradation of matrix proteins in the tenocytes. On the contrary, the tenocytes treated with TNF-α and the healthy mitochondria showed a remarkably increased expression level of collagen 1 protein, as compared with that in the TNF-α-treated tenocytes. On the other hand, the tenocytes treated with TNF-α and the damaged mitochondria showed an expression level of collagen 1 protein which was not significantly different from that in the TNF-α-treated tenocytes. From this, it was identified that the balance of matrix metalloproteases was maintained in the tenocytes into which the healthy mitochondria were delivered (FIGS. 26 to 30).

In addition, the tenocytes were treated with the healthy mitochondria isolated in Example 4 at 1 μg, 5 μg, or 25 μg. Then, in the tenocytes, expression levels of scleraxis and tenomodulin proteins were measured by Western blotting. Western blotting was performed in the same manner as in Example 1, in which the primary antibodies used were anti-scleraxis antibody (Abcam; ab58655) and anti-tenomodulin antibody (Abcam; ab203676).

As a result, the TNF-α-treated tenocytes showed a remarkably decreased expression level of scleraxis protein. On the contrary, the tenocytes treated with TNF-α and the healthy mitochondria showed an expression level of scleraxis protein which was remarkably increased as compared with that in the TNF-α-treated tenocytes. In particular, the tenocytes treated with 25 μs of the healthy mitochondria showed an expression level of scleraxis protein which was not significantly different from that in the normal group (FIG. 31).

In addition, the TNF-α-treated tenocytes showed a remarakably decreased expression level of tenomodulin protein. On the contrary, the tenocytes treated with TNF-α and the healthy mitochondria showed an expression level of tenomodulin protein which was remarkably increased as compared with that in the TNF-α-treated tenocytes. In particular, the tenocytes treated with 25 μs of the healthy mitochondria showed an expression level of tenomodulin protein which was not significantly different from that in the normal group (FIG. 32).

Example 9. Identification of Improvement of Mitochondrial Dynamics in Tenocytes by Mitochondrial Delivery To identify whether mitochondrial dynamics in tenocytes are improved by the mitochondrial delivery thereinto, the tenocytes were treated with 10 ng of TNF-α and incubated for 24 hours at 37° C. and 5% $CO_2$. The tenocytes were treated with the healthy mitochondria isolated in Example 4 at 1 μg, 5 μg, or 25 μg, and then incubated again for 24 hours at 37° C. and 5% $CO_2$. Then, protein expression levels of mitochondrial fission factors and a mitochondrial fusion factor were checked by Western blotting. Western blotting was performed in the same manner as in Example 1, in which the primary antibodies used were anti-Fis1 antibody (Cell Signaling Technologies, Inc.; D6C7) and anti-Drp1 antibody (Santa Cruz Biotechnology, Inc.; sc98900) (FIG. 33).

As a result, the TNF-α-treated tenocytes showed increased expression levels of Fis1 and Drp1 proteins that are mitochondrial fission factors; on the contrary, the tenocytes treated with TNF-α and the healthy mitochondria showed decreased expression levels of Fis1 and Drp1 proteins (FIGS. 34 and 35).

In addition, the TNF-α-treated tenocytes showed a decreased expression level of MFN2 protein that is a mitochondrial fusion factor; on the contrary, the tenocytes treated with TNF-α and the healthy mitochondria showed an increased expression level of MFN2 protein (FIG. 36). From this, it was identified that mitochondrial dynamics in the damaged tenocytes were improved by the delivery of foreign healthy mitochondria thereinto.

Example 10. Identification of Anti-Inflammatory Effect in Tenocytes by Mitochondrial Delivery To identify whether an inflammatory response in tenocytes is inhibited by the delivery of foreign healthy mitochondria thereinto, the tenocytes were treated with 10 ng of TNF-α, and then incubated for 24 hours at 37° C. and 5% $CO_2$. The tenocytes were treated with the healthy mitochondria isolated in Example 4 at 1 μg, 5 μg, or 25 μg, and then incubated again for 24 hours at 37° C. and 5% $CO_2$. Then, expression levels of IL-1β, IL-6, and p-NF-kB in the tenocytes were checked by ELISA and Western blotting. ELISA was performed according to the manufacturer's manual. In addition, Western blotting was performed in the same manner as in Example 1, in which the primary antibody used was anti-p-NF-kB antibody (Cell Signaling Technologies, Inc.; 9936S). For ELISA, IL-1β (R&D Systems; RLB00) and IL-6 (R&D Systems; R6000B) were used.

As a result, the TNF-α-treated tenocytes showed increased expression levels of the inflammatory cytokines, IL-1β and IL-6; on the contrary, the tenocytes treated with TNF-α and the healthy mitochondria showed decreased expression levels of the inflammatory cytokines, IL-1β and IL-6 (FIGS. 37 and 38).

In addition, the TNF-α-treated tenocytes showed an increased expression level of p-NF-kB protein that is an inflammatory signal; on the contrary, the tenocytes treated with TNF-α and the healthy mitochondria showed a decreased expression level of p-NF-kB protein (FIGS. 39 and 40). From this, it was identified that inflammation in the damaged tenocytes was inhibited by the delivery of foreign healthy mitochondria thereinto.

Example 11. Microarray Analysis

The tenocytes were inoculated into a 6-well plate at 1×10⁵ cells. After 2 days, treatment with 10 ng/ml of TNF-α was performed, and incubation was performed for 24 hours at 37° C. and 5% $CO_2$. Then, the healthy mitochondria isolated in Example 4 were delivered into the tenocytes, and after 24 hours, RNA was extracted from the tenocytes. Extraction of RNA from the tenocytes was performed using Easy-spin Total RNA Extraction Kit (iNtRON Biotechnology, Seoul, South Korea), and a Nanodrop spectrophotometer (Thermo Fisher, Waltham, USA) (260:280>1.9 and 260:230>1.9) was used to measure the concentration and purity thereof.

The microarray analysis was performed using Affymetrix HuGene 2.0ST chips (Affymetrix, California, USA). Creation and clustering of heat maps were performed using the Morpheus software (FIG. 41).

As a result, overall, the TNF-α-treated tenocytes showed high expression levels of factors associated with TNF signaling, apoptosis, calcium signaling, inflammation mediator regulation, NF-kB signaling, and ECM-receptor interaction, while showing low expression levels of factors associated with oxidative phosphorylation. On the contrary, the tenocytes treated with TNF-α and the healthy mitochondria showed low expression levels of factors associated with TNF signaling, apoptosis, calcium signaling, inflammation mediator regulation, NF-kB signaling, and ECM-receptor interaction, while showing high expression levels of factors associated with oxidative phosphorylation (FIG. 41).

From this, it was identified that the TNF-α-treated tenocytes showed inflammation induction, apoptosis, mitochondrial dysfunction, and tendon tissue destruction, and that the tenocytes treated with TNF-α and the healthy mitochondria showed improvement in inflammation induction, apoptosis, mitochondrial dysfunction, and tendon tissue destruction.

Example 12. Identification of Mitochondrial Delivery into Tendon Tissue

To identify whether foreign mitochondria are delivered into tendon tissue, first, L6 cells (ATCC, CRL-1458) were stained using Mitotracker CMXRos Red dye before isolation of foreign healthy mitochondria. Isolation of healthy mitochondria from the stained L6 cells was performed in the same manner as in Example 4, and 25 μg of the stained healthy mitochondria were injected into tendon tissue. The tendon tissue was subjected to cryosection. Then, the tendon tissue was attached to a slide, treatment with 300 nM Mitotracker Green dye was performed, and then incubation was performed for 30 minutes at 37° C. and 5% $CO_2$. Additionally, DAPI staining was performed. Then, a fluorescence image was taken and analyzed at 400 magnification using the confocal laser scanning microscope, ZEISS LSM 880 (Carl Zeiss AG, Oberkochen, Germany) (FIG. 42).

As a result, as illustrated in FIG. 42, the delivered healthy mitochondria (red) and the already existing mitochondria (green) were observed in the tendon tissue. From this, it was identified that the foreign healthy mitochondria were delivered into the tendon tissue.

Example 13. Identification of Improvement in Mitochondrial Dynamics by Mitochondrial Delivery into Tendon Tissue To identify whether mitochondrial dynamics in tendon tissue are improved by the delivery of foreign healthy mitochondria thereinto, 0.6 mg of collagenase I (Sigma-Aldrich, Dorset, England) was injected into the tendon tissue, and then inflammation in the tendon tissue was induced for 2 weeks. Then, 10 μg or 50 μg of the healthy mitochondria isolated in Example 4 was injected into the tendon tissue. After 2 weeks, protein expression levels of mitochondrial fission factors and a mitochondrial fusion factor were checked by Western blotting. Western blotting was performed in the same manner as in Example 9 (FIG. 43).

As a result, the collagenase I-treated tendon tissue showed increased expression levels of Fis1 and Drp1 proteins that are mitochondrial fission factors; on the contrary, the tendon tissue treated with collagenase I and the healthy mitochondria showed decreased expression levels of Fis1 and Drp1 proteins (FIGS. 44 and 45).

In addition, the collagenase I-treated tendon tissue showed a decreased expression level of MFN2 protein, which is a mitochondrial fusion factor; on the contrary, the tendon tissue treated with collagenase I and the healthy mitochondria showed an increased expression level of MFN2 protein (FIG. 46). From this, it was identified that mitochondrial dynamics in the damaged tendon tissue were improved by the mitochondrial delivery thereinto.

Example 14. Identification of Matrix Restoration in Tendon Tissue by Mitochondrial Delivery To identify whether tendon tissue is restored by the delivery of foreign healthy mitochondria thereinto, 0.6 mg of collagenase I was injected into the tendon tissue, and then inflammation in the tendon tissue was induced for 2 weeks. Then, 10 μg or 50 μg of the healthy mitochondria isolated in Example 4 was injected into the tendon tissue. After 2 weeks, expression levels of TNC and MMP1 proteins were checked by Western blotting and ELISA. Western blotting was performed in the same manner as in Example 1, in which the primary antibodies used were anti-TNC antibody (Abcam, ab203676) and anti-MMP1 antibody (Santa Cruz Biotechnology Inc.; sc-21731). ELISA was performed according to the manufacturer's manual (FIG. 47).

As a result, the collagenase I-treated tendon tissue showed increased expression levels of tenascin-C (TNC) and MMP1 proteins. This indicates imbalanced metalloproteases in the tendon tissue. On the contrary, the tendon tissue treated with collagenase I and the healthy mitochondria showed decreased expression levels of TNC and MMP1 proteins, and such expression levels were not significantly different from those in the normal tenocytes (FIGS. 48 and 49).

In addition, to quantitatively check a collagen content in the tendon tissue, a hydroxyproline assay was performed. The tendon tissue was quickly frozen in liquid nitrogen and then stored at −80° C. The tissue disruption method and experimental method were performed according to the manual provided in the Hydroxyproline Assay Kit (Abcam, ab222941). The tissue was disrupted, treated with 10 N NaOH and HCl, and then centrifuged at 10,000×g for 5 minutes. After the supernatant was recovered, an oxidation mix was added thereto and the reaction was allowed to proceed at room temperature for 20 minutes. Developer solution and DMAB concentrate solution were added at 50 μl each to each well, and the reaction was allowed to proceed at 65° C. for 45 minutes. Measurement was performed at a wavelength of 560 nm using Synergy Mix Multi-Mode Reader (BioTek, Instruments, Inc., Vermont, USA).

As a result, the collagenase I-treated tendon tissue showed a collagen content that was decreased by 32±0.4% as compared to the normal tendon tissue; on the contrary, the tendon tissue treated with collagenase I and the healthy mitochondria (10 μg or 50 μg) showed a collagen content that was increased by 25.4 and 24±0.7%, respectively (FIG. 50). From this, it was identified that mitochondrial delivery promoted regeneration of the damaged tendon tissue.

Example 15. Identification of Anti-Inflammatory Effect in Tendon Tissue by Mitochondrial Delivery To identify whether an inflammatory response in tendon tissue is inhibited by the delivery of foreign healthy mitochondria thereinto, 0.6 mg of collagenase I was injected into the tendon tissue, and then inflammation in the tendon tissue was induced for 2 weeks. Then, 10 μg or 50 μg of the healthy mitochondria isolated in Example 4 was injected into the tendon tissue. After 2 weeks, expression levels of TNF-α, IL-1β, IL-6, and p-NF-kB in the tendon tissue were checked by ELISA and Western blotting. ELISA was performed according to the manufacturer's manual, and Western blotting was performed in the same manner as in Example 1, in which the primary antibody used was anti-p-NF-kB antibody (Cell Signaling Technologies, Inc.; 9936S). For ELISA, TNF-α (R&D SYSTEMS; 210-TA-005), IL-1β (R&D SYSTEMS; RLB00), IL-6 (R&D SYSTEMS; R6000B) were used.

As a result, the collagenase I-treated tendon tissue showed increased expression levels of the inflammatory cytokines, TNF-α, IL-1β, and IL-6; on the contrary, the tendon tissue treated with collagenase I and the healthy mitochondria showed decreased expression levels of the inflammatory cytokines, TNF-α, IL-1β, and IL-6 (FIGS. 51 to 53).

In addition, the collagenase I-treated tendon tissue showed an increased expression level of p-NF-kB protein that is an inflammatory signal; on the contrary, the tendon tissue treated with collagenase I and the healthy mitochondria showed a decreased expression level of p-NF-kB protein (FIG. 54). From this, it was identified that inflammation in the damaged tendon tissue was inhibited by the delivery of foreign healthy mitochondria thereinto.

Example 16. Identification of Cell Proliferation and Changes in Related Factors in Tendinopathy Patient-Derived Tenocytes by Mitochondrial Delivery To identify whether tendinopathy patient-derived tenocytes are recovered by the delivery of foreign healthy mitochondria thereinto, tendinopathy patient-isolated tenocytes (ZenBio, Inc., TEN-F) were treated with the healthy mitochondria isolated in Example 4 at 1 µg, 5 µg, or 25 µg. After 2 weeks, proliferation rate of the tenocytes and tendon-related factors therein were checked by WST-1 analysis and Western blotting. Western blotting was performed in the same manner as in Example 1, in which the primary antibodies used were anti-TNC antibody (Abcam, ab203676), anti-TNMD antibody (Abcam, ab203676), and anti-collagen type 1 antibody (Abcam; ab6308). In addition, WST-1 (EZ-cyto x, EZ-3000, Dozen) analysis was performed at a wavelength of 450 nm using blending with medium at 1:9.

As a result, proliferation of the tenocytes increased by the delivery of the foreign healthy mitochondria thereinto (FIG. 55). In addition, expression of the tendon-related factor, TNC protein, decreased in a mitochondrial delivery concentration-dependent manner, and expression of TNMD protein also increased in a concentration-dependent manner. In addition, expression of collagen protein increased as compared with the group into which mitochondria were not delivered (FIGS. 56 to 59). From this, it was identified that the tendinopathy patient-derived damaged tenocytes were recovered by the delivery of foreign healthy mitochondria thereinto.

The invention claimed is:

1. A method for treating tendinopathy in a subject in need thereof, comprising:
a step of administering, to the subject, an effective amount of a pharmaceutical composition comprising mitochondria as an active ingredient, wherein the pharmaceutical composition comprises the mitochondria in a concentration of 0.5 µg/ml to 400 µg/ml based on a total volume of the pharmaceutical composition, and
wherein the mitochondria are isolated from cells or tissues.

2. The method of claim 1, wherein the subject has damaged tendon tissue.

3. The method of claim 1, wherein the administration is intramuscular, intravenous, or intratendinous administration.

4. The method of claim 1, wherein the cells are any one selected from the group consisting of somatic cells, germ cells, stem cells, and a combination thereof.

5. The method of claim 4, wherein the stem cells are any one selected from the group consisting of mesenchymal stem cells, adult stem cells, induced pluripotent stem cells, embryonic stem cells, bone marrow stem cells, neural stem cells, limbal stem cells, tissue-derived stem cells, and a combination thereof.

6. The method of claim 5, wherein the mesenchymal stem cells are obtained from any one selected from the group consisting of umbilical cord, umbilical cord blood, bone marrow, fat, muscle, nerve, skin, amniotic membrane, placenta, synovial fluid, testis, periosteum, and a combination thereof.

7. The method of claim 1, wherein the cells are autologous, allogenic, or xenogenic.

8. The method of claim 1, wherein the subject has tendinopathy, said tendinopathy being a tendon tissue having damaged collagen or a chronically degenerative tendon tissue.

9. The method of claim 8, wherein the administering the composition
(a) increases expression of any one selected from the group consisting of collagen 1, tenomodulin (TNMD), scleraxis, hydroxyproline, and a combination thereof;
(b) inhibits inflammation in tendon tissue; and/or
(c) decreases expression of any one selected from the group consisting of BH3 interacting-domain death agonist (BID), Bcl-2-associated X protein (Bax), MMP1, mitochondrial fission 1 protein (Fis1), dynamin-1-like protein (Drp1), mitofusin-2 (MFN2), IL-1β, IL-6, p-NF-kB, tenascin C (TNC), TNF-α, and a combinations thereof,
in the subject.

* * * * *